US012749366B2

(12) United States Patent
Joao et al.

(10) Patent No.: US 12,749,366 B2
(45) Date of Patent: Sep. 29, 2026

(54) APPARATUS AND METHODS FOR COLLECTING AND/OR FOR RECAPTURING GASES, MATERIALS, AND/OR SUBSTANCES, AND FOR GENERATING ELECTRICITY AND/OR ELECTRICAL POWER FROM THE SAME

(71) Applicants: Raymond Anthony Joao, Yonkers, NY (US); Steven Duane Mcconaughey, Chapel Hill, NC (US); Gregory Thomas Joao, Yonkers, NY (US); Roger David London, Tarrytown, NY (US)

(72) Inventors: Raymond Anthony Joao, Yonkers, NY (US); Steven Duane Mcconaughey, Chapel Hill, NC (US); Gregory Thomas Joao, Yonkers, NY (US); Roger David London, Tarrytown, NY (US)

( * ) Notice: Subject to any disclaimer, the term of this patent is extended or adjusted under 35 U.S.C. 154(b) by 695 days.

(21) Appl. No.: 18/124,887

(22) Filed: Mar. 22, 2023

(65) Prior Publication Data

US 2023/0360466 A1 Nov. 9, 2023

Related U.S. Application Data

(60) Provisional application No. 63/339,430, filed on May 7, 2022.

(51) Int. Cl.
*G07F 15/00* (2006.01)
*B60L 53/50* (2019.01)
(Continued)

(52) U.S. Cl.
CPC ............ *G07F 15/005* (2013.01); *B60L 53/50* (2019.02); *B60L 53/64* (2019.02); *B60L 53/665* (2019.02);
(Continued)

(58) Field of Classification Search
USPC ........................ 320/106, 107, 108, 109, 110
See application file for complete search history.

(56) References Cited

U.S. PATENT DOCUMENTS

2013/0020993 A1* 1/2013 Taddeo .................. B60L 53/65 320/109
2017/0136896 A1* 5/2017 Ricci ...................... B60L 53/12
2021/0291676 A1* 9/2021 Dietz .............. G06Q 20/38215

FOREIGN PATENT DOCUMENTS

WO WO-2009104634 A1 * 8/2009 .............. B60L 53/51

* cited by examiner

*Primary Examiner* — Brian Ngo
(74) *Attorney, Agent, or Firm* — Raymond A. Joao, Esq.

(57) ABSTRACT

An apparatus, including a power management computer; a fuel recapture device which collects leaked or spilled fuel by suction, vacuuming, or skimming; a fuel storage device which stores the leaked or spilled fuel; an electrical power generator which generates electrical power from or with the leaked or spilled fuel; a power storage device or pass-through system, an electrical power supply system which provides at least some of the electrical power stored in the power storage device or pass-through system to a public electrical energy grid or to a private electrical energy grid; and a meter which reads, records, or measures, information regarding an amount or quantity of electrical power provided, transferred, or supplied, by the electrical power supply system. The power management computer processes information regarding the amount or quantity of the electrical power provided, transferred, or supplied, by the electrical power supply system.

20 Claims, 10 Drawing Sheets

(51) Int. Cl.
*B60L 53/64* (2019.01)
*B60L 53/66* (2019.01)
*G06Q 50/06* (2012.01)

(52) U.S. Cl.
CPC .......... *G06Q 50/06* (2013.01); *B60L 2240/70* (2013.01); *G06Q 2220/00* (2013.01)

APPARATUS AND METHODS FOR COLLECTING AND/OR FOR RECAPTURING GASES, MATERIALS, AND/OR SUBSTANCES, AND FOR GENERATING ELECTRICITY AND/OR ELECTRICAL POWER FROM THE SAME

RELATED APPLICATIONS

This application claims the benefit of the priority of U.S. Provisional Patent Application Ser. No. 63/339,430, filed May 7, 2022, and entitled "APPARATUS AND METHODS FOR COLLECTING AND/OR FOR RECAPTURING GASES, MATERIALS, AND/OR SUBSTANCES, AND FOR GENERATING ELECTRICITY AND/OR ELECTRICAL POWER FROM THE SAME", the subject matter and teachings of which are hereby incorporated by reference herein in their entirety.

FIELD OF THE INVENTION

The present invention pertains to an apparatus and methods for collecting and/or for recapturing gases, materials, and/or substances, and for generating electricity and/or electrical power from the same and, in particular, the apparatus and methods of the present invention pertains to an apparatus and methods for collecting and/or for recapturing gases, materials, and/or substances, and for generating electricity and/or electrical power from the same which can be utilized to collect and/or to recapture gases, materials, and/or substances, such as natural gas, methane gas, and/or any other type or kind of fossil fuel gas, petroleum, crude oil, oil, and/or any other type or kind of fossil fuel material or substance, and to generate electricity and/or electrical power using and/or from the same.

BACKGROUND OF THE INVENTION

Natural gas, methane gas, and/or any other type or kind of fossil fuel gas, petroleum, crude oil, oil, and/or any other type or kind of fossil fuel material or substance, plays an important role in our everyday life. Natural gas, methane gas, and/or any other type or kind of fossil fuel gas, petroleum, crude oil, oil, and/or any other type or kind of fossil fuel material or substance, is used to generate electricity and/or electrical power which we use in everyday life, to heat our homes and buildings, to cook our meals, and the list can go on.

It is also well known that the mining, collection, storage, transfer or transport, and/or use, of natural gas, methane gas, and/or any other type or kind of fossil fuel gas, petroleum, crude oil, oil, and/or any other type or kind of fossil fuel material or substance, can result in the leakage, spillage, or other type or kind of the escape, of at least a portion of the same into the environment, resulting in adverse affects to the environment. In this regard, the leakage, spillage, or other type or kind of the escape, of natural gas, methane gas, and/or any other type or kind of fossil fuel gas, petroleum, crude oil, oil, and/or any other type or kind of fossil fuel material or substance, poses at least two separate and distinct problems. The leakage, spillage, or other type or kind of the escape, of natural gas, methane gas, and/or any other type or kind of fossil fuel gas, petroleum, crude oil, oil, and/or any other type or kind of fossil fuel material or substance, harms the environment and represents a substantial waste of fuel, or a fuel source, which could otherwise be harnessed and used to generate electricity and/or electrical power.

It is also well known that many entities, for example restaurants and automotive oil changing centers, generate waste substances that could be used to fuel generators that could generate electricity and/or electrical power. These entities are typically required to dispose of these waste substances in a lawful and environmentally friendly manner, which adds cost to their operations.

It is also well known that many sources of leakage, spillage, or other types of escape, of natural gas, methane gas, and/or any other type or kind of fossil fuel gas, petroleum, crude oil, oil, and/or any other type or kind of fossil fuel material or substance, as well as sources of waste substances, such as, but not limited to, cooking oils or used automotive oil can be found and/or located in or at locations that render the disposal or the processing of the same inconvenient or impractical.

There can be no doubt that there is a strong need for technological solutions and for improvements to existing technologies which can solve the problems described herein as well as other problems associated with the leakage, spillage, or other type or kind of the escape, of natural gas, methane gas, and/or any other type or kind of fossil fuel gas, petroleum, crude oil, oil, and/or any other type or kind of fossil fuel material or substance, as well as the production of waste substances like cooking oil and automotive oil by existing businesses. There can also be no doubt that there is also a strong need for technological solutions and for improvements to existing technologies which can collect waste substances, such as those described herein or otherwise, and find productive uses for the same.

SUMMARY OF THE INVENTION

The present invention pertains to an apparatus and methods for collecting and/or for recapturing gases, materials, and/or substances, and for generating electricity and/or electrical power from the same and, in particular, the apparatus and methods of the present invention pertains to an apparatus and methods for collecting and/or for recapturing gases, materials, and/or substances, and for generating electricity and/or electrical power from the same which can be utilized to collect and/or to recapture gases, materials, and/or substances, such as natural gas, methane gas, and/or any other type or kind of fossil fuel gas, petroleum, crude oil, oil, and/or any other type or kind of fossil fuel material or substance, and to generate electricity and/or electrical power using and/or from the same, which overcomes the shortcomings of the prior art.

The present invention can be utilized in order to collect, capture, recapture, recover, and/or store, natural gas, methane gas, and/or any other type or kind of fossil fuel gas, petroleum, crude oil, oil, and/or any other type or kind of fossil fuel material or substance, in any type or kind of setting, environment, or situation, and utilize the same in generating electricity and/or electrical power.

The present invention can utilize any type or kind of suitable electrical generators that can utilize or burn natural gas, methane gas, and/or any other type or kind of fossil fuel gas, petroleum, crude oil, oil, and/or any other type or kind of fossil fuel material or substance, and that can utilize the heat generated thereby to generate electricity and/or electrical power.

The present invention can thereafter deploy the electricity and/or electrical power for immediate use in and by any electrical circuit, system, device, or equipment, for storage in a battery or in a system of batteries or in a plurality of batteries, for storage in any type or kind of power storage system or equipment, for providing, supplying, or transferring, to an external electrical power supply system or external power grid, and/or for immediate or deferred use for providing electrical power to power and operate a blockchain mining computer, a cryptocurrency mining computer, a blockchain transaction processing computer, and/or a cryptocurrency transaction processing computer, and/or any number of the same and/or any combination of the same.

The present invention and/or any components of the same, can be deployed on, in, at, or with, can be utilized on, in, at, with, and/or can be stationed on, in, at, or with, any type or kind of vehicle, which vehicle can be or can include, any type or kind of car, automobile, motor vehicle, truck, bus, train, subway train or car, boat, sea vessel or water vessel, submarine, aircraft, jet, airplane, helicopter, airborne drone, spacecraft, and/or satellite. The respective vehicle can be any type or kind of land, air, sea, or space, vehicle.

The respective vehicle can be any type or kind of gasoline powered vehicle, diesel powered vehicle, electric powered vehicle or electric vehicle ("EV"), fuel cell powered vehicle, and/or any combination of the same and/or any hybrid of the same. In a preferred embodiment, the respective vehicle can be any type or kind of operator or driver controlled vehicle, a passenger vehicle, a cargo vehicle, an autonomous vehicle, a semi-autonomous vehicle, a remote-controlled vehicle, a drone, and/or any combination of the same.

The respective vehicle can also be any type or kind of heavy equipment, construction equipment, farm equipment, drilling equipment, gas or oil mining equipment or rigs for any type or kind of natural gas, methane gas, and/or any other type or kind of fossil fuel gas, petroleum, crude oil, oil, and/or any other type or kind of fossil fuel material or substance, oil rigs, drilling platforms or drilling rigs, offshore gas or oil mining rigs for natural gas, methane gas, and/or any other type or kind of fossil fuel gas, petroleum, crude oil, oil, and/or any other type or kind of fossil fuel material or substance, or any other type or kind of stationary and/or mobile equipment which can be placed at, situated at, or located at, any place for the collection, capturing, recapturing, recovering, and/or storing, of natural gas, methane gas, and/or any other type or kind of fossil fuel gas, petroleum, crude oil, oil, and/or any other type or kind of fossil fuel material or substance, in any type or kind of setting, environment, or situation.

The present invention and/or any components of the same, can be deployed on, in, at, or with, can be utilized on, in, at, with, and/or can be stationed on, in, at, or with, any type or kind of premises which can be a commercial premises, a residential premises, any type or kind of equipment described herein or otherwise, and/or any land, water, or surface area, of or associated with, legally or otherwise, the respective premises. Any vehicle which is stationary can also be a premises for purposes of the present application.

The present invention, and/or any component(s) of the same, can be utilized in order to collect, capture, recapture, recover, and/or store, natural gas, methane gas, and/or any other type or kind of fossil fuel gas, petroleum, crude oil, oil, and/or any other type or kind of fossil fuel material or substance, at, near, or in the vicinity of any location where the same can be mined, drilled for, collected, captured, collected, and/or stored.

The present invention, and/or any component(s) of the same, can also be utilized in order to collect, capture, recapture, recover, and/or store, natural gas, methane gas, and/or any other type or kind of fossil fuel gas, petroleum, crude oil, oil, and/or any other type or kind of fossil fuel material or substance, at, in, near, or in the vicinity of, any storage tank(s) or processing equipment for the same.

The present invention, and/or any component(s) of the same, can also be utilized in order to collect, capture, recapture, recover, and/or store, natural gas, methane gas, and/or any other type or kind of fossil fuel gas, petroleum, crude oil, oil, and/or any other type or kind of fossil fuel material or substance, at, near, along, or in the vicinity of, any pipeline or pipelines used to transport the same.

The present invention, and/or any component(s) of the same, can also be utilized in order to collect, capture, recapture, recover, and/or store, natural gas, methane gas, and/or any other type or kind of fossil fuel gas, petroleum, crude oil, oil, and/or any other type or kind of fossil fuel material or substance, at, near, along, or in the vicinity of, any seams, joints, valves, and/or any other or other location(s) or device or equipment which is, or may be, prone to leakage, in any pipeline or pipelines, or other transport device or equipment, used to transport the same.

Any type or kind of bio-fuel(s) or other fuel substance(s) or material(s), such as, but not limited to, ethanol, cooking oil, and/or any other fuel or fuel type, can be utilized by the apparatus and methods of the present invention, along and/or in conjunction with any appropriate and/or suitable electric generator or power generation equipment in order to generate electricity.

The apparatus of the present invention includes a power management computer which can be located in, on, or at, the respective vehicle, the premises, or the equipment, in connection with which the apparatus is being utilized or deployed. For example, if the apparatus is being utilized in connection with, or in conjunction with, a vehicle of any kind of type, the power management computer can be located or situated in or at the vehicle. The power management computer can be a computer of any type or kind. The power management computer can also be a component of the vehicle computer in the case of a vehicle, a premises computer in a case of a premises being used with the apparatus, or an entity computer in a case of any device, system, or equipment, being used with the apparatus.

The apparatus of the present invention also includes fuel intake/recapture equipment which is utilized in order to collect, to capture, to recapture, to recover, and/or to store, natural gas, methane gas, and/or any other type or kind of fossil fuel gas, petroleum, crude oil, oil, and/or any other type or kind of fossil fuel material or substance, which will be captured, recaptured, recovered, and/or to stored, by and with the present invention, and/or which will be utilized by the apparatus of the present invention in order to generate electricity and/or electrical power. The fuel intake/recapture equipment can include gas, liquid, or substance, containment equipment, a collection tank(s), a containment or collection reservoir(s), suction equipment, vacuum equipment, skimming equipment, a pump(s), pump equipment, and/or any other device(s), component(s), or equipment, needed, required, or desired, in and for collecting, capturing, recapturing, recovering, and/or storing, any respective gas, material, or substance, including, but not limited to, natural gas, methane gas, and/or any other type or kind of fossil fuel gas, petroleum, crude oil, oil, and/or any other type or kind of fossil fuel material or substance.

The fuel intake/recapture equipment can be, or can include, electrically operated and/or controlled components or devices. The fuel intake/recapture equipment can also include separate and/or dedicated equipment for collecting, capturing, recapturing, recovering, and/or storing, each of natural gas, methane gas, and/or any other type or kind of fossil fuel gas, petroleum, crude oil, oil, and/or any other type or kind of fossil fuel material or substance, and/or any combination or group of the same.

In the case of natural gas, the fuel intake/recapture equipment can include equipment for detecting a natural gas leak, and/or collecting, such as by suction or by vacuuming, the leaked natural gas into a dedicated natural gas storage tank. In a case of a petroleum, crude oil, or oil, leak or spill, the fuel intake/recapture equipment can include equipment for detecting a spill or leak, and/or collecting, such as by suction, or by vacuuming, or by skimming, the leaked or spilled petroleum, crude oil, or oil, into a dedicated storage tank. In a case of methane or other gas collection effort, such as the collection of methane gas at and from animal waste or compost collection sites, the fuel intake/recapture equipment can include equipment for detecting gas pressure or volume, and/or collecting, such as by suction or by vacuuming, the respective gas into a dedicated storage tank for the same.

The operation of the electrical components or devices of the fuel intake/recapture equipment and, therefore, the fuel intake/recapture equipment, can be activated, deactivated, disabled, re-enabled, and/or controlled, and/or the operation of the same can be controlled, by or via the power management computer. The operation of the electrical components or devices of the fuel intake/recapture equipment and, therefore, the fuel intake/recapture equipment, can be activated, deactivated, disabled, re-enabled, and/or controlled, and/or the operation of the same can also be controlled, by or via a central processing computer and/or by or via a user communication device.

The fuel intake/recapture equipment can be linked or connected to or with the power management computer via a wired connection, a wireless connection, or via a combination of the same.

The apparatus of the present invention also includes an electrical power generator system or any number of electrical power generator systems. The electrical power generator system(s) can be or can include an electrical generator for generating electricity from natural gas. The electrical power generator system(s) can be or can include an electrical generator for generating electricity from methane gas or any other type or kind of fossil fuel gas. The electrical power generator system(s) can be or can include an electrical generator for generating electricity from petroleum, crude oil, oil, and/or any other type or kind of fossil fuel material or substance.

The electrical power generator system(s) is connected or linked to the power management computer via a wired connection or link, via a wireless connection or link, or via any combination of the same. The electrical power generator system(s) can be can be activated, deactivated, disabled, re-enabled, and/or controlled, and/or the operation of the same can be controlled, by or via the power management computer. The operation of the electrical power generator system(s) can be activated, deactivated, disabled, re-enabled, and/or controlled, and/or the operation of the same can be controlled, by or via a central processing computer and/or by or via a user communication device.

The electrical power generator system(s) can also be connected to, or linked with, the fuel intake/recapture equipment, via a wired connection or link, via a wireless connection or link, or via any combination of the same.

The apparatus of the present invention also includes a power storage/pass-through system. The power storage/pass-through system can include the battery or batteries of the respective vehicle, premises, or equipment, in connection with which the apparatus is being utilized or deployed, and/or the engine, the electric drive motors, and/or any electrical systems, equipment, devices, or accessories, of the respective vehicle, premises, or equipment. The power storage/pass-through system can also include any number of batteries or storage batteries for storing electricity which is generated by the electrical power generator system(s).

The power storage/pass-through system can also include any number of types or kinds of power storage systems or devices, or any types of kinds of power storage equipment, which can be utilized to store electricity which is generated by the electrical power generator system(s) The power storage/pass-through system can also include a power pass-through system which can be utilized to transfer electrical power which is generated by the electrical power generator system(s) directly or indirectly to any electrical power output device, to any electrical power supply device, and/or to any electrical load.

The power storage/pass-through system is connected or linked to the power management computer and to the electrical power generator system(s) via a wired connection or link, via a wireless connection or link, or via any combination of the same. The power storage/pass-through system can be can be activated, deactivated, disabled, re-enabled, and/or controlled, and/or the operation of the same can be controlled, by or via the power management computer. The operation of the power storage/pass-through system can also be activated, deactivated, disabled, re-enabled, and/or controlled, and/or the operation of the same can also be controlled, by or via a central processing computer and/or by or via a user communication device.

The apparatus of the present invention can also include an electrical power output/supply system or any number of electrical power output/supply systems. The electrical power output/supply system(s) can be or can include the battery or batteries of the respective vehicle, premises, or equipment, in connection with which the apparatus is being utilized or deployed, so as to recharge the same. The electrical power output/supply system(s) can be or can include the engine, the ignition system, the electric drive motors, and/or any electrical systems, equipment, devices, or accessories, of the respective vehicle, premises, or equipment. The electrical power output/supply system(s) can be, or can include, an output to an external electrical power system, such as, but not limited to, a power system of a separate vehicle, a separate premises, or a separate item of equipment or equipment system. The electrical power output/supply system(s) can be, or can include, an output to an external electrical power system, such as, but not limited to, vehicle recharging station or system, a premises recharging station or system, or an equipment recharging station or system.

The electrical power output/supply system(s) can be, or can include, an output to an external electrical power grid which can be used by the public or by a private group or entity.

The electrical power output/supply system(s) can be, or can include, a blockchain mining computer, a cryptocurrency mining computer, a blockchain transaction processing computer, and/or a cryptocurrency transaction processing computer, and/or any number of the same and/or any combination of the same. In this regard, blockchain mining, cryptocurrency mining, blockchain transaction processing, and/or a cryptocurrency transaction processing, can be performed at the respective vehicle, premises, or equipment with and using electricity and/or electrical power generated by the electrical power generator system(s).

The electrical power output/supply system(s) is connected or linked to the power management computer and to the power storage/pass-through system via a wired connection or link, via a wireless connection or link, or via any combination of the same. The electrical power output/supply system(s) can be can be activated, deactivated, disabled, re-enabled, and/or controlled, and/or the operation of the same can be controlled, by or via the power management computer. The operation of the electrical power output/supply system(s) can also be activated, deactivated, disabled, re-enabled, and/or controlled, and/or the operation of the same can be controlled, by or via a central processing computer and/or by or via a user communication device.

The apparatus of the present invention can also include a central processing computer, which can be any computer or computer system or can be any server computer, or any computer or computer system which can be used in a communication network. Any number of central processing computers can be utilized in conjunction with, or in connection, with the apparatus of the present invention.

The central processing computer can provide control over the apparatus and can perform any of the various processing services and/or functions described herein as being performed by the apparatus of the present invention. The central processing computer may be a single computer or system of computers and/or may include a plurality of computers or computer systems which are utilized in conjunction with one another.

The central processing computer can be linked with each of, or any combination of, the power management computer, the fuel intake/recapture equipment, the electrical power generator system(s), the power storage/pass-through system, and/or the electrical power output/supply system(s), via a wireless connection or link. The central processing computer can also activate, deactivate, disable, re-enable, and/or control, and/or can control an operation of each of the power management computer, the fuel intake/recapture equipment, the electrical power generator system(s), the power storage/pass-through system, and/or the electrical power output/supply system(s).

The apparatus of the present invention also includes a distributed ledger and blockchain technology system. The distributed ledger and blockchain technology system can be any suitable or appropriate blockchain and can utilize any suitable or appropriate blockchain technology, blockchain platform, or blockchain system protocol. The distributed ledger and blockchain technology system can be a permissioned blockchain. The distributed ledger and blockchain technology system can be a permissionless blockchain. The distributed ledger and blockchain technology system can also be a hybrid of a permissioned blockchain and a permissionless blockchain, wherein it can operate as a permissioned blockchain at certain times and as a permissionless blockchain at other times. The distributed ledger and blockchain technology system can be a proof of work blockchain. The distributed ledger and blockchain technology system can be a proof of stake blockchain. The distributed ledger and blockchain technology system can be a hybrid of a proof of work blockchain and a proof of stake blockchain, wherein it can operate as a proof of work blockchain at certain times and as a proof of stake blockchain at other times.

The distributed ledger and blockchain technology system can be connected to or linked with the central processing computer via a wired connection or link, via a wireless connection or link, or via any combination of the same. The central processing computer can also control the operation of the distributed ledger and blockchain technology system. The distributed ledger and blockchain technology system can be connected to or linked with each of, or any combination of, the power management computer, the fuel intake/recapture equipment, the electrical power generator system (s), the power storage/pass-through system, and/or the electrical power output/supply system(s), via a wireless connection or link.

The distributed ledger and blockchain technology system can be used to process and to store information regarding any transactions or activities involving the apparatus and/or any of the various components of the same.

The apparatus of the present invention can also include a user communication device or computer, or any number of the same, each of which, or any number of which, is or can be associated with, or can be used by, any one or more of any of the herein-described users, individuals, persons, or entities, who or which utilize the apparatus of the present invention.

Any number of user communication devices can be utilized by, or can be associated with, each of the users, individuals, persons, or entities, who or which utilize the apparatus of the present invention. The user communication device can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any user, individual, person, or entity, who or which utilizes the apparatus and methods of the present invention. The user communication device can also be a server computer, a mainframe computer, a mini-computer, a microcomputer, or any other computer or device for suiting the needs of the particular user. The user communication device can also be any device or computer, or a kiosk, that can be located at public places or locations or which can also be publicly available. Any number of user communication devices can be utilized in conjunction with, or in connection with, the apparatus of the present invention.

The user communication device(s) can be linked to or with, and/or can communicate, in a bi-directional manner, with, and/or can operate in conjunction with, the central processing computer, with the distributed ledger and Blockchain technology system, and/or with each of, or any combination of, the power management computer, the fuel intake/recapture equipment, the electrical power generator system(s), the power storage/pass-through system, and/or the electrical power output/supply system(s), via a wireless connection or link.

The apparatus of the present invention can be utilized on, and/or over, the Internet and/or the World Wide Web. The apparatus of the present invention can also utilize wireless Internet and/or World Wide Web services, equipment and/or devices. Each of the power management computer(s) and/or the central processing computer(s) can have a web site or web sites associated therewith.

The apparatus of the present invention can also be utilized with any appropriate communication network or system including, but not limited to, a telecommunication network or system, a telephone communication network or system, a cellular communication network or system, a wireless communication network or system, a line or wired communication network or system, a wireless Internet network or system, a wireless World Wide Web network or system, a digital communication network or system, a personal communication network or system, a personal communication services (PCS) network or system, a satellite communication network or system, a broad band communication network or system, a low earth orbiting (LEO) satellite network or system, a public switched telephone network or system, a telephone communication network or system, a radio communication network or system, a cable television network or system, and/or any other communication network or system, and/or any combination of the above communication networks or systems.

The power management computer can be a computer of any type or kind, and/or can be a microprocessor, a microcomputer, a mini-computer, a personal computer, a server computer, or a mainframe computer. The power management computer can also be a component of the vehicle computer in the case of a vehicle, a premises computer in a case of a premises being used with the apparatus, or an entity computer in a case of any device, system, or equipment, being used with the apparatus. The power management computer can control and/or monitor, and/or can provide control and/or monitoring functions for and/or regarding, any and/or all of the operations of each, and/or of all of, the fuel intake/recapture equipment, the electrical power generator system(s), the power storage/pass-through system, and/or the electrical power output/supply system(s).

The power management computer is, or can be, located at, on, or in, the respective vehicle, premises, device, system, or equipment, in connection with which it is being used or utilized.

The power management computer includes a central processing unit or CPU which can be a microprocessor, or can be a microcomputer, a minicomputer, a macro-computer, and/or a mainframe computer, depending upon the application.

The power management computer also includes a random access memory device(s) (RAM) and a read only memory device(s) (ROM), and a user input device for entering data and/or information and/or commands into the power management computer. The user input device can be utilized for inputting and/or entering data and/or information and/or commands into the power management computer. The power management computer also includes a display device, and a transmitter(s) for transmitting signals and/or data and/or information to any one or more of the central processing computer(s), the distributed ledger and Blockchain technology system, and/or the user communication device(s), which may be utilized in conjunction with the apparatus of the present invention.

The power management computer also includes a receiver, for receiving signals and/or data and/or information from any one or more of the central processing computer(s), the distributed ledger and Blockchain technology system, and/or the user communication device(s), which may be utilized in conjunction with the apparatus of the present invention.

The power management computer also includes a database(s) which contains and/or includes any data, information, and/or software programs or software applications ("apps"), any and/or all of the data and/or information required, needed, or desired, for allowing and/or for enabling the power management computer and/or the apparatus to perform any and/or all of the functions and functionalities described herein as being performed, and/or as capable of being performed, by the power management computer and/or the apparatus of the present invention, and/or for providing or for performing any and/or all of the functions and functionalities of a power management system which can perform any and/or all of the functions and/or functionalities described herein as being performed by the apparatus of the present invention.

The database can contain or include any data, information, and/or software programs or software applications, needed, required, or desired, for performing any processing routine(s), algorithms, and/or functions and/or functionalities, described herein as being performed by the apparatus of the present invention and/or any components of the same, and/or the power management computer and/or any components of the same.

The power management computer also includes an output device for outputting any of the data, information, or reports, described herein or otherwise. The output device can be any suitable device which can be used to output data.

The power management computer can also include a video and/or audio recording device(s) which can include a camera and/or a video recording device, for recording pictures or video and/or video clips, and/or a microphone or an audio recording device, for recording audio or audio clips, which can be recorded by, and/or transmitted live, by or from the power management computer, or which can be recorded by, and stored at or in, the power management computer for transmission by or from the power management computer at a later time. The video and/or audio recording device(s) can also be utilized to facilitate one-way broadcasts from the power management computer, and/or can be utilized to facilitate video conferencing, video chatting, and/or audio conferencing, and/or video and audio conferencing, between users of the power management computer and any of the herein-described users, individuals, persons, or entities, who or which utilize the apparatus of the present invention.

The power management computer can also include a global positioning device. The global positioning device determines or can determine a position or location of the power management computer. The global positioning device can also be utilized in order to determine a position or location of the respective vehicle, premises, device, system, or equipment, in connection with which the power management computer is being used or utilized.

The power management computer can also be equipped, and/or can be programmed, for voice activation operation and/or voice control operation of and/or regarding any and/or all of the herein-described operations and functions which are capable of being performed by the power management computer and/or the various other components of the apparatus, including, but not limited to, each of, and/or all of, the fuel intake/recapture equipment, the electrical power generator system(s), the power storage/pass-through system, and/or the electrical power output/supply system(s).

The apparatus of the present invention can be utilized to collect, accumulate, capture, recapture, and/or store, any type of kind of fuel which can be utilized to generate electricity. In this regard, the term "fuel" as used in the present application, means and refers to, but is not limited to, any gas, liquid, substance, or material, which can be produced in nature or is produced naturally and/or by nature, can exist in nature or exists in nature, is derived from plants or organic matter or can be derived from plants or organic matter, can be man-made or is man-made, or can be produced by, can be derived from, or can be a wasted product of the same, which can be used to generate electricity or electrical power, or which can be used to produce electricity or electrical power.

The term "fuel" also means and/or refers to natural gas, natural gases or any type or kind, petroleum, crude oil, oil, gasoline, other flammable fluids, materials, or substances, methane, butane, propane, ethane, pentane, ethanol, petroleum gas, or any other type or flammable gas, or any other type or kind of fuel known to those skilled in the art, or biofuel of any type or kind and/or any waste product of the same, cooking oil, industrial waste oil (such as from machinery oil changes and/or vehicle oil changes), and/or any other type or kind of biofuel of biofuels known to those skilled in the art. The term “fuel” also means and/or refers to methane gas or any other gas or gases, or any liquid form(s) of the same, which are produced at and/or by, or which are released by or at, landfills, garbage dumps, animal waste pits or waste lagoons, livestock waste pits or waste lagoons, pig or hog waste pits or waste lagoons, cattle or cow waste pits or waste lagoons, biomass tanks, oil well vents, natural gas well or deposit vents, or any other types or kinds of gas, liquid, substance, or material, which can be used to generate or to produce electricity or electrical power.

The fuel intake/recapture equipment can include any type or kind of equipment, containers, containment devices, pipeline covers, tank covers, landfill liners, valve covers and/or gas containment devices and/or systems for gas valves for gas lines or gas pipelines, gas tanks or gas containers, valves covers for and/or containment devices and/or systems for liquid or fluid tanks or containers or lines or pipelines, seam covers for gas lines or gas pipelines, or seam covers for liquid or fluid lines or pipelines, and/or any covers, containers, or containment devices or tanks, at points or locations of expected or potential leaks of any gas, fluid, or liquid fuel.

The fuel intake/recapture equipment can also include any type or kind of booms and/or other barriers for preventing the spreading of an oil spill or other fuel spill, skimmers and/or vacuums for collecting fuel that has spilled or escaped, equipment used in on-site or in situ burning, or flaring of, of escaping gas or liquid fuel, land fill liners or land fill tents with associated gas valves to allow gases to be taken or obtained therefrom, domes and valves used in connection with biomass tanks, tents or coverings placed over landfills, garbage dumps, animal waste pits or waste lagoons, livestock waste pits or waste lagoons, pig or hog waste pits or waste lagoons, cattle or cow waste pits or waste lagoons, and associate valves for allowing gases to be taken or obtained therefrom, and/or oil well vent tents and/or natural gas vent tents and associated valves for allowing gases to be taken or obtained therefrom. The fuel intake/recapture equipment can also include any device, article, entity, or equipment, which can be utilized in order to collect, contain, capture, recover, recapture, and/or store, any of the fuel of fuels described herein or otherwise which can be utilized in order to generate or to produce electricity or electrical power.

The fuel intake/recapture equipment includes a natural gas capture/recapture equipment/system which can be or can include any device(s) or equipment described herein or otherwise for capturing, recapturing, collecting, and/or recovering, natural gas which is leaking, which has leaked, or which is otherwise made available for generating or for producing electricity or electrical power. The fuel intake/recapture equipment also includes a natural gas storage tank/container/system for storing the natural gas which is captured, recaptured, collected, and/or recovered, and/or which is otherwise made available for generating or for producing electricity or electrical power.

The natural gas capture/recapture equipment/system and the natural gas storage tank/container/system can be connected via a pipeline. Natural gas flows from the natural gas capture/recapture equipment/system to the natural gas storage tank/container/system via the pipeline. The natural gas capture/recapture equipment/system and the natural gas storage tank/container/system can also be connected or linked with each other electrically via a wired connection, a wireless connection, or any combination of the same.

The fuel intake/recapture equipment also includes a petroleum/crude oil/oil/gasoline/other fluid capture/recapture equipment/system which can be or can include any device(s) or equipment described herein or otherwise for capturing, recapturing, collecting, and/or recovering, petroleum, crude oil, oil, gasoline, or any other fluid, which is leaking, which has leaked, or which is otherwise made available for generating or for producing electricity or electrical power. The fuel intake/recapture equipment also includes a petroleum/crude oil/oil/gasoline/other fluid storage tank/container/system for storing the petroleum, crude oil, oil, gasoline, or any other fluid, which is captured, recaptured, collected, and/or recovered, and/or which is otherwise made available for generating or for producing electricity or electrical power.

The petroleum/crude oil/oil/gasoline/other fluid capture/recapture equipment/system and the petroleum/crude oil/oil/gasoline/other fluid storage tank/container/system can be connected via a pipeline. The petroleum, crude oil, oil, gasoline, or any other fluid, flows from the petroleum/crude oil/oil/gasoline/other fluid capture/recapture equipment/system to the petroleum/crude oil/oil/gasoline/other fluid storage tank/container/system via the pipeline. The petroleum/crude oil/oil/gasoline/other fluid capture/recapture equipment/system, and the petroleum/crude oil/oil/gasoline/other fluid storage tank/container/system, can also be connected or linked with each other electrically via a wired connection, a wireless connection, or any combination of the same.

The fuel intake/recapture equipment also includes a methane/butane/propane/ethane/pentane/ethanol/petroleum gas/other gas capture/recapture equipment/system which can be or can include any device(s) or equipment described herein or otherwise for capturing, recapturing, collecting, and/or recovering, methane, butane, propane, ethane, pentane, ethanol, petroleum gas, or other gas, which is leaking, which has leaked, or which is otherwise made available for generating or for producing electricity or electrical power. The fuel intake/recapture equipment also includes a methane/butane/propane/ethane/pentane/ethanol/petroleum gas/other gas storage tank/container/system for storing the methane, butane, propane, ethane, pentane, ethanol, petroleum gas, or other gas, which is captured, recaptured, collected, and/or recovered, and/or which is otherwise made available for generating or for producing electricity or electrical power.

The methane/butane/propane/ethane/pentane/ethanol/petroleum gas/other gas capture/recapture equipment/system and the methane/butane/propane/ethane/pentane/ethanol/petroleum gas/other gas storage tank/container/system can be connected via a pipeline. The methane, butane, propane, ethane, pentane, ethanol, petroleum gas, or other gas, flows from the methane/butane/propane/ethane/pentane/ethanol/petroleum gas/other gas capture/recapture equipment/system to the methane/butane/propane/ethane/pentane/ethanol/petroleum gas/other gas storage tank/container/system via the pipeline. The methane/butane/propane/ethane/pentane/ethanol/petroleum gas/other gas capture/recapture equipment/system and the methane/butane/propane/ethane/pentane/ethanol/petroleum gas/other gas storage tank/container/system can also be connected or linked with each other electrically via a wired connection, a wireless connection, or any combination of the same.

The electrical power generator system(s) includes a natural gas electrical power generator/generator system which generates electricity and/or electrical power from, with, or using, the natural gas stored in the natural gas storage tank/container/system.

The natural gas electrical power generator/generator system can be configured, and/or can be equipped, to provide a direct current (DC) output or an alternating current (AC) output, and/or can be configured to switch from a DC output to an AC output and vice versa.

The natural gas, which is stored in the natural gas storage tank/container/system, is supplied by and transferred from the natural gas storage tank/container/system to the natural gas electrical power generator/generator system via an appropriate gas line or pipeline which runs between the natural gas storage tank/container/system and the natural gas electrical power generator/generator system.

The electrical power generator system(s) also includes a petroleum/crude oil/oil/gasoline/other fluid electrical power generator/generator system which generates electricity from, with, or using, the respective petroleum, crude oil, oil, gasoline, or other fluid, which is stored in the petroleum/crude oil/oil/gasoline/other fluid storage tank/container/system.

The petroleum/crude oil/oil/gasoline/other fluid electrical power generator/generator system can be configured, and/or can be equipped, to provide a direct current (DC) output or an alternating current (AC) output, and/or can be configured to switch from a DC output to an AC output and vice versa.

The respective petroleum, crude oil, oil, gasoline, or other fluid, which is stored in the petroleum/crude oil/oil/gasoline/other fluid storage tank/container/system, is supplied by and transferred from the petroleum/crude oil/oil/gasoline/other fluid storage tank/container/system to the petroleum/crude oil/oil/gasoline/other fluid electrical power generator/generator system via an appropriate pipeline which runs between the petroleum/crude oil/oil/gasoline/other fluid storage tank/container/system and the petroleum/crude oil/oil/gasoline/other fluid electrical power generator/generator system.

The electrical power generator system(s) also includes a methane/butane/propane/ethane/pentane/ethanol/petroleum gas/other gas electrical power generator/generator system which generates electricity from, with, or using, the respective methane, butane, propane, ethane, pentane, ethanol, petroleum gas, or other gas, which is stored in the methane/butane/propane/ethane/pentane/ethanol/petroleum gas/other gas storage tank/container/system.

The methane/butane/propane/ethane/pentane/ethanol/petroleum gas/other gas electrical power generator/generator system can be configured, and/or can be equipped, to provide a direct current (DC) output or an alternating current (AC) output, and/or can be configured to switch from a DC output to an AC output and vice versa.

The respective methane, butane, propane, ethane, pentane, ethanol, petroleum gas, or other gas, which is stored in the methane/butane/propane/ethane/pentane/ethanol/petroleum gas/other gas storage tank/container/system, is supplied by and transferred from the methane/butane/propane/ethane/pentane/ethanol/petroleum gas/other gas storage tank/container/system to the methane/butane/propane/ethane/pentane/ethanol/petroleum gas/other gas electrical power generator/generator system via an appropriate gas line or pipeline which runs between the ethane/butane/propane/ethane/pentane/ethanol/petroleum gas/other gas storage tank/container/system 23B and the methane/butane/propane/ethane/pentane/ethanol/petroleum gas/other gas electrical power generator/generator system.

The power storage/pass-through system can provide for the storage of the electrical power which is generated by the electrical power generator system(s), or any one of more of the natural gas electrical power generator/generator system, the petroleum/crude oil/oil/gasoline/other fluid electrical power generator/generator system, or the methane/butane/propane/ethane/pentane/ethanol/petroleum gas/other gas electrical power generator/generator system, of the same.

The power storage/pass-through system can provide for pass-through of the electrical power, which is generated by the electrical power generator system(s), or any one of more of the natural gas electrical power generator/generator system, the petroleum/crude oil/oil/gasoline/other fluid electrical power generator/generator system, or the methane/butane/propane/ethane/pentane/ethanol/petroleum gas/other gas electrical power generator/generator system, of the same, to any electrical devices, systems, or equipment, for its immediate use or for its present use or real-time use.

The power storage/pass-through system can include primary battery for vehicle/premises/equipment which is a primary battery for the respective vehicle, premises, or equipment, in connection with, or in conjunction with, which the apparatus of the present invention, or any of its components, is/are being utilized. For example, in the case of an electric vehicle or a hybrid vehicle which is utilized in connection with, or on conjunction with, the apparatus, the primary battery for vehicle/premises/equipment can be the main battery or primary battery for powering the electric vehicle's or the hybrid vehicle's electric drive motor or drive motors and/or any ignition system, and/or any other electrical systems, devices, accessories, or equipment, of the respective vehicle.

The primary battery for vehicle/premises/equipment can be charged or recharged by receiving and storing DC electrical power which is generated by the electrical power generator system(s), or any one of more of the natural gas electrical power generator/generator system, the petroleum/crude oil/oil/gasoline/other fluid electrical power generator/generator system, or the methane/butane/propane/ethane/pentane/ethanol/petroleum gas/other gas electrical power generator/generator system, of the same.

The power storage/pass-through system can include a secondary/reserve storage battery for vehicle/premises/equipment which is a secondary or reserve battery or a back-up battery for the respective vehicle, premises, or equipment, in connection with, or in conjunction with, which the apparatus of the present invention, or any of its components, is/are being utilized. For example, in the case of an electric vehicle or a hybrid vehicle which is utilized in connection with, or on conjunction with, the apparatus, the secondary/reserve storage battery for vehicle/premises/equipment can be the reserve battery or the back-up battery for powering the electric vehicle's or the hybrid vehicle's electric drive motor or drive motors and/or any ignition system, and/or any other electrical systems, devices, accessories, or equipment, of the respective vehicle. Any number of secondary/reserve storage battery for vehicle/premises/equipment can be utilized at the respective vehicle, premises, or equipment.

The secondary/reserve storage battery for vehicle/premises/equipment can be charged or recharged by receiving and storing DC electrical power which is generated by the electrical power generator system(s), or any one of more of the natural gas electrical power generator/generator system, the petroleum/crude oil/oil/gasoline/other fluid electrical power generator/generator system, or the methane/butane/ propane/ethane/pentane/ethanol/petroleum gas/other gas electrical power generator/generator system, of the same.

The power storage/pass-through system can also include a capacitive charge storage device or equipment, or any number of the same. The capacitive charge storage device or equipment can receive and can store DC electrical power which is generated by the electrical power generator system(s), or any one of more of the natural gas electrical power generator/generator system, the petroleum/crude oil/oil/gasoline/other fluid electrical power generator/generator system, or the methane/butane/propane/ethane/pentane/ethanol/petroleum gas/other gas electrical power generator/generator system, of the same. The capacitive charge storage device or equipment can receive and can store the DC electrical power, which can thereafter be transferred as DC power to any other DC powered device, system, or equipment, at, on, or in, the respective vehicle, premises, or equipment, and/or to any DC powered device, system, or equipment, which is external from, or separate and apart from, the vehicle.

The capacitive charge storage device or equipment can receive and can store the DC electrical power, which can thereafter be converted to AC power (with and using a DC to AC converter associated with the capacitive charge storage device or equipment) in order to provide AC power to any AC powered device, system, or equipment, at, on, or in, the respective vehicle, premises, or equipment, and/or to any AC powered device, system, or equipment, which is external from, or separate and apart from, the vehicle.

The power storage/pass-through system can also include a gravity power storage device which can receive DC power or AC power which is generated by the electrical power generator system(s), or any one of more of the natural gas electrical power generator/generator system, the petroleum/crude oil/oil/gasoline/other fluid electrical power generator/generator system, or the methane/butane/propane/ethane/pentane/ethanol/petroleum gas/other gas electrical power generator/generator system, of the same. The gravity power storage device utilizes the DC power or AC power which is generated by the electrical power generator system(s), or any one of more of the natural gas electrical power generator/generator system, the petroleum/crude oil/oil/gasoline/other fluid electrical power generator/generator system, or the methane/butane/propane/ethane/pentane/ethanol/petroleum gas/other gas electrical power generator/generator system, of the same, in order to effectuate the lifting a weight or any number of weights, in order to convert the DC power or AC power into potential energy. When needed, power can be generated, with either DC power or AC power being generated, by causing the weight or weights to drop, thereby driving a separate electrical generator of the gravity power storage device in order to generate electricity or electrical power on demand and/or any time.

The gravity power storage device can provide either DC power or AC power (with and using a DC to AC converter or AC to DC converter as needed) in order to provide DC power or AC power to any device, system, or equipment, at, on, or in, the respective vehicle, premises, or equipment, and/or to any device, system, or equipment, which is external from, or separate and apart from, the vehicle. The gravity power storage device can also be utilized in order to pump water to a top of a reservoir of a hydroelectric dam, or to a top or an appropriately equipped water tower. Upon a subsequent release of the water from the stored height, the water can be used to drive an electric generator or electric generators in order to generate electricity or electrical power.

The power storage/pass-through system can also include any other/miscellaneous battery/power storage device/equipment. The other/miscellaneous battery/power storage device/equipment can receive and store DC power or AC power generated by the electrical power generator system(s), or any one of more of the natural gas electrical power generator/generator system, the petroleum/crude oil/oil/gasoline/other fluid electrical power generator/generator system, or the methane/butane/propane/ethane/pentane/ethanol/petroleum gas/other gas electrical power generator/generator system, of the same, and can thereafter provide DC or AC power, whichever is needed, to any electrical device, system, component, accessory, or equipment, of the respective vehicle, premises, or equipment, or to any electrical device, system, component, accessory, or equipment, which is external from, or separate and apart from, the respective vehicle, premises, or equipment.

The power storage/pass-through system can also include an electrical power pass-through system/equipment. The electrical power pass-through system/equipment contains any appropriate and/or suitable circuitry and/or equipment for providing DC power and/or AC power to any electrical device, computer, system, component, accessory, or equipment, of the respective vehicle, premises, or equipment, and/or to any electrical device, computer system, component, accessory, or equipment, which is external from, or separate and apart from, the respective vehicle, premises, or equipment. The electrical power pass-through system/equipment can provide electrical power to any respective electrical device, computer system, component, accessory, or equipment, and/or to any combination of, or plurality of, electrical devices, computer systems, components, accessories, or equipment, without storing the same and/or in a so-call "pass-through" manner or fashion.

The electrical power pass-through system/equipment receives the DC power or AC power, generated by the electrical power generator system(s), or any one of more of the natural gas electrical power generator/generator system, the petroleum/crude oil/oil/gasoline/other fluid electrical power generator/generator system, or the methane/butane/propane/ethane/pentane/ethanol/petroleum gas/other gas electrical power generator/generator system, of the same, and provides the same, as DC power or AC power, to those respective electrical devices, computer systems, components, accessories, or equipment, which are being powered by the electrical power pass-through system/equipment.

The electrical power pass-through system/equipment can provide electrical power it receives, without storing the same, immediately, in the present moment, and/or in real-time, the respective electrical devices, computer systems, components, accessories, or equipment, which are to be powered by the electrical power pass-through system/equipment.

The power storage/pass-through system can provide electrical power at the respective vehicle, premises, or equipment, and/or the power storage/pass-through system can provide electrical power to systems, components, devices, and equipment, which is external from the respective vehicle, premises, or equipment, and/or the power storage/pass-through system can be used to provide electrical power to another electrical vehicle or hybrid vehicle, or to any combustion engine vehicle; and/or the power storage/pass-through system can be used to provide electrical power to a premises or equipment; and/or the power storage/pass-through system can be used to provide electrical power to a public electrical supply energy grid; and/or the power storage/pass-through system can be used to provide electrical power to a private electrical supply energy grid; and/or the power storage/pass-through system can be used to provide electrical power to a blockchain mining computer, a blockchain computer for mining or creating new blocks in a blockchain, a blockchain mining computer for processing blockchain transactions, and/or any other computer or computer system which performs processing routines on, for, or relating to a blockchain or a crytocurrency; and/or the power storage/pass-through system can be used to provide electrical power to a stationary power supply for recharging electric vehicles or hybrid vehicles; and/or the power storage/pass-through system can be used to provide recharge stationary electric vehicles or hybrid vehicles; and/or the power storage/pass-through system can be used to provide recharge electric vehicles or hybrid vehicles when and while the same are moving or in motion.

The apparatus of the present invention can be utilized to use, or to provide or to supply for use, and/or to provide, any electricity or electrical power generated by the electrical power generator system(s) in a variety of ways, including, but not limited to, providing electricity or electrical power to a battery or AC power supply system of another or other vehicle, premises, or equipment, providing electricity or electrical power to a public electrical supply energy grid, providing electricity or electrical power to a private electrical supply energy grid, performing blockchain mining processing or blockchain transaction processing, providing electricity or electrical power to recharge a stationary electric vehicle or hybrid vehicle, and/or providing electricity or electrical power to recharge a moving or in-motion electric vehicle or hybrid vehicle, and/or providing electricity or electrical for any other appropriate use.

The electrical power output/supply system(s) includes a vehicle/premises/equipment battery/AC power supply/recharge system I/F. The vehicle/premises/equipment battery/AC power supply/recharge system I/F includes all of the devices, components, system, and/or equipment, needed or required for providing or supplying either DC power or AC power to a respective battery or AC power supply system of another, or any other vehicle, premises, or equipment, external from the vehicle, premises, or equipment, in connection with, or in conjunction with, which the apparatus is being utilized.

The vehicle/premises/equipment battery/AC power supply/recharge system I/F also includes an electrical meter for measuring the amount of electrical power delivered to the other vehicle, premises, or equipment. In this regard, the apparatus of the present invention can be used on or in connection with one particular vehicle, premises, or equipment, can provide electricity or electrical power to any other vehicle, premises, or equipment. The meter can measure the amount of electricity or electrical power supplied or provided to the other vehicle, premises, or equipment, for recordkeeping purposes, for billing purposes, and/or for any other reason or purpose.

The electrical power output/supply system(s) can also include a public electrical supply/energy grid power transfer system/equipment. The public electrical supply/energy grid power transfer system/equipment includes all of the devices, components, system, and/or equipment, needed or required for providing or supplying, or transferring, electricity or electrical power (either DC power, AC power, or both) to a public electrical supply or public energy grid.

The public electrical supply/energy grid power transfer system/equipment also includes an electrical meter for measuring the amount of electrical power delivered to the public electrical supply or public energy grid. The apparatus of the present invention can be used to provide, supply, or transfer, electricity or electrical power to public electrical supply or public energy grid. The meter can measure the amount of electricity or electrical power supplied, provided, or transferred, to the public electrical supply or public energy grid, for recordkeeping purposes, for billing purposes, and/or for any other reason or purpose.

The electrical power output/supply system(s) can also include a private electrical supply/energy grid power transfer system/equipment 53. The private electrical supply/energy grid power transfer system/equipment includes all of the devices, components, system, and/or equipment, needed or required for providing or supplying, or transferring, electricity or electrical power (either DC power, AC power, or both) to a private electrical supply or public energy grid.

The private electrical supply or public energy grid can be any privately owned and/or operated electrical supply or energy grid which can provide electricity or electrical power to any customers, clients, or users. The private electrical supply or public energy grid can also be any electric vehicle or hybrid vehicle recharging system, platform, or network, and/or can be any other type or kind of charging or recharging system, platform, or network, for any vehicles, premises, or equipment, or any component, system, device, or equipment, of the same.

The private electrical supply/energy grid power transfer system/equipment also includes an electrical meter for measuring the amount of electrical power delivered to the private electrical supply or public energy grid. The apparatus of the present invention can be used to provide, supply, or transfer, electricity or electrical power to private electrical supply or public energy grid. The meter can measure the amount of electricity or electrical power supplied, provided, or transferred, to the private electrical supply or private energy grid, for recordkeeping purposes, for billing purposes, and/or for any other reason or purpose.

The apparatus of the present invention also includes a blockchain mining/transaction processing computer, or any number of blockchain mining/transaction processing computer. The blockchain mining/transaction processing computer, or each blockchain mining/transaction processing computer, can be used to create or mine blocks of or for any blockchain or any number of blockchains, process transactions for, on, or involving, any blockchain or any number of blockchains, process cryptocurrency transactions, and/or perform any other functions which can be performed on, with, or relating to, any blockchain or blockchains, or any cryptocurrency or cryptocurrencies. Each blockchain mining/transaction processing computer can be connected to, or linked with, each of the power management computer, the central processing computer, the distributed ledger and blockchain technology system, and/or any of the herein-described user communication devices. The blockchain mining/transaction processing computer can be located on, in, or at, the respective vehicle, premises, or equipment, in connection with, or in conjunction with, which the apparatus is being utilized.

The blockchain mining/transaction processing computer can also be located external from, and/or separate and/or apart from, the respective vehicle, premises, or equipment, in connection with, or in conjunction with, which the apparatus is being utilized.

The electrical power output/supply system(s) can also include a blockchain mining/transaction processing computer power supply and the blockchain mining/transaction processing computer. The blockchain mining/transaction processing computer power supply provides or supplies electrical power to the blockchain mining/transaction processing computer and/or to each blockchain mining/transaction processing computer of the respective vehicle, premises, or equipment, in connection with, or in conjunction with, which the apparatus is being utilized.

The electrical power output/supply system(s) can also include a vehicle stationary recharging power supply and equipment which can be utilized to charge or recharge an electric vehicle or a hybrid vehicle which is parked or stationary. The vehicle stationary recharging power supply and equipment can include any needed or required equipment for charging or recharging an electric vehicle or a hybrid vehicle.

The vehicle stationary recharging power supply and equipment can include any suitable line cord, plug-in adapter, or charging conductor, and/or any other device or equipment, and/or any number and/or combination of the same, which can be used to provide or to effectuate a direct electrical connection or contact with an electric vehicle or a hybrid vehicle which is to be charged or recharged. In this regard, a direct transfer of electricity or electrical power, to the electric vehicle or a hybrid vehicle which is to be charged or recharged, can be effectuated. The vehicle stationary recharging power supply and equipment can also include an inductive charging coil or any number of inductive charging coils, for effectuating inductive (or "contactless" or "wireless") charging or recharging of an electric vehicle or a hybrid vehicle which is to be charged or recharged.

With an electric vehicle or a hybrid vehicle which is to be charged or recharged being stationary, or parked, the vehicle stationary recharging power supply and equipment can be utilized to charge or recharge the electric vehicle or a hybrid vehicle directly with and by using a line cord, plug-in adapter, or charging conductor, and/or any other device or equipment, and/or inductively with and by using the inductive charging coil or the any number of inductive charging coils.

The vehicle stationary recharging power supply and equipment also includes an electrical meter for measuring the amount of electrical power delivered to the electric vehicle or hybrid vehicle which is to be charged or recharged. In this regard, the apparatus of the present invention can be used to provide, supply, or transfer, electricity or electrical power to charge or recharge the battery or batteries of an electric vehicle or hybrid vehicle which is to be charged or recharged. The meter can measure the amount of electricity or electrical power supplied, provided, or transferred, to the electric vehicle or hybrid vehicle, for recordkeeping purposes, for billing purposes, and/or for any other reason or purpose.

The electrical power output/supply system(s) can also include a vehicle moving/in-motion recharging power supply and equipment which can be utilized to charge or recharge an electric vehicle or a hybrid vehicle which is moving, in-motion, and/or traveling, on or along a road or roadway. The vehicle moving/in-motion recharging power supply and equipment can include any needed or required equipment for charging or recharging a moving, in-motion, or traveling, electric vehicle or hybrid vehicle.

The vehicle moving/in-motion recharging power supply and equipment can include any suitable line cord, plug-in adapter, or charging conductor, and/or any other device or equipment, and/or any number and/or combination of the same, which can be used to provide or to effectuate a direct electrical connection or contact with a moving, in-motion, or traveling, electric vehicle or hybrid vehicle which is to be charged or recharged. In this regard, a direct transfer of electricity or electrical power, to the moving, in-motion, or traveling, electric vehicle or hybrid vehicle can be effectuated. The vehicle moving/in-motion recharging power supply and equipment can also include an inductive charging coil or any number of inductive charging coils, for effectuating inductive (or "contactless" or "wireless") charging or recharging of a moving, in-motion, or traveling, electric vehicle or hybrid vehicle which is to be charged or recharged.

With an electric vehicle or a hybrid vehicle, which is to be charged or recharged, moving, in-motion, or traveling, on or along a road or roadway, the vehicle moving/in-motion recharging power supply and equipment can be utilized to charge or recharge the electric vehicle or the hybrid vehicle directly with and by using a line cord, plug-in adapter, or charging conductor, and/or any other device or equipment, and/or inductively with and by using the inductive charging coil or the any number of inductive charging coils.

The vehicle moving/in-motion recharging power supply and equipment also includes an electrical meter for measuring the amount of electrical power delivered to the moving, in-motion, or traveling, electric vehicle or hybrid vehicle which is to be charged or recharged. In this regard, the apparatus of the present invention can be used to provide, supply, or transfer, electricity or electrical power to charge or recharge the battery or batteries of a moving, in-motion, or traveling, electric vehicle or hybrid vehicle which is to be charged or recharged. The meter can measure the amount of electricity or electrical power which is supplied, provided, or transferred, to the moving, in-motion, or traveling, electric vehicle or hybrid vehicle, for recordkeeping purposes, for billing purposes, and/or for any other reason or purpose.

The electrical power output/supply system(s), and/or any components of the same, and/or any of or each of the vehicle/premises/equipment battery/AC power supply/recharge system(s) I/F, the public electrical supply/energy grid power transfer system/equipment, the private electrical supply/energy grid power transfer system/equipment, the blockchain mining/transaction processing computer(s), the blockchain mining/transaction processing computer power supply or supplies, the vehicle stationary recharging power supply and equipment, and/or the vehicle moving/in-motion recharging power supply and equipment, and/or any components, equipment, or respective meters, can be located on, in, or at, a respective vehicle, premises, or equipment, in connection with, or in conjunction with, which the apparatus is being utilized, and/or can be located external from, and/or separate and/or apart from, a respective vehicle, premises, or equipment, in connection with, or in conjunction with, which the apparatus is being utilized.

Each meter can be connected to, or linked with, each of the power management computer, the central processing computer, the distributed ledger and blockchain technology system, and/or any of the herein-described user communication devices. Each meter can be located on, in, or at, the respective vehicle, premises, or equipment, in connection with, or in conjunction with, which the apparatus is being utilized. Each meter can also be located external from, and/or separate and/or apart from, the respective vehicle, premises, or equipment, in connection with, or in conjunction with, which the apparatus is being utilized.

The central processing computer can be any computer or computer system or can be any server computer or any computer or computer system which can be used in a communication network. Any number of central processing computers can be utilized in conjunction with, or in connection, with the apparatus of the present invention. The central processing computer can control and/or monitor, and/or can provide control and/or monitoring functions for and/or regarding, any and/or all of the operations of each, and/or of all of, any of the power management computer(s), the fuel intake/recapture equipment, the electrical power generator system(s), the power storage/pass-through system, and/or the electrical power output/supply system(s), which is/are utilized in connection with the apparatus of the present invention.

The central processing computer can also provide control over the apparatus and can perform any of the various processing services and/or functions described herein as being performed by the apparatus of the present invention, and/or as being performed by any of the components of the same. The central processing computer may be a single computer or system of computers and/or may include a plurality of computers or computer systems which are utilized in conjunction with one another. The central processing computer, can also provide services for any of the power management computers, any of the user communications devices, and/or any of the equipment of systems, and/or any other computers and/or computer systems described herein as being associated with any of the users, individuals, persons, or entities, who or which utilize the apparatus of the present invention.

The central processing computer includes a central processing unit or CPU, which is a microprocessor. The CPU can also be a microcomputer, a minicomputer, a macro-computer, and/or a mainframe computer, depending upon the application.

The central processing computer also includes a random access memory device(s) (RAM), a read only memory device(s) (ROM), a user input device, for entering data and/or information and/or commands into the central processing computer, and a display device.

The central processing computer also includes a transmitter(s), for transmitting signals and/or data and/or information to any one or more of the power management computer(s), the distributed ledger and Blockchain technology system, and/or the user communication device(s), and/or any other central processing computer(s), which is/are or may be utilized in conjunction with the apparatus of the present invention.

The central processing computer also includes a receiver for receiving signals and/or data and/or information from any one or more of the power management computer(s), the distributed ledger and Blockchain technology system, and/or the user communication device(s), and/or any other central processing computer(s), which is/are or may be utilized in conjunction with the apparatus of the present invention.

The central processing computer also includes a database(s) which contains and/or includes any data, information, and/or software programs or software applications ("apps"), any and/or all of the data and/or information required, needed, or desired, for allowing and/or for enabling the central processing computer and/or the apparatus to perform any and/or all of the functions and functionalities described herein as being performed, and/or as capable of being performed, by the central processing computer and/or the apparatus of the present invention, and/or for providing or for performing any and/or all of the functions and functionalities of a power management system which can perform any and/or all of the functions and/or functionalities described herein as being performed by the apparatus of the present invention. The database can contain or include any data, information, and/or software programs or software applications, needed, required, or desired, for performing any processing routine(s), algorithms, and/or functions and/or functionalities, described herein as being performed by the central processing computer, the apparatus, and/or any components of the same, and/or the power management computer and/or any components of the same.

The central processing computer also includes an output device for outputting any of the data, information, or reports, described herein or otherwise, and a video and/or audio recording device(s) which can include a camera and/or a video recording device, for recording pictures or video and/or video clips, and/or a microphone or an audio recording device, for recording audio or audio clips, which can be recorded by, and/or transmitted live, by or from the central processing computer, or which can be recorded by, and stored at or in, the central processing computer for transmission by or from the central processing computer at a later time. The video and/or audio recording device(s) can also be utilized to facilitate one-way broadcasts from the central processing computer, and/or can be utilized to facilitate video conferencing, video chatting, and/or audio conferencing, and/or video and audio conferencing, between users of the central processing computer and any of the herein-described users, individuals, persons, or entities, who or which utilize the apparatus of the present invention.

The central processing computer can also include a global positioning device which determines or can determine a position or location of the central processing computer.

The user communication device can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device, which can provide the functionality of, and which can be utilized as a user communication device.

The user communication device includes a central processing unit or CPU which is or can be a microprocessor. The CPU can also be a microcomputer, a minicomputer, a macro-computer, and/or a mainframe computer, depending upon the application.

The user communication device also includes a random access memory device(s) (RAM), a read only memory device(s) (ROM), a user input device for entering data and/or information and/or commands into the user communication device, and a display device.

The user communication device also includes a transmitter(s) for transmitting signals and/or data and/or information to any one or more of the central processing computer(s), the power management computer(s), the distributed ledger and Blockchain technology system, and/or any other user communication device(s), which is/are or may be utilized in conjunction with the apparatus of the present invention.

The user communication device also includes a receiver for receiving signals and/or data and/or information from any one or more of the central processing computer(s), the power management computer(s), the distributed ledger and Blockchain technology system, and/or any other user communication device(s), which is/are or may be utilized in conjunction with the apparatus of the present invention.

The user communication device also includes a database(s) which contains any and/or all of the data and/or information required, needed, or desired, for allowing and/or enabling the user communication device and/or the apparatus to perform any and/or all of the functions and functionalities described herein as being performed, and/or as capable of being performed, by the user communication device and/or the apparatus. In this regard, and notwithstanding any specific examples of data and/or information described herein as being stored in the database, it is to be understood that the database contains and/or includes any and/or all data and/or information required, needed, or desired, for allowing and/or enabling the user communication device and/or the apparatus to perform any and/or all of the functions and functionalities described herein as being performed by the user communication device and/or the apparatus of the present invention.

The database can also contain or include any software, software programs, and/or software applications ("app"), which is, or may be, needed and/or desired in performing any and/or all of the features and/or functionality described herein as being provided by the apparatus of the present invention and/or the user communication device. The database can also contain and/or include any other data and/or information which is, or may be, needed and/or desired in performing any and/or all of the features and/or functionality described herein as being provided by the apparatus of the present invention and/or the user communication device.

The user communication device also includes an output device for outputting any of the data, information, or reports, described herein or otherwise, and a video and/or audio recording device(s) which can include a camera and/or a video recording device, for recording pictures or video and/or video clips, and/or a microphone or an audio recording device, for recording audio or audio clips, which can be recorded by, and/or transmitted live, by or from the user communication device, or which can be recorded by, and stored at or in, the user communication device for transmission by or from the user communication device at a later time. The video and/or audio recording device(s) can also be utilized to facilitate one-way broadcasts from the user communication device, and/or can be utilized to facilitate video conferencing, video chatting, and/or audio conferencing, and/or video and audio conferencing, between a user of the user communication device and any of the herein-described users, individuals, persons, or entities, who or which utilize the apparatus of the present invention.

The user communication device can also include a global positioning device which determines or can determine a position or location of the user communication device.

The apparatus of the present invention can be utilized, in any number and/or in a variety of preferred embodiments, in order to capture, to recapture, to collect, and/or to store, any of the types of kinds of fuel or fuels which are described herein or otherwise, to convert the respective fuel or fuels to electricity or electrical power, and to store the electricity or the electrical power, and/or to utilize, to provide, to transfer, or to deploy, the electricity or electrical power in any number of a variety of types of kinds of applications.

The present invention can be utilized to order to collect, capture, recapture, recover, and/or to store, natural gas, methane gas, and/or any other type or kind of fossil fuel gas, petroleum, crude oil, oil, and/or any other type or kind of fossil fuel material or substance, in any type or kind of setting, environment, or situation, and to utilize the same in generating electricity and/or electrical power. A fuel, which can be natural gas, petroleum, crude oil, oil, gasoline, or any other fluid which is flammable or combustible, and/or methane, butane, propane, ethane, pentane, ethanol, petroleum gas, or any other gas which is flammable or combustible, and/or any gaseous or liquid form of the same, can be collected, captured, recaptured, recovered, and/or stored, in, or as the result of, any number of situations or occurrences.

For example, a natural gas leak at a valve or seal of a natural gas pipeline, or a rupture of the natural gas pipeline, could result in a need to utilize the apparatus of the present invention in order to collect, capture, recapture, recover, and/or to store, the leaking or leaked natural gas. Similarly, a spill of, or a rupture or puncture in, or a leak from, a tank storing, or a rupture or puncture in a pipeline transporting, any of petroleum, crude oil, oil, gasoline, or any other fluid which is flammable or combustible, could result in a need to utilize the apparatus of the present invention in order to collect, capture, recapture, recover, and/or to store, the respective petroleum, crude oil, oil, gasoline, or other fluid. Likewise, the production or the buildup of collection of methane gas at a landfill, garbage dump, animal waste pit or waste lagoon, livestock waste pit or waste lagoon, pig or hog waste pit or waste lagoon, or cattle or cow waste pit or waste lagoon, could result in a need to utilize the apparatus of the present invention in order to collect, capture, recapture, recover, and/or remove, and to store, the respective methane gas.

In a similar manner, a leak or puncture of a tank storing, or a pipeline carrying or transporting, methane, butane, propane, ethane, pentane, ethanol, petroleum gas, or any other gas, could result in a need to utilize the apparatus of the present invention in order to collect, capture, recapture, recover, and/or remove, and to store, the respective gas. In a same, manner, the collecting or the building up stored biofuels and/or of used cooking oils, used engine oils or other used petroleum or other oils or susbstances, and/or other biofuels or waste substances or by-products, could result in a need to utilize the apparatus of the present invention in order to collect, capture, recapture, recover, and/or remove, and to store, the respective biofuel, oil, waste material, or substance.

Once the respective fuel is collected, captured, recaptured, recovered, and/or removed, and stored, by and using the respective fuel intake/recapture equipment, the respective fuel can be utilized to generate or produce electricity or electrical power, which can be either stored in and/or by any of the herein described the power storage/pass-through system, and/or any of the herein-described components of the same, and/or the electricity or electrical power can be provided in "pass-through" fashion in order to power any system(s), device(s), component(s), or equipment, of any vehicle, premises, or equipment.

The electricity or electrical power which is stored, or which is passed-though to any system(s), device(s), component(s), or equipment, of any vehicle, premises, or equipment, can be utilized to provide electricity or electrical power in and for a number of applications or uses, including, but not limited to, providing electricity or electrical power to a battery or AC power supply system of another or other vehicle, premises, or equipment, providing electricity or electrical power to a public electrical supply energy grid, providing electricity or electrical power to a private electrical supply energy grid, providing electricity or electrical power to or at an electric vehicle or hybrid vehicle recharging platform, system, or network, providing electrical power to any of the herein-described blockchain mining/transaction processing computers for performing blockchain mining processing or blockchain transaction processing, providing electricity or electrical power to recharge a stationary electric vehicle or hybrid vehicle, and/or providing electricity or electrical power to recharge a moving or in-motion electric vehicle or hybrid vehicle, and/or providing electricity or electrical for any other appropriate use.

In applications wherein electricity or electrical power is being supplied from the apparatus to an external system or user, the respective meter can measure the amount of electrical power, which is transferred by, or which is provided by, the apparatus of the present invention and/or any of its various electrical power output/supply systems, so the price of the same can be ascertained and so that the owner or operator of the apparatus can be compensated for, can receive compensation for, and/or can receive credit, whichever the case may be, for providing or supplying the electricity or electrical power. Thereafter, a record of any transaction(s) involving the providing of, the transfer of, the exchange of, and/or the sale of, the electricity or electrical power, from and/or by the apparatus of the present invention can be processed by the power management computer, and/or the central processing computer, and/or the distributed ledger and blockchain technology system, and any information regarding any such transaction(s) can be stored in the distributed ledger and blockchain technology system.

The apparatus of the present invention can also be located on or at, or deployed on or at, any of the herein-described vehicles, premises, or equipment, in and/or when using the apparatus and methods of the present invention. Any vehicle can also be utilized to move or travel from location to location when and as needed in order to collect, capture, recapture, recover, and/or remove, and to store, any respective fuel or fuels. In a similar manner, any premises may be a stationary premises or a mobile premises in order to collect, capture, recapture, recover, and/or remove, and to store, any respective fuel or fuels when and as needed. In a same manner, any item of equipment may be a stationary item of equipment or a mobile item of equipment in order to collect, capture, recapture, recover, and/or remove, and to store, any respective fuel or fuels when and as needed.

The apparatus and methods of the present invention facilitates and/or provides for a more efficient collection, capturing, recapturing, recovery, and/or storage, of any of the various kinds of fuels or biofuel described herein and/or otherwise. Further, the ability of the apparatus of the present invention to collect, to capture, to recapture, and/or to recover, and/or store, a respective fuel or fuels, and the ability of the apparatus to generate or to produce electricity or electrical power with or from the fuel or fuels, dispenses with the need for long term storage of, and/or transporting or shipping of the respective fuel or fuels from one location to another. The apparatus of the present invention also facilitates and/or provides for the remote generation or production, and use or deployment of, electricity or electrical power.

The apparatus and methods of the present invention provides a number of technical solutions for, and provides a number of improvements to technologies relating to, at the very least, technologies directed to or at collecting, capturing, recapturing, recovering, and/or removing, and storing, fossil fuels, biofuels, and other fuels, which can be harmful to, or undesirable for, the environment, while also allowing for the generation and production of electricity or electrical power from and with the same, so as to provide for a number of advantages and solutions for protecting the environment as well as for making contributions towards meeting our growing electrical energy needs.

DESCRIPTION OF THE PREFERRED EMBODIMENTS

Figure 1:
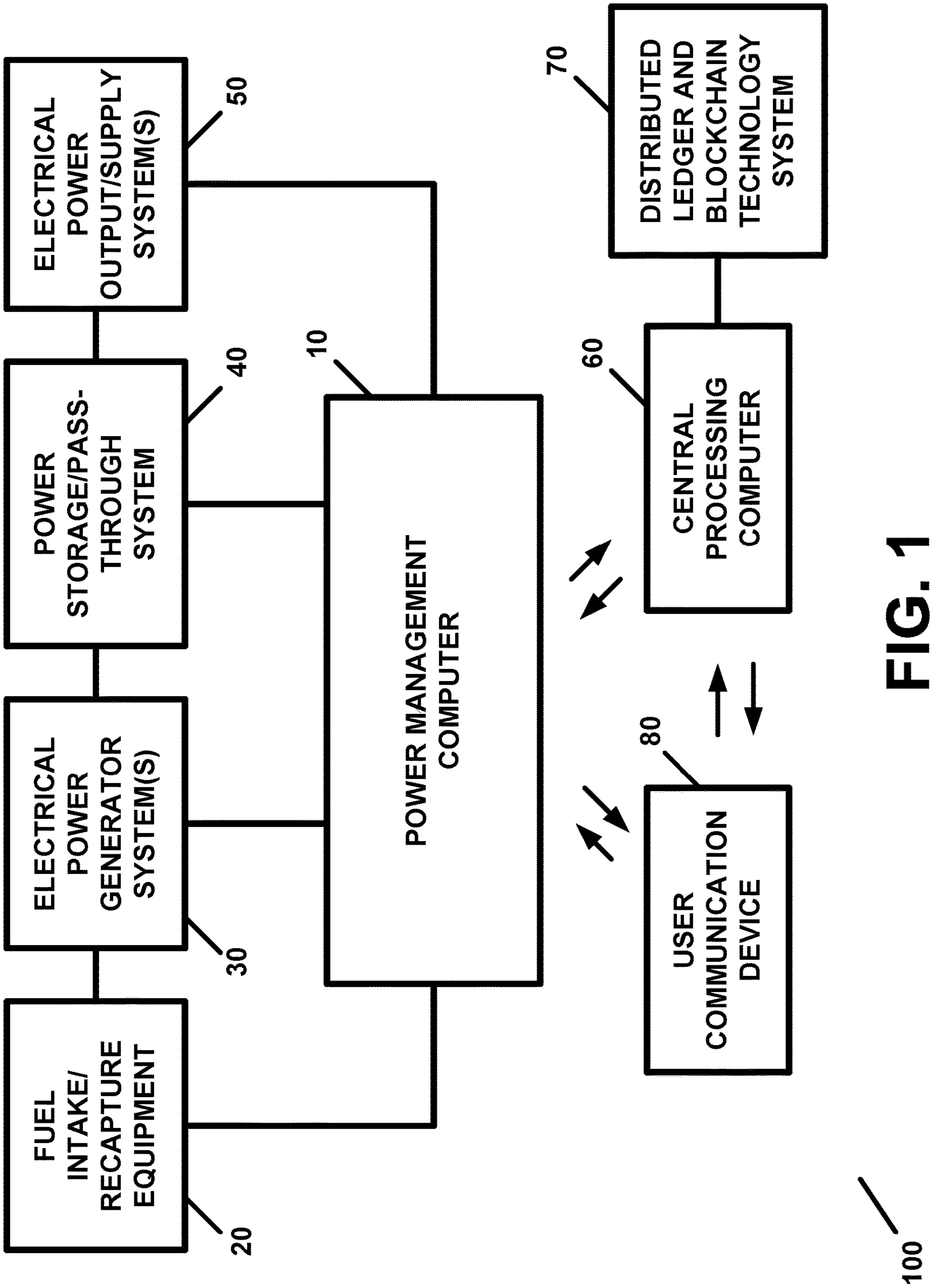
FIG. 1 illustrates a preferred embodiment of the apparatus of the present invention, in block diagram form.

The present invention pertains to an apparatus and methods for collecting and/or for recapturing gases, materials, and/or substances, and for generating electricity and/or electrical power from the same and, in particular, the apparatus and methods of the present invention pertains to an apparatus and methods for collecting and/or for recapturing gases, materials, and/or substances, and for generating electricity and/or electrical power from the same which can be utilized to collect and/or to recapture gases, materials, and/or substances, such as natural gas, methane gas, and/or any other type or kind of fossil fuel gas, petroleum, crude oil, oil, and/or any other type or kind of fossil fuel material or substance, and to generate electricity and/or electrical power using and/or from the same.

Applicant hereby incorporates by reference herein the subject matter and teachings of U.S. Provisional Patent Application Ser. No. 63/339,430, filed May 7, 2022, and entitled "APPARATUS AND METHODS FOR COLLECTING AND/OR FOR RECAPTURING GASES, MATERIALS, AND/OR SUBSTANCES, AND FOR GENERATING ELECTRICITY AND/OR ELECTRICAL POWER FROM THE SAME", the subject matter and teachings of which are hereby incorporated by reference herein in their entirety.

In a preferred embodiment, the apparatus and methods of the present invention can be utilized in order to collect, capture, recapture, recover, and/or store, natural gas, methane gas, and/or any other type or kind of fossil fuel gas, petroleum, crude oil, oil, and/or any other type or kind of fossil fuel material or substance, in any type or kind of setting, environment, or situation, and utilize the same in generating electricity and/or electrical power.

In a preferred embodiment, the apparatus and methods of the present invention can utilize any type or kind of suitable electrical generators that can utilize or burn natural gas, methane gas, and/or any other type or kind of fossil fuel gas, petroleum, crude oil, oil, and/or any other type or kind of fossil fuel material or substance, and that can utilize the heat generated thereby to generate electricity and/or electrical power.

In a preferred embodiment, the apparatus and methods of the present invention can thereafter deploy the electricity and/or electrical power for immediate use in and by any electrical circuit, system, device, or equipment, for storage in a battery or in a system of batteries or in a plurality of batteries, for storage in any type or kind of power storage system or equipment, for providing, supplying, or transferring, to an external electrical power supply system or external power grid, and/or for immediate or deferred use for providing electrical power to power and operate a blockchain mining computer, a cryptocurrency mining computer, a blockchain transaction processing computer, and/or a cryptocurrency transaction processing computer, and/or any number of the same and/or any combination of the same.

In a preferred embodiment, the apparatus of the present invention and/or any components of the same, can be deployed on, in, at, or with, can be utilized on, in, at, with, and/or can be stationed on, in, at, or with, any type or kind of vehicle, which vehicle can be or can include, any type or kind of car, automobile, motor vehicle, truck, bus, train, subway train or car, boat, sea vessel or water vessel, submarine, aircraft, jet, airplane, helicopter, airborne drone, spacecraft, and/or satellite. In a preferred embodiment, the respective vehicle can be any type or kind of land, air, sea, or space, vehicle.

In a preferred embodiment, the respective vehicle can be any type or kind of gasoline powered vehicle, diesel powered vehicle, electric powered vehicle or electric vehicle ("EV"), fuel cell powered vehicle, and/or any combination of the same and/or any hybrid of the same. In a preferred embodiment, the respective vehicle can be any type or kind of operator or driver controlled vehicle, a passenger vehicle, a cargo vehicle, an autonomous vehicle, a semi-autonomous vehicle, a remote-controlled vehicle, a drone, and/or any combination of the same.

In a preferred embodiment, the respective vehicle can also be any type or kind of heavy equipment, construction equipment, farm equipment, drilling equipment, gas or oil mining equipment or rigs for any type or kind of natural gas, methane gas, and/or any other type or kind of fossil fuel gas, petroleum, crude oil, oil, and/or any other type or kind of fossil fuel material or substance, oil rigs, drilling platforms or drilling rigs, offshore gas or oil mining rigs for natural gas, methane gas, and/or any other type or kind of fossil fuel gas, petroleum, crude oil, oil, and/or any other type or kind of fossil fuel material or substance, or any other type or kind of stationary and/or mobile equipment which can be placed at, situated at, or located at, any place for the collection, capturing, recapturing, recovering, and/or storing, of natural gas, methane gas, and/or any other type or kind of fossil fuel gas, petroleum, crude oil, oil, and/or any other type or kind of fossil fuel material or substance, in any type or kind of setting, environment, or situation.

In a preferred embodiment, the apparatus of the present invention and/or any components of the same, can be deployed on, in, at, or with, can be utilized on, in, at, with, and/or can be stationed on, in, at, or with, any type or kind of premises which can be a commercial premises, a residential premises, any type or kind of equipment described herein or otherwise, and/or any land, water, or surface area, of or associated with, legally or otherwise, the respective premises. In a preferred embodiment, any vehicle which is stationary can also be a premises for purposes of the present application.

In a preferred embodiment, the apparatus and methods of the present invention, and/or any component(s) of the same, can be utilized in order to collect, capture, recapture, recover, and/or store, natural gas, methane gas, and/or any other type or kind of fossil fuel gas, petroleum, crude oil, oil, and/or any other type or kind of fossil fuel material or substance, at, near, or in the vicinity of any location where the same can be mined, drilled for, collected, captured, collected, and/or stored.

In a preferred embodiment, the apparatus and methods of the present invention, and/or any component(s) of the same, can also be utilized in order to collect, capture, recapture, recover, and/or store, natural gas, methane gas, and/or any other type or kind of fossil fuel gas, petroleum, crude oil, oil, and/or any other type or kind of fossil fuel material or substance, at, in, near, or in the vicinity of, any storage tank(s) or processing equipment for the same.

In a preferred embodiment, the apparatus and methods of the present invention, and/or any component(s) of the same, can also be utilized in order to collect, capture, recapture, recover, and/or store, natural gas, methane gas, and/or any other type or kind of fossil fuel gas, petroleum, crude oil, oil, and/or any other type or kind of fossil fuel material or substance, at, near, along, or in the vicinity of, any pipeline or pipelines used to transport the same.

In a preferred embodiment, the apparatus and methods of the present invention, and/or any component(s) of the same, can also be utilized in order to collect, capture, recapture, recover, and/or store, natural gas, methane gas, and/or any other type or kind of fossil fuel gas, petroleum, crude oil, oil, and/or any other type or kind of fossil fuel material or substance, at, near, along, or in the vicinity of, any seams, joints, valves, and/or any other or other location(s) or device or equipment which is, or may be, prone to leakage, in any pipeline or pipelines, or other transport device or equipment, used to transport the same.

In any of the herein-described embodiments, it is noteworthy that any type or kind of bio-fuel(s) or other fuel substance(s) or material(s), such as, but not limited to, ethanol, cooking oil, and/or any other fuel or fuel type, can be utilized by the apparatus and methods of the present invention, along and/or in conjunction with any appropriate and/or suitable electric generator or power generation equipment in order to generate electricity.

FIG. 1 illustrates a preferred embodiment of the apparatus of the present invention, which is denoted generally by the reference numeral 100, in block diagram form. With reference to FIG. 1, the apparatus 100 includes a power management computer 10. In a preferred embodiment, the power management computer 10 is located in, on, or at, the respective vehicle, the premises, or the equipment, in connection with which the apparatus is being utilized or deployed. For example, in a preferred embodiment, if the apparatus 100 is being utilized in connection with, or in conjunction with, a vehicle of any kind of type, the power management computer 10 can be located or situated in or at the vehicle.

In a preferred embodiment, the power management computer 10 can be a computer of any type or kind, and/or can be a microprocessor, a microcomputer, a mini-computer, a personal computer, a server computer, or a mainframe computer. In a preferred embodiment, the power management computer 10 can also be a component of the vehicle computer in the case of a vehicle, a premises computer in a case of a premises being used with the apparatus 100, or an entity computer in a case of any device, system, or equipment, being used with the apparatus 100.

With reference once again to FIG. 1, the apparatus 100 also includes fuel intake/recapture equipment 20 which, in a preferred embodiment, is utilized in order to collect, to capture, to recapture, to recover, and/or to store, natural gas, methane gas, and/or any other type or kind of fossil fuel gas, petroleum, crude oil, oil, and/or any other type or kind of fossil fuel material or substance, which will be captured, recaptured, recovered, and/or to stored, by and with the apparatus 100, and/or which will be utilized by the apparatus 100 in order to generate electricity and/or electrical power.

In a preferred embodiment, the fuel intake/recapture equipment 20 can include gas, liquid, or substance, containment equipment, a collection tank(s), a containment or collection reservoir(s). suction equipment, vacuum equipment, skimming equipment, a pump(s), pump equipment, and/or any other device(s), component(s), or equipment, needed, required, or desired, in and for collecting, capturing, recapturing, recovering, and/or storing, any respective gas, material, or substance, including, but not limited to, natural gas, methane gas, and/or any other type or kind of fossil fuel gas, petroleum, crude oil, oil, and/or any other type or kind of fossil fuel material or substance.

In a preferred embodiment, the fuel intake/recapture equipment 20 can be, or can include, electrically operated and/or controlled components or devices. In a preferred embodiment, the fuel intake/recapture equipment 20 can include separate and/or dedicated equipment for collecting, capturing, recapturing, recovering, and/or storing, each of natural gas, methane gas, and/or any other type or kind of fossil fuel gas, petroleum, crude oil, oil, and/or any other type or kind of fossil fuel material or substance, and/or any combination or group of the same.

In a preferred embodiment, in the case of natural gas, the fuel intake/recapture equipment 20 can include equipment for detecting a natural gas leak, and/or collecting, such as by suction or by vacuuming, the leaked natural gas into a dedicated natural gas storage tank. In a preferred embodiment, in the case of a petroleum, crude oil, or oil, leak or spill, the fuel intake/recapture equipment 20 can include equipment for detecting a spill or leak, and/or collecting, such as by suction, or by vacuuming, or by skimming, the leaked or spilled petroleum, crude oil, or oil, into a dedicated storage tank. In a preferred embodiment, in the case of methane or other gas collection effort, such as the collection of methane gas at and from animal waste or compost collection sites, the fuel intake/recapture equipment 20 can include equipment for detecting gas pressure or volume, and/or collecting, such as by suction or by vacuuming, the respective gas into a dedicated storage tank for the same.

In a preferred embodiment, the operation of the electrical components or devices of the fuel intake/recapture equipment 20 and, therefore, the fuel intake/recapture equipment 20, can be activated, deactivated, disabled, re-enabled, and/or controlled, and/or the operation of the same can be controlled, by or via the power management computer 10. In another preferred embodiment, the operation of the electrical components or devices of the fuel intake/recapture equipment 20 and, therefore, the fuel intake/recapture equipment 20, can be activated, deactivated, disabled, re-enabled, and/or controlled, and/or the operation of the same can also be controlled, by or via the central processing computer 60 of FIG. 1 and/or by or via the user communication device 80 of FIG. 1.

In a preferred embodiment, the fuel intake/recapture equipment 20 can be linked or connected to or with the power management computer 10 via a wired connection, a wireless connection, or via a combination of the same.

With reference once again to FIG. 1, the apparatus also includes an electrical power generator system 30 or any number of electrical power generator systems 30 (hereinafter referred to as "electrical power generator system(s) 30"). In a preferred embodiment, the electrical power generator system(s) 30 can be or can include an electrical generator for generating electricity from natural gas. In a preferred embodiment, the electrical power generator system(s) 30 can be or can include an electrical generator for generating electricity from methane gas or any other type or kind of fossil fuel gas. In a preferred embodiment, the electrical power generator system(s) 30 can be or can include an electrical generator for generating electricity from petroleum, crude oil, oil, and/or any other type or kind of fossil fuel material or substance.

In a preferred embodiment, the electrical power generator system(s) 30 is connected or linked to the power management computer 10 via a wired connection or link, via a wireless connection or link, or via any combination of the same. In a preferred embodiment, the electrical power generator system(s) 30 can be can be activated, deactivated, disabled, re-enabled, and/or controlled, and/or the operation of the same can be controlled, by or via the power management computer 10. In another preferred embodiment, the operation of the electrical power generator system(s) 30 can be activated, deactivated, disabled, re-enabled, and/or controlled, and/or the operation of the same can be controlled, by or via the central processing computer 60 of FIG. 1 and/or by or via the user communication device 80 of FIG. 1.

In a preferred embodiment, the electrical power generator system(s) 30 can also be connected to, or linked with, the fuel intake/recapture equipment 20, via a wired connection or link, via a wireless connection or link, or via any combination of the same.

With reference once again to FIG. 1, the apparatus 100 also includes a power storage/pass-through system 40. In a preferred embodiment, the power storage/pass-through system 40 can include the battery or batteries of the respective vehicle, premises, or equipment, in connection with which the apparatus is being utilized or deployed, and/or the engine, the electric drive motors, and/or any electrical systems, equipment, devices, or accessories, of the respective vehicle, premises, or equipment. In a preferred embodiment, the power storage/pass-through system 40 can also include any number of batteries or storage batteries for storing electricity which is generated by the electrical power generator system(s) 30.

In a preferred embodiment, the power storage/pass-through system 40 can also include any number of types or kinds of power storage systems or devices, or any types of kinds of power storage equipment, which can be utilized to store electricity which is generated by the electrical power generator system(s) 30. In a preferred embodiment, the power storage/pass-through system 40 can also include a power pass-through system which can be utilized to transfer electrical power which is generated by the electrical power generator system(s) 30 directly or indirectly to any electrical power output device, to any electrical power supply device, and/or to any electrical load.

In a preferred embodiment, the power storage/pass-through system 40 is connected or linked to the power management computer 10 and to the electrical power generator system(s) 30 via a wired connection or link, via a wireless connection or link, or via any combination of the same. In a preferred embodiment, the power storage/pass-through system 40 can be can be activated, deactivated, disabled, re-enabled, and/or controlled, and/or the operation of the same can be controlled, by or via the power management computer 10. In another preferred embodiment, the operation of the power storage/pass-through system 40 can be activated, deactivated, disabled, re-enabled, and/or controlled, and/or the operation of the same can also be controlled, by or via the central processing computer 60 of FIG. 1 and/or by or via the user communication device 80 of FIG. 1.

With reference once again to FIG. 1, the apparatus 100 also includes an electrical power output/supply system 50 or any number of electrical power output/supply systems 50 (hereinafter "electrical power output/supply system(s) 50"). In a preferred embodiment, the electrical power output/supply system(s) 50 can be or can include the battery or batteries of the respective vehicle, premises, or equipment, in connection with which the apparatus is being utilized or deployed, so as to recharge the same. In a preferred embodiment, the electrical power output/supply system(s) 50 can be or can include the engine, the ignition system, the electric drive motors, and/or any electrical systems, equipment, devices, or accessories, of the respective vehicle, premises, or equipment.

In a preferred embodiment, the electrical power output/supply system(s) 50 can be, or can include, an output to an external electrical power system, such as, but not limited to, a power system of a separate vehicle, a separate premises, or a separate item of equipment or equipment system. In a preferred embodiment, the electrical power output/supply system(s) 50 can be, or can include, an output to an external electrical power system, such as, but not limited to, a vehicle recharging station or system, a premises recharging station or system, or an equipment recharging station or system. In a preferred embodiment, the electrical power output/supply system(s) 50 can be, or can include, an output to an external electrical power grid which can be used by the public or by a private group or entity.

In a preferred embodiment, the electrical power output/supply system(s) 50 can be, or can include, a blockchain mining computer, a cryptocurrency mining computer, a blockchain transaction processing computer, and/or a cryptocurrency transaction processing computer, and/or any number of the same and/or any combination of the same. In this regard, blockchain mining, cryptocurrency mining, blockchain transaction processing, and/or a cryptocurrency transaction processing, can be performed at the respective vehicle, premises, or equipment with and using electricity and/or electrical power generated by the electrical power generator system(s) 30.

In a preferred embodiment, the electrical power output/supply system(s) 50 is connected or linked to the power management computer 10 and to the power storage/pass-through system 40 via a wired connection or link, via a wireless connection or link, or via any combination of the same. In a preferred embodiment, the electrical power output/supply system(s) 50 can be can be activated, deactivated, disabled, re-enabled, and/or controlled, and/or the operation of the same can be controlled, by or via the power management computer 10. In another preferred embodiment, the operation of the electrical power output/supply system(s) 50 can also be activated, deactivated, disabled, re-enabled, and/or controlled, and/or the operation of the same can be controlled, by or via the central processing computer 60 of FIG. 1 and/or by or via the user communication device 80 of FIG. 1.

With reference to FIG. 1, the apparatus 100 also includes a central processing computer 60. In a preferred embodiment, the central processing computer 60 can be any computer or computer system or can be any server computer or any computer or computer system which can be used in a communication network. Any number of central processing computers 60 can be utilized in conjunction with, or in connection, with the apparatus 100 of the present invention.

In the preferred embodiment, the central processing computer 60 can provide control over the apparatus 100 and can perform any of the various processing services and/or functions described herein as being performed by the apparatus 100 of the present invention. In a preferred embodiment, the central processing computer 60 may be a single computer or system of computers and/or may include a plurality of computers or computer systems which are utilized in conjunction with one another.

In a preferred embodiment, the central processing computer 60 can be linked with each of, or any combination of, the power management computer 10, the fuel intake/recapture equipment 20, the electrical power generator system(s) 30, the power storage/pass-through system 40, and/or the electrical power output/supply system(s) 50, via a wireless connection or link. In a preferred embodiment, the central processing computer 60 can also activate, deactivate, disable, re-enable, and/or control, and/or can control an operation of each of the power management computer 10, the fuel intake/recapture equipment 20, the electrical power generator system(s) 30, the power storage/pass-through system 40, and/or the electrical power output/supply system(s) 50.

With reference once again to FIG. 1, the apparatus 100 also includes a distributed ledger and blockchain technology system 70. In a preferred embodiment, the distributed ledger and blockchain technology system 70 can be any suitable or appropriate blockchain and can utilize any suitable or appropriate blockchain technology, blockchain platform, or blockchain system protocol. In another preferred embodiment, the distributed ledger and blockchain technology system 70 can be a permissioned blockchain.

In another preferred embodiment, the distributed ledger and blockchain technology system 70 can be a permissionless blockchain. In another preferred embodiment, the distributed ledger and blockchain technology system 70 can be a hybrid of a permissioned blockchain and a permissionless blockchain, wherein it can operate as a permissioned blockchain at certain times and as a permissionless blockchain at other times. In another preferred embodiment, the distributed ledger and blockchain technology system 70 can be a proof of work blockchain. In another preferred embodiment, the distributed ledger and blockchain technology system 70 can be a proof of stake blockchain. In another preferred embodiment, the distributed ledger and blockchain technology system 70 can be a hybrid of a proof of work blockchain and a proof of stake blockchain, wherein it can operate as a proof of work blockchain at certain times and as a proof of stake blockchain at other times.

Applicant incorporates by reference herein the subject matter and teachings of "Blockchain Technology Explained" by Alan T. Norman, "Blockchain" by Abraham K. White, "Blockchain—A Practical Guide To Developing Business, Law, And Technology Solutions" by Joseph J. Bambara and Paul R. Allen, and "Blockchain—Ultimate Guide To Understanding Blockchain, Bitcoin, Cryptocurrencies, Smart Contracts And The Future of Money" by Mark Gates, in their entirety, for all of their respective subject matter and teachings regarding distributed ledger technology and/or technologies, Blockchain technology and/or technologies, Bitcoin technology and/or technologies, Bitcoin Blockchain technology and/or technologies, Ethereum technology and/or technologies, Ethereum Blockchain technology and/or technologies, cryptocurrencies, cryptocurrency technology and/or technologies, and/or smart contract technology and/or technologies, and/or decentralized autonomous organizations (DAOs) technologies, and/or peer-to-peer technology and/or technologies, and/or any other technology or technologies related thereto or which can be utilized in conjunction with distributed ledgers, Blockchain technologies, Smart contracts, decentralized autonomous organizations (DAOs), and/or cryptocurrencies.

In a preferred embodiment, the distributed ledger and blockchain technology system 70 can be connected to or linked with the central processing computer 60 via a wired connection or link, via a wireless connection or link, or via any combination of the same. In a preferred embodiment, the central processing computer 60 can also control the operation of the distributed ledger and blockchain technology system 70. In a preferred embodiment, the distributed ledger and blockchain technology system 70 can be connected to or linked with each of, or any combination of, the power management computer 10, the fuel intake/recapture equipment 20, the electrical power generator system(s) 30, the power storage/pass-through system 40, and/or the electrical power output/supply system(s) 50, via a wireless connection or link.

In a preferred embodiment, the distributed ledger and blockchain technology system 70 can be used to process and to store information regarding any transactions or activities involving the apparatus 100 and/or any of the various components of the same.

With reference once again to FIG. 1, the apparatus 100 also includes a user communication device or computer 80 (hereinafter referred to as "user communication device 80" or "user computer 80") which is associated with, or which can be used by, any one or more of any of the herein-described users, individuals, persons, or entities, who or which utilize the apparatus 100 of the present invention.

Any number of user communication devices 80 can be utilized by, or can be associated with, each of the users, individuals, persons, or entities, who or which utilize the apparatus 100 of the present invention. The user communication device 80 can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any user, individual, person, or entity, who or which utilizes the apparatus 100 and method of the present invention. The user communication device 80 can also be a server computer, a mainframe computer, a mini-computer, a microcomputer, or any other computer or device for suiting the needs of the particular user. The user communication device 80 can also be any device or computer, or a kiosk, that can be located at public places or locations or which can also be publicly available. Any number of user communication devices 80 can be utilized in conjunction with, or in connection with, the apparatus 100 of the present invention.

The user communication device(s) 80 can be linked to or with, and/or can communicate, in a bi-directional manner, with, and/or can operate in conjunction with, the central processing computer 60, with the distributed ledger and Blockchain technology system 70, and/or with each of, or any combination of, the power management computer 10, the fuel intake/recapture equipment 20, the electrical power generator system(s) 30, the power storage/pass-through system 40, and/or the electrical power output/supply system(s) 50, via a wireless connection or link.

In the preferred embodiment, the apparatus 100 of the present invention can be utilized on, and/or over, the Internet and/or the World Wide Web. The apparatus 100 of the present invention, in the preferred embodiment, can also utilize wireless Internet and/or World Wide Web services, equipment and/or devices. In a preferred embodiment, each of the power management computer 10 and/or the central processing computer(s) 60 can have a web site or web sites associated therewith.

Although the Internet and/or the World Wide Web is a preferred communication system and/or medium utilized, the apparatus 100 of the present invention, in any and/or all of the embodiments described herein, can also be utilized with any appropriate communication network or system including, but not limited to, a telecommunication network or system, a telephone communication network or system, a cellular communication network or system, a wireless communication network or system, a line or wired communication network or system, a wireless Internet network or system, a wireless World Wide Web network or system, a digital communication network or system, a personal communication network or system, a personal communication services (PCS) network or system, a satellite communication network or system, a broad band communication network or system, a low earth orbiting (LEO) satellite network or system, a public switched telephone network or system, a telephone communication network or system, a radio communication network or system, a cable television network or system, and/or any other communication network or system, and/or any combination of the above communication networks or systems.

Figure 2:
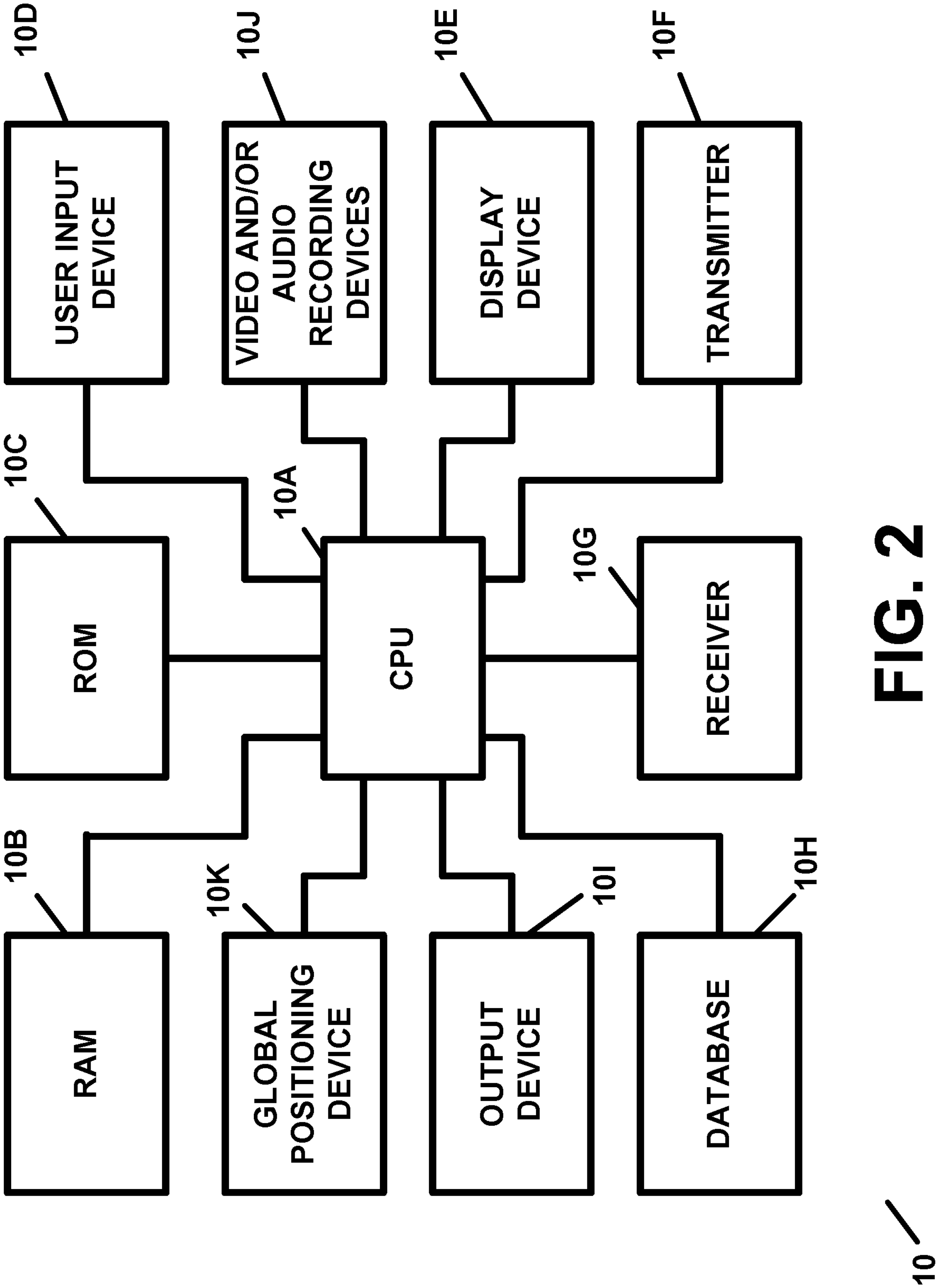
FIG. 2 illustrates the power management computer of FIG. 1, in block diagram form.

FIG. 2 illustrates the power management computer 10 of FIG. 1, in block diagram form. The power management computer 10, in a preferred embodiment, can be a computer of any type or kind, and/or can be a microprocessor, a microcomputer, a mini-computer, a personal computer, a server computer, or a mainframe computer. In a preferred embodiment, the power management computer 10 can also be a component of the vehicle computer in the case of a vehicle, a premises computer in a case of a premises being used with the apparatus 100, or an entity computer in a case of any device, system, or equipment, being used with the apparatus 100. In a preferred embodiment, the power management computer 10 can control and/or monitor, and/or can provide control and/or monitoring functions for and/or regarding, any and/or all of the operations of each, and/or of all of, the fuel intake/recapture equipment 20, the electrical power generator system(s) 30, the power storage/pass-through system 40, and/or the electrical power output/supply system(s) 50.

In a preferred embodiment, the power management computer 10 is located at, on, or in, the respective vehicle, premises, device, system, or equipment, in connection with which it is being used or utilized.

With reference once again to FIG. 2, the power management computer 10 includes a central processing unit or CPU 10A, which, in the preferred embodiment, is a microprocessor. The CPU 10A can also be a microcomputer, a mini-computer, a macro-computer, and/or a mainframe computer, depending upon the application.

The power management computer 10 also includes a random access memory device(s) 10B (RAM) and a read only memory device(s) 10C (ROM), each of which is connected to, or linked with, the CPU 10A, and a user input device 10D, for entering data and/or information and/or commands into the power management computer 10, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the power management computer 10. The user input device(s) 10D is/are also connected to, or linked with, the CPU 10A. The power management computer 10 also includes a display device 10E for displaying data and/or information to a user or operator. The display device 10E is also connected to, or linked with, the CPU 10A.

The power management computer 10 also includes a transmitter(s) 10F, for transmitting signals and/or data and/or information to any one or more of the central processing computer(s) 60, the distributed ledger and Blockchain technology system 70, and/or the user communication device(s) 80, which may be utilized in conjunction with the apparatus 100 of the present invention. The transmitter 10F is also connected to, or linked with, the CPU 10A.

The power management computer 10 also includes a receiver 10G, for receiving signals and/or data and/or information from any one or more of the central processing computer(s) 60, the distributed ledger and Blockchain technology system 70, and/or the user communication device(s) 80, which may be utilized in conjunction with the apparatus 100 of the present invention. The receiver 10G is also connected to, or linked with, the CPU 10A.

The power management computer 10 also includes a database(s) 10H which contains and/or includes any data, information, and/or software programs or software applications ("apps"), any and/or all of the data and/or information required, needed, or desired, for allowing and/or for enabling the power management computer 10 and/or the apparatus 100 to perform any and/or all of the functions and functionalities described herein as being performed, and/or as capable of being performed, by the power management computer 10 and/or the apparatus 100 of the present invention, and/or for providing or for performing any and/or all of the functions and functionalities of a power management system which can perform any and/or all of the functions and/or functionalities described herein as being performed by the apparatus 100 of the present invention. In this regard, the database 10H can contain or include any data, information, and/or software programs or software applications, needed, required, or desired, for performing any processing routine(s), algorithms, and/or functions and/or functionalities, described herein as being performed by the apparatus 100 and/or any components of the same, and/or the power management computer 10 and/or any components of the same. The database 10H can also be connected to the CPU 10A.

The power management computer 10 also includes an output device 10I for outputting any of the data, information, or reports, described herein or otherwise. In the preferred embodiment, the output device 10I can be a printer, a display, a transmitter, a modem, a speaker, and/or any other device which can be used to output data.

The power management computer 10 can also include a video and/or audio recording device(s) 10J which can include a camera and/or a video recording device, for recording pictures or video and/or video clips, and/or a microphone or an audio recording device, for recording audio or audio clips, which can be recorded by, and/or transmitted live, by or from the power management computer 10, or which can be recorded by, and stored at or in, the power management computer 10 for transmission by or from the power management computer 10 at a later time. The video and/or audio recording device(s) 10J can also be utilized to facilitate one-way broadcasts from the power management computer 10, and/or can be utilized to facilitate video conferencing, video chatting, and/or audio conferencing, and/or video and audio conferencing, between users of the power management computer 10 and any of the herein-described users, individuals, persons, or entities, who or which utilize the apparatus 100 of the present invention.

The power management computer 10 can also include a global positioning device 10K. In a preferred embodiment, the global positioning device 10K determines or can determine a position or location of the power management computer 10. In a preferred embodiment, the global positioning device 10K can also be utilized in order to determine a position or location of the respective vehicle, premises, device, system, or equipment, in connection with which the power management computer 10 is being used or utilized.

In a preferred embodiment, the power management computer 10 can also be equipped, and/or can be programmed, for voice activation operation and/or voice control operation of and/or regarding any and/or all of the herein-described operations and functions which are capable of being performed by the power management computer 10 and/or the various other components of the apparatus 100, including, but not limited to, each of, and/or all of, the fuel intake/recapture equipment 20, the electrical power generator system(s) 30, the power storage/pass-through system 40, and/or the electrical power output/supply system(s) 50.

Figure 3:
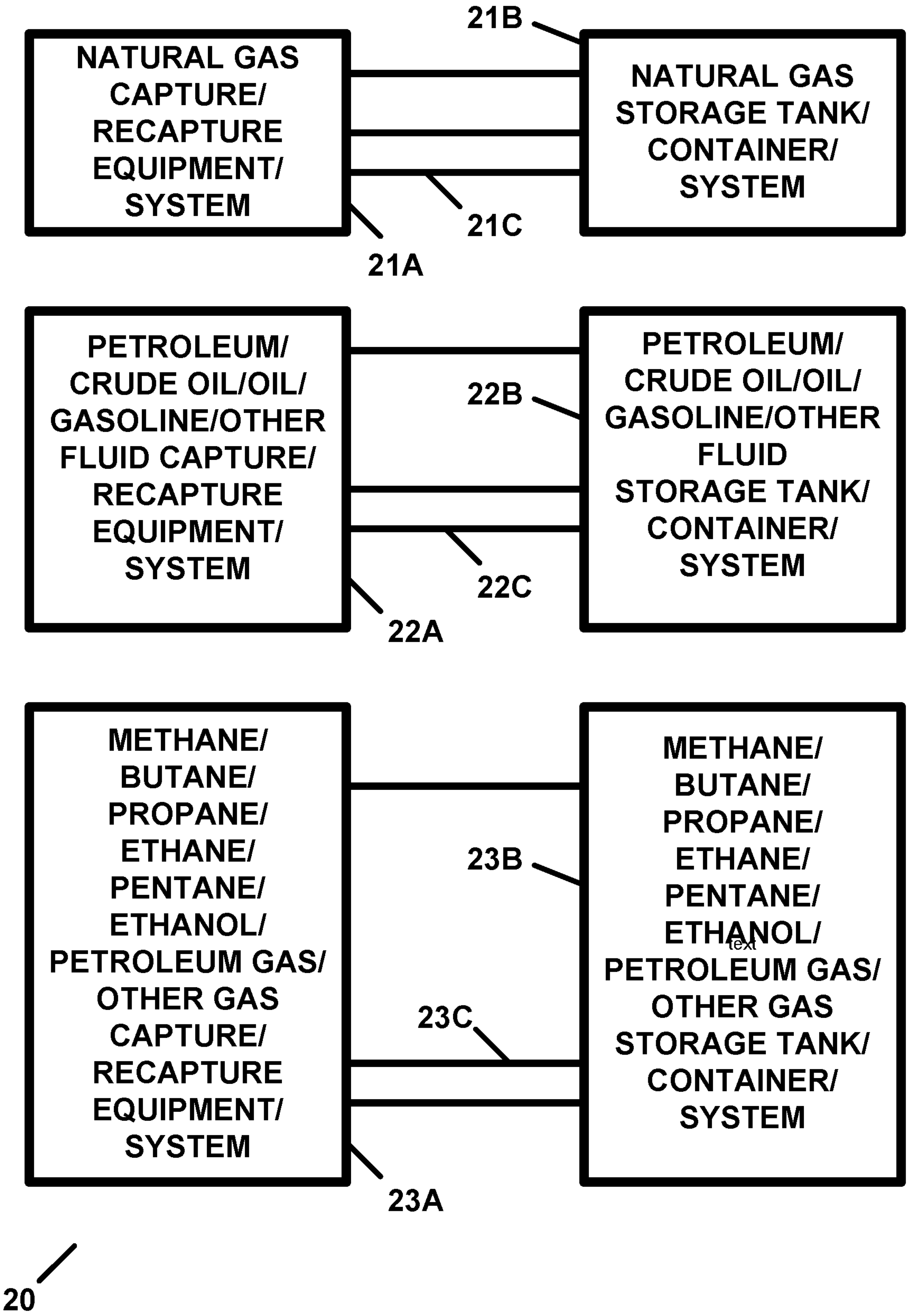
FIG. 3 illustrates the fuel intake/recapture equipment of FIG. 1, in block diagram form.

FIG. 3 illustrates the fuel intake/recapture equipment 20 of FIG. 1, in block diagram form. In a preferred embodiment, the apparatus 100 and methods of the present invention can be utilized to collect, accumulate, capture, recapture, and/or store, any type of kind of fuel which can be utilized to generate electricity. In this regard, the term "fuel" as used in the present application, means and refers to, but is not limited to, any gas, liquid, substance, or material, which can be produced in nature or is produced naturally and/or by nature, can exist in nature or exists in nature, is derived from plants or organic matter or can be derived from plants or organic matter, can be man-made or is man-made, or can be produced by, can be derived from, or can be a wasted product of the same, which can be used to generate electricity or electrical power, or which can be used to produce electricity or electrical power.

The term "fuel" also means and/or refers to natural gas, natural gases or any type or kind, petroleum, crude oil, oil, gasoline, other flammable fluids, materials, or substances, methane, butane, propane, ethane, pentane, ethanol, petroleum gas, or any other type or flammable gas, or any other type or kind of fuel known to those skilled in the art, or biofuel of any type or kind and/or any waste product of the same, cooking oil, industrial waste oil (such as from machinery oil changes and/or vehicle oil changes), and/or any other type or kind of biofuel of biofuels known to those skilled in the art. The term "fuel" also means and/or refers to methane gas or any other gas or gases, or any liquid form(s) of the same, which are produced at and/or by, or which are released by or at, landfills, garbage dumps, animal waste pits or waste lagoons, livestock waste pits or waste lagoons, pig or hog waste pits or waste lagoons, cattle or cow waste pits or waste lagoons, biomass tanks, oil well vents, natural gas well or deposit vents, or any other types or kinds of gas, liquid, substance, or material, which can be used to generate or to produce electricity or electrical power.

With reference to FIG. 3, the fuel intake/recapture equipment 20, in a preferred embodiment, can include any type or kind of equipment, containers, containment devices, pipeline covers, tank covers, landfill liners, valve covers and/or gas containment devices and/or systems for gas valves for gas lines or gas pipelines, gas tanks or gas containers, valves covers for and/or containment devices and/or systems for liquid or fluid tanks or containers or lines or pipelines, seam covers for gas lines or gas pipelines, or seam covers for liquid or fluid lines or pipelines, and/or any covers, containers, or containment devices or tanks, at points or locations of expected or potential leaks of any gas, fluid, or liquid fuel.

In a preferred embodiment, the fuel intake/recapture equipment 20, in a preferred embodiment, can also include any type or kind of booms and/or other barriers for preventing the spreading of an oil spill or other fuel spill, skimmers and/or vacuums for collecting fuel that has spilled or escaped, equipment used in on-site or in situ burning, or flaring of, of escaping gas or liquid fuel, land fill liners or land fill tents with associated gas valves to allow gases to be taken or obtained therefrom, domes and valves used in connection with biomass tanks, tents or coverings placed over landfills, garbage dumps, animal waste pits or waste lagoons, livestock waste pits or waste lagoons, pig or hog waste pits or waste lagoons, cattle or cow waste pits or waste lagoons, and associate valves for allowing gases to be taken or obtained therefrom, and/or oil well vent tents and/or natural gas vent tents and associated valves for allowing gases to be taken or obtained therefrom. In a preferred embodiment, the fuel intake/recapture equipment 20 can also include any device, article, entity, or equipment, which can be utilized in order to collect, contain, capture, recover, recapture, and/or store, any of the fuel of fuels described herein or otherwise which can be utilized in order to generate or to produce electricity or electrical power.

With reference to FIG. 3, the fuel intake/recapture equipment 20, in a preferred embodiment, includes a natural gas capture/recapture equipment/system 21A, which, in a preferred embodiment, can be or can include any device(s) or equipment described herein or otherwise for capturing, recapturing, collecting, and/or recovering, natural gas which is leaking, which has leaked, or which is otherwise made available for generating or for producing electricity or electrical power. The fuel intake/recapture equipment 20, in a preferred embodiment, also includes a natural gas storage tank/container/system 21B for storing the natural gas which is captured, recaptured, collected, and/or recovered, and/or which is otherwise made available for generating or for producing electricity or electrical power.

In a preferred embodiment, the natural gas capture/recapture equipment/system 21A and the natural gas storage tank/container/system 21B can be connected via a pipeline 21C shown in FIG. 3. In a preferred embodiment, natural gas flows from the natural gas capture/recapture equipment/system 21A to the natural gas storage tank/container/system 21B via the pipeline 21C. In a preferred embodiment, the natural gas capture/recapture equipment/system 21A and the natural gas storage tank/container/system 21B are also connected or linked with each other electrically via a wired connection, a wireless connection, or any combination of the same.

With reference to FIG. 3, the fuel intake/recapture equipment 20, in a preferred embodiment, includes a petroleum/crude oil/oil/gasoline/other fluid capture/recapture equipment/system 22A, which, in a preferred embodiment, can be or can include any device(s) or equipment described herein or otherwise for capturing, recapturing, collecting, and/or recovering, petroleum, crude oil, oil, gasoline, or any other fluid, which is leaking, which has leaked, or which is otherwise made available for generating or for producing electricity or electrical power. The fuel intake/recapture equipment 20, in a preferred embodiment, also includes a petroleum/crude oil/oil/gasoline/other fluid storage tank/container/system 22B for storing the petroleum, crude oil, oil, gasoline, or any other fluid, which is captured, recaptured, collected, and/or recovered, and/or which is otherwise made available for generating or for producing electricity or electrical power.

With reference once again to FIG. 3, in a preferred embodiment, the petroleum/crude oil/oil/gasoline/other fluid capture/recapture equipment/system 22A and the petroleum/crude oil/oil/gasoline/other fluid storage tank/container/system 22B can be connected via a pipeline 22C shown in FIG. 3. In a preferred embodiment, the petroleum, crude oil, oil, gasoline, or any other fluid, flows from the petroleum/crude oil/oil/gasoline/other fluid capture/recapture equipment/system 22A to the petroleum/crude oil/oil/gasoline/other fluid storage tank/container/system 22B via the pipeline 22C. In a preferred embodiment, the petroleum/crude oil/oil/gasoline/other fluid capture/recapture equipment/system 22A and the petroleum/crude oil/oil/gasoline/other fluid storage tank/container/system 22B are also connected or linked with each other electrically via a wired connection, a wireless connection, or any combination of the same.

With reference to FIG. 3, the fuel intake/recapture equipment 20, in a preferred embodiment, includes a methane/butane/propane/ethane/pentane/ethanol/petroleum gas/other gas capture/recapture equipment/system 23A, which, in a preferred embodiment, can be or can include any device(s) or equipment described herein or otherwise for capturing, recapturing, collecting, and/or recovering, methane, butane, propane, ethane, pentane, ethanol, petroleum gas, or other gas, which is leaking, which has leaked, or which is otherwise made available for generating or for producing electricity or electrical power. The fuel intake/recapture equipment 20, in a preferred embodiment, also includes a methane/butane/propane/ethane/pentane/ethanol/petroleum gas/other gas storage tank/container/system 23B for storing the methane, butane, propane, ethane, pentane, ethanol, petroleum gas, or other gas, which is captured, recaptured, collected, and/or recovered, and/or which is otherwise made available for generating or for producing electricity or electrical power.

With reference once again to FIG. 3, in a preferred embodiment, the methane/butane/propane/ethane/pentane/ethanol/petroleum gas/other gas capture/recapture equipment/system 23A and the methane/butane/propane/ethane/pentane/ethanol/petroleum gas/other gas storage tank/container/system 23B can be connected via a pipeline 23C shown in FIG. 3. In a preferred embodiment, the methane, butane, propane, ethane, pentane, ethanol, petroleum gas, or other gas, flows from the methane/butane/propane/ethane/pentane/ethanol/petroleum gas/other gas capture/recapture equipment/system 23A to the methane/butane/propane/ethane/pentane/ethanol/petroleum gas/other gas storage tank/container/system 23B via the pipeline 23C.

In a preferred embodiment, the methane/butane/propane/ethane/pentane/ethanol/petroleum gas/other gas capture/recapture equipment/system 23A and the methane/butane/propane/ethane/pentane/ethanol/petroleum gas/other gas storage tank/container/system 23B are also connected or linked with each other electrically via a wired connection, a wireless connection, or any combination of the same.

In a preferred embodiment, any device, component, or equipment, of, and/or the entirety of, the natural gas capture/recapture equipment/system 21A, the petroleum/crude oil/oil/gasoline/other fluid capture/recapture equipment/system 22A, or the methane/butane/propane/ethane/pentane/ethanol/petroleum gas/other gas capture/recapture equipment/system 23A, can be a component of, or can be located on, in, or at, or can be located externally from, or can be separate and/or apart from, the respective vehicle, premises, or equipment, in connection, or in conjunction, with which the apparatus 100 of the present invention, or any component(s) or equipment of the same, is being utilized.

In a preferred embodiment, any device, component, or equipment, of, and/or the entirety of, the natural gas storage tank/container/system 21B, the petroleum/crude oil/oil/gasoline/other fluid storage tank/container/system 22B, or the methane/butane/propane/ethane/pentane/ethanol/petroleum gas/other gas storage tank/container/system 23B, can be a component of, or can be located on, in, or at, or can be located externally from, or can be separate and/or apart from, the respective vehicle, premises, or equipment, in connection, or in conjunction, with which the apparatus 100 of the present invention, or any component(s) or equipment of the same, is being utilized.

Figure 4:
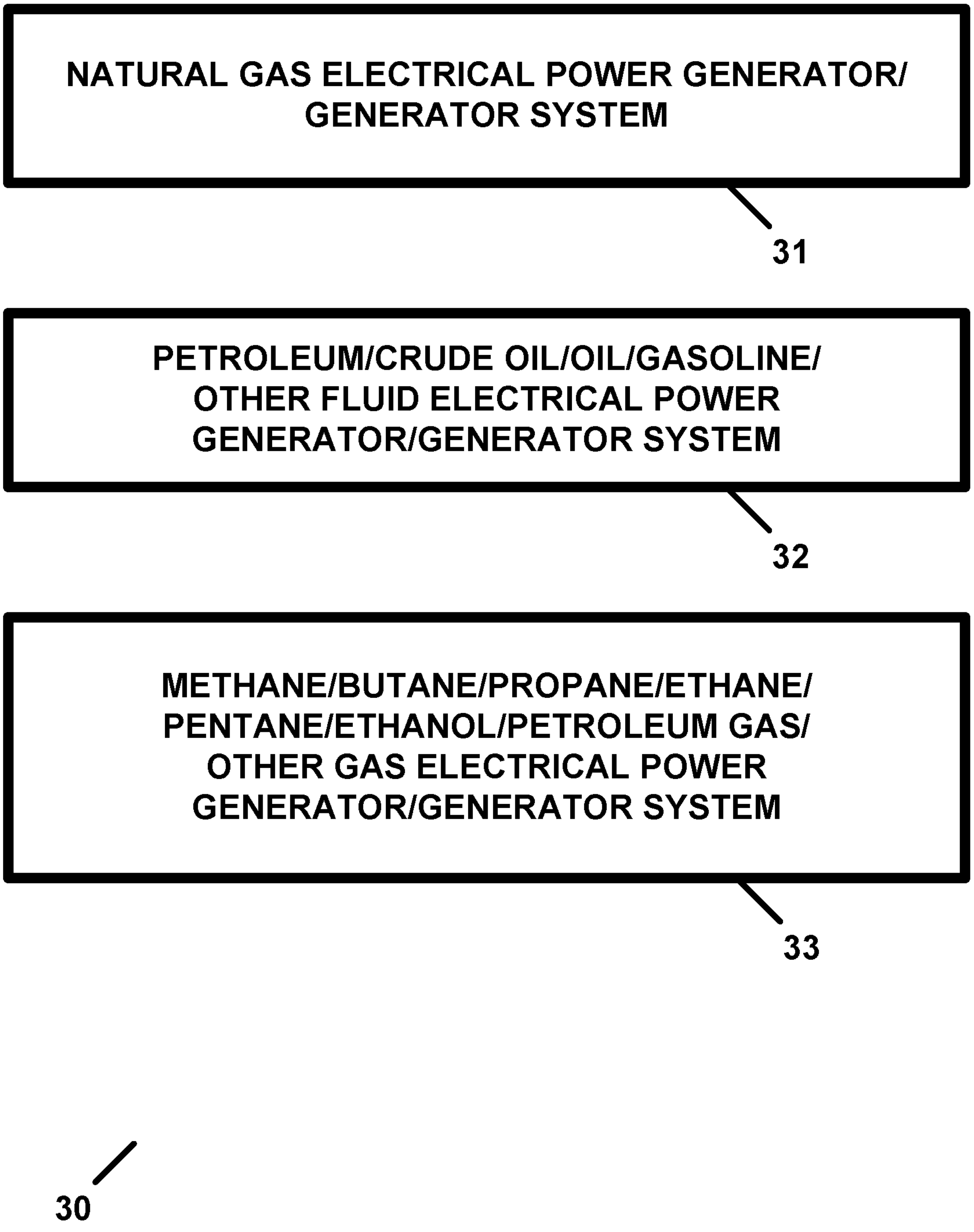
FIG. 4 illustrates the electrical power generator system(s) of the apparatus of FIG. 1, in block diagram form.

FIG. 4 illustrates the electrical power generator system(s) 30 of the apparatus 100 of FIG. 1. With reference to FIG. 4, the electrical power generator system(s) 30 includes a natural gas electrical power generator/generator system 31 which generates electricity and/or electrical power from, with, or using, the natural gas stored in the natural gas storage tank/container/system 21B.

In a preferred embodiment, the natural gas electrical power generator/generator system 31 can be configured, and/or can be equipped, to provide a direct current (DC) output or an alternating current (AC) output, and/or can be configured to switch from a DC output to an AC output and vice versa.

In a preferred embodiment, the natural gas, which is stored in the natural gas storage tank/container/system 21B, is supplied by and transferred from the natural gas storage tank/container/system 21B to the natural gas electrical power generator/generator system 31 via an appropriate gas line (not shown) or pipeline (not shown) which runs between the natural gas storage tank/container/system 21B and the natural gas electrical power generator/generator system 31.

With reference once again to FIG. 4, the electrical power generator system(s) 30 includes a petroleum/crude oil/oil/gasoline/other fluid electrical power generator/generator system 32 which generates electricity from, with, or using, the respective petroleum, crude oil, oil, gasoline, or other fluid, which is stored in the petroleum/crude oil/oil/gasoline/other fluid storage tank/container/system 22B.

In a preferred embodiment, the petroleum/crude oil/oil/gasoline/other fluid electrical power generator/generator system 32 can be configured, and/or can be equipped, to provide a direct current (DC) output or an alternating current (AC) output, and/or can be configured to switch from a DC output to an AC output and vice versa.

In a preferred embodiment, the respective petroleum, crude oil, oil, gasoline, or other fluid, which is stored in the petroleum/crude oil/oil/gasoline/other fluid storage tank/container/system 22B, is supplied by and transferred from the petroleum/crude oil/oil/gasoline/other fluid storage tank/container/system 22B to the petroleum/crude oil/oil/gasoline/other fluid electrical power generator/generator system 32 via an appropriate pipeline (not shown) which runs between the petroleum/crude oil/oil/gasoline/other fluid storage tank/container/system 22B and the petroleum/crude oil/oil/gasoline/other fluid electrical power generator/generator system 32.

With reference once again to FIG. 4, the electrical power generator system(s) 30 includes a methane/butane/propane/ethane/pentane/ethanol/petroleum gas/other gas electrical power generator/generator system 33 which generates electricity from, with, or using, the respective methane, butane, propane, ethane, pentane, ethanol, petroleum gas, or other gas, which is stored in the methane/butane/propane/ethane/pentane/ethanol/petroleum gas/other gas storage tank/container/system 23B.

In a preferred embodiment, the methane/butane/propane/ethane/pentane/ethanol/petroleum gas/other gas electrical power generator/generator system 33 can be configured, and/or can be equipped, to provide a direct current (DC) output or an alternating current (AC) output, and/or can be configured to switch from a DC output to an AC output and vice versa.

In a preferred embodiment, the respective methane, butane, propane, ethane, pentane, ethanol, petroleum gas, or other gas, which is stored in the methane/butane/propane/ethane/pentane/ethanol/petroleum gas/other gas storage tank/container/system 23B, is supplied by and transferred from the methane/butane/propane/ethane/pentane/ethanol/petroleum gas/other gas storage tank/container/system 23B to the methane/butane/propane/ethane/pentane/ethanol/petroleum gas/other gas electrical power generator/generator system 33 via an appropriate gas line (not shown) or pipeline (not shown) which runs between the ethane/butane/propane/ethane/pentane/ethanol/petroleum gas/other gas storage tank/container/system 23B and the methane/butane/propane/ethane/pentane/ethanol/petroleum gas/other gas electrical power generator/generator system 33.

In a preferred embodiment, each of the natural gas electrical power generator/generator system 31, the petroleum/crude oil/oil/gasoline/other fluid electrical power generator/generator system 32, or the methane/butane/propane/ethane/pentane/ethanol/petroleum gas/other gas electrical power generator/generator system 33, can be a component of, or can be located on, in, or at, the respective vehicle, premises, or equipment, in connection, or in conjunction, with which the apparatus 100 of the present invention, or any component(s) or equipment of the same, is being utilized. In a preferred embodiment, each of the natural gas electrical power generator/generator system 31, the petroleum/crude oil/oil/gasoline/other fluid electrical power generator/generator system 32, or the methane/butane/propane/ethane/pentane/ethanol/petroleum gas/other gas electrical power generator/generator system 33, can also be located externally from, or can be separate and/or apart from, the respective vehicle, premises, or equipment, in connection, or in conjunction, with which the apparatus 100 of the present invention, or any component(s) or equipment of the same, is being utilized.

Figure 5:
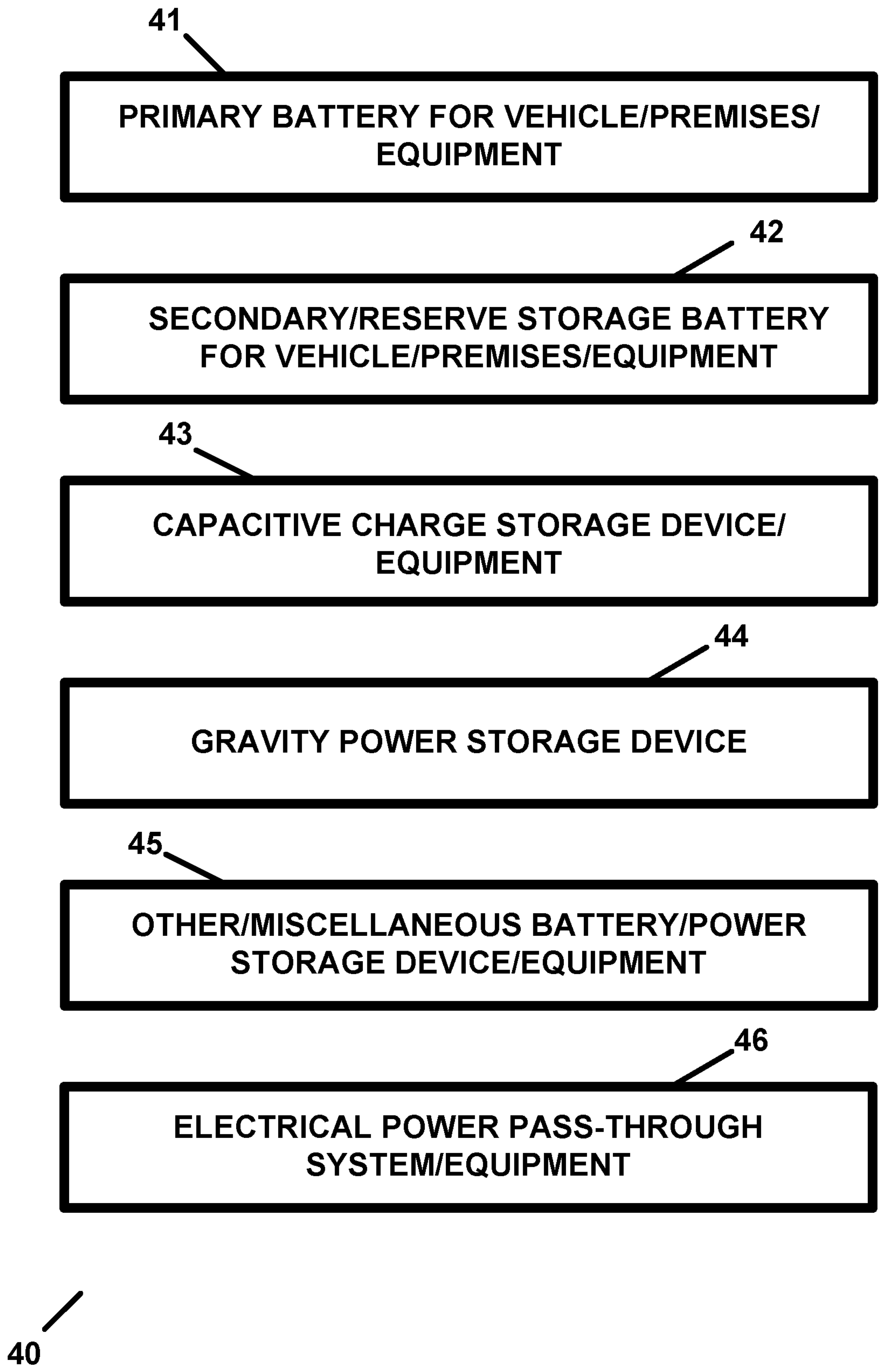
FIG. 5 illustrates the power storage/pass-through system of the apparatus of FIG. 1, in block diagram form.

FIG. 5 illustrates the power storage/pass-through system 40 of the apparatus 100 of FIG. 1, in block diagram form. In a preferred embodiment, the power storage/pass-through system 40 can provide for the storage of the electrical power which is generated by the electrical power generator system(s) 30, or any one of more of the natural gas electrical power generator/generator system 31, the petroleum/crude oil/oil/gasoline/other fluid electrical power generator/generator system 32, or the methane/butane/propane/ethane/pentane/ethanol/petroleum gas/other gas electrical power generator/generator system 33, of the same.

In a preferred embodiment, the power storage/pass-through system 40 can provide for pass-through of the electrical power, which is generated by the electrical power generator system(s) 30, or any one of more of the natural gas electrical power generator/generator system 31, the petroleum/crude oil/oil/gasoline/other fluid electrical power generator/generator system 32, or the methane/butane/propane/ethane/pentane/ethanol/petroleum gas/other gas electrical power generator/generator system 33, of the same, to any electrical devices, systems, or equipment, for its immediate use or for its present use or real-time use.

With reference to FIG. 5, the power storage/pass-through system 40 can include a primary battery for vehicle, premises, or equipment 41 (hereinafter "primary battery for vehicle/premises/equipment 41"), which is a primary battery for the respective vehicle, premises, or equipment, in connection with, or in conjunction with, which the apparatus 100 of the present invention, or any of its components, is/are being utilized. For example, in the case of an electric vehicle or a hybrid vehicle which is utilized in connection with, or on conjunction with, the apparatus 100, the primary battery for vehicle/premises/equipment 41 can be the main battery or primary battery for powering the electric vehicle's or the hybrid vehicle's electric drive motor or drive motors and/or any ignition system, and/or any other electrical systems, devices, accessories, or equipment, of the respective vehicle. In a preferred embodiment, the primary battery for vehicle/premises/equipment 41 is located at, in, or on, the respective vehicle, premises, or equipment.

In a preferred embodiment, the primary battery for vehicle/premises/equipment 41 can be charged or recharged by receiving and storing DC electrical power which is generated by the electrical power generator system(s) 30, or any one of more of the natural gas electrical power generator/generator system 31, the petroleum/crude oil/oil/gasoline/other fluid electrical power generator/generator system 32, or the methane/butane/propane/ethane/pentane/ethanol/petroleum gas/other gas electrical power generator/generator system 33, of the same.

With reference once again to FIG. 5, the power storage/pass-through system 40 can include a secondary or reserve storage battery for vehicle, premises, or equipment 42 (hereinafter "secondary/reserve storage battery for vehicle/premises/equipment 42"), which is a secondary or reserve battery or a back-up battery for the respective vehicle, premises, or equipment, in connection with, or in conjunction with, which the apparatus 100 of the present invention, or any of its components, is/are being utilized. For example, in the case of an electric vehicle or a hybrid vehicle which is utilized in connection with, or on conjunction with, the apparatus 100, the secondary/reserve storage battery for vehicle/premises/equipment 42 can be the reserve battery or the back-up battery for powering the electric vehicle's or the hybrid vehicle's electric drive motor or drive motors and/or any ignition system, and/or any other electrical systems, devices, accessories, or equipment, of the respective vehicle. In a preferred embodiment, any number of secondary/reserve storage battery for vehicle/premises/equipment 42 can be utilized at the respective vehicle, premises, or equipment. In a preferred embodiment, the secondary/reserve storage battery for vehicle/premises/equipment 42, or any number of the same, is located at, in, or on, the respective vehicle, premises, or equipment.

In a preferred embodiment, the secondary/reserve storage battery for vehicle/premises/equipment 42 can be charged or recharged by receiving and storing DC electrical power which is generated by the electrical power generator system(s) 30, or any one of more of the natural gas electrical power generator/generator system 31, the petroleum/crude oil/oil/gasoline/other fluid electrical power generator/generator system 32, or the methane/butane/propane/ethane/pentane/ethanol/petroleum gas/other gas electrical power generator/generator system 33, of the same.

With reference once again to FIG. 5, the power storage/pass-through system 40 can include a capacitive charge storage device or equipment 43 (hereinafter "capacitive charge storage device or equipment 43"), or any number of the same. In a preferred embodiment, the capacitive charge storage device or equipment 43 can receive and can store DC electrical power which is generated by the electrical power generator system(s) 30, or any one of more of the natural gas electrical power generator/generator system 31, the petroleum/crude oil/oil/gasoline/other fluid electrical power generator/generator system 32, or the methane/butane/propane/ethane/pentane/ethanol/petroleum gas/other gas electrical power generator/generator system 33, of the same. In a preferred embodiment, the capacitive charge storage device or equipment 43 can receive and can store the DC electrical power, which can thereafter be transferred as DC power to any other DC powered device, system, or equipment, at, on, or in, the respective vehicle, premises, or equipment, and/or to any DC powered device, system, or equipment, which is external from, or separate and apart from, the vehicle. In a preferred embodiment, the capacitive charge storage device or equipment 43 can receive and can store the DC electrical power, which can thereafter be converted to AC power (with and using a DC to AC converter associated with the capacitive charge storage device or equipment 43 (not shown)) in order to provide AC power to any AC powered device, system, or equipment, at, on, or in, the respective vehicle, premises, or equipment, and/or to any AC powered device, system, or equipment, which is external from, or separate and apart from, the vehicle.

In a preferred embodiment, it is also important to note that any of the primary battery for vehicle/premises/equipment 41 and/or the secondary/reserve storage battery for vehicle/premises/equipment 42 can also be equipped with a DC to AC converter so as to provide AC power from the same.

With reference once again to FIG. 5, the power storage/pass-through system 40 can include a gravity power storage device 44 which can receive DC power or AC power which is generated by the electrical power generator system(s) 30, or any one of more of the natural gas electrical power generator/generator system 31, the petroleum/crude oil/oil/gasoline/other fluid electrical power generator/generator system 32, or the methane/butane/propane/ethane/pentane/ethanol/petroleum gas/other gas electrical power generator/generator system 33, of the same. In a preferred embodiment, the gravity power storage device 44 utilizes the DC power or AC power which is generated by the electrical power generator system(s) 30, or any one of more of the natural gas electrical power generator/generator system 31, the petroleum/crude oil/oil/gasoline/other fluid electrical power generator/generator system 32, or the methane/butane/propane/ethane/pentane/ethanol/petroleum gas/other gas electrical power generator/generator system 33, of the same, in order to effectuate the lifting a weight or any number of weights, in order to convert the DC power or AC power into potential energy. When needed, power can be generated, with either DC power or AC power being generated, by causing the weight or weights to drop, thereby driving a separate electrical generator (not shown) of the gravity power storage device 44 in order to generate electricity or electrical power on demand and/or any time.

In a preferred embodiment, the gravity power storage device 44 can provide either DC power or AC power (with and using a DC to AC converter or AC to DC converter as needed) in order to provide DC power or AC power to any device, system, or equipment, at, on, or in, the respective vehicle, premises, or equipment, and/or to any device, system, or equipment, which is external from, or separate and apart from, the vehicle. In another preferred embodiment, the gravity power storage device 44 can also be utilized in order to pump water to a top of a reservoir of a hydroelectric dam, or to a top or an appropriately equipped water tower. Upon a subsequent release of the water from the stored height, the water can be used to drive an electric generator or electric generators in order to generate electricity or electrical power.

In a preferred embodiment, the gravity power storage device 44, or any components of the same, can be located at, on, in, or adjacent to, the respective vehicle, premises, or equipment, in connection with, or in conjunction with, which the apparatus 100 is being utilized.

With reference once again to FIG. 5, the power storage/pass-through system 40 can also include any other suitable or miscellaneous battery power storage device or equipment 45 (hereinafter "other/miscellaneous battery/power storage device/equipment 45"). In a preferred embodiment, the other/miscellaneous battery/power storage device/equipment 45 can receive and store DC power or AC power generated by the electrical power generator system(s) 30, or any one of more of the natural gas electrical power generator/generator system 31, the petroleum/crude oil/oil/gasoline/other fluid electrical power generator/generator system 32, or the methane/butane/propane/ethane/pentane/ethanol/petroleum gas/other gas electrical power generator/generator system 33, of the same, and can thereafter provide DC or AC power, whichever is needed, to any electrical device, system, component, accessory, or equipment, of the respective vehicle, premises, or equipment, or to any electrical device, system, component, accessory, or equipment, which is external from, or separate and apart from, the respective vehicle, premises, or equipment.

With reference once again to FIG. 5, the power storage/pass-through system 40 can also include an electrical power pass-through system or equipment 46 (hereinafter "electrical power pass-through system/equipment 46"). In a preferred embodiment, the electrical power pass-through system/equipment 46 contains any appropriate and/or suitable circuitry and/or equipment for providing DC power and/or AC power to any electrical device, computer, system, component, accessory, or equipment, of the respective vehicle, premises, or equipment, and/or to any electrical device, computer system, component, accessory, or equipment, which is external from, or separate and apart from, the respective vehicle, premises, or equipment. In a preferred embodiment, the electrical power pass-through system/equipment 46 provides electrical power to any respective electrical device, computer system, component, accessory, or equipment, and/or to any combination of, or plurality of, electrical devices, computer systems, components, accessories, or equipment, without storing the same and/or in a so-call "pass-through" manner or fashion.

In this regard, in a preferred embodiment, the electrical power pass-through system/equipment 46 receives the DC power or AC power, generated by the electrical power generator system(s) 30, or any one of more of the natural gas electrical power generator/generator system 31, the petroleum/crude oil/oil/gasoline/other fluid electrical power generator/generator system 32, or the methane/butane/propane/ethane/pentane/ethanol/petroleum gas/other gas electrical power generator/generator system 33, of the same, and provides the same, as DC power or AC power, to those respective electrical devices, computer systems, components, accessories, or equipment, which are being powered by the electrical power pass-through system/equipment 46.

In a preferred embodiment, the electrical power pass-through system/equipment 46 provides electrical power it receives, without storing the same, immediately, in the present moment, and/or in real-time, the respective electrical devices, computer systems, components, accessories, or equipment, which are to be powered by the electrical power pass-through system/equipment 46.

In a preferred embodiment, the power storage/pass-through system 40 can provide electrical power at the respective vehicle, premises, or equipment, and/or the power storage/pass-through system 40 can provide electrical power to systems, components, devices, and equipment, which is external from the respective vehicle, premises, or equipment; and/or the power storage/pass-through system 40 can be used to provide electrical power to another electrical vehicle or hybrid vehicle, or to any combustion engine vehicle; and/or the power storage/pass-through system 40 can be used to provide electrical power to a premises or equipment; and/or the power storage/pass-through system 40 can be used to provide electrical power to a public electrical supply energy grid; and/or the power storage/pass-through system 40 can be used to provide electrical power to a private electrical supply energy grid; and/or the power storage/pass-through system 40 can be used to provide electrical power to a blockchain mining computer, a blockchain computer for mining or creating new blocks in a blockchain, a blockchain mining computer for processing blockchain transactions, and/or any other computer or computer system which performs processing routines on, for, or relating to a blockchain or a crytocurrency; and/or the power storage/pass-through system 40 can be used to provide electrical power to a stationary power supply for recharging electric vehicles or hybrid vehicles; and/or the power storage/pass-through system 40 can be used to provide recharge stationary electric vehicles or hybrid vehicles; and/or the power storage/pass-through system 40 can be used to provide recharge electric vehicles or hybrid vehicles when and while the same are moving or in motion.

Figure 6:
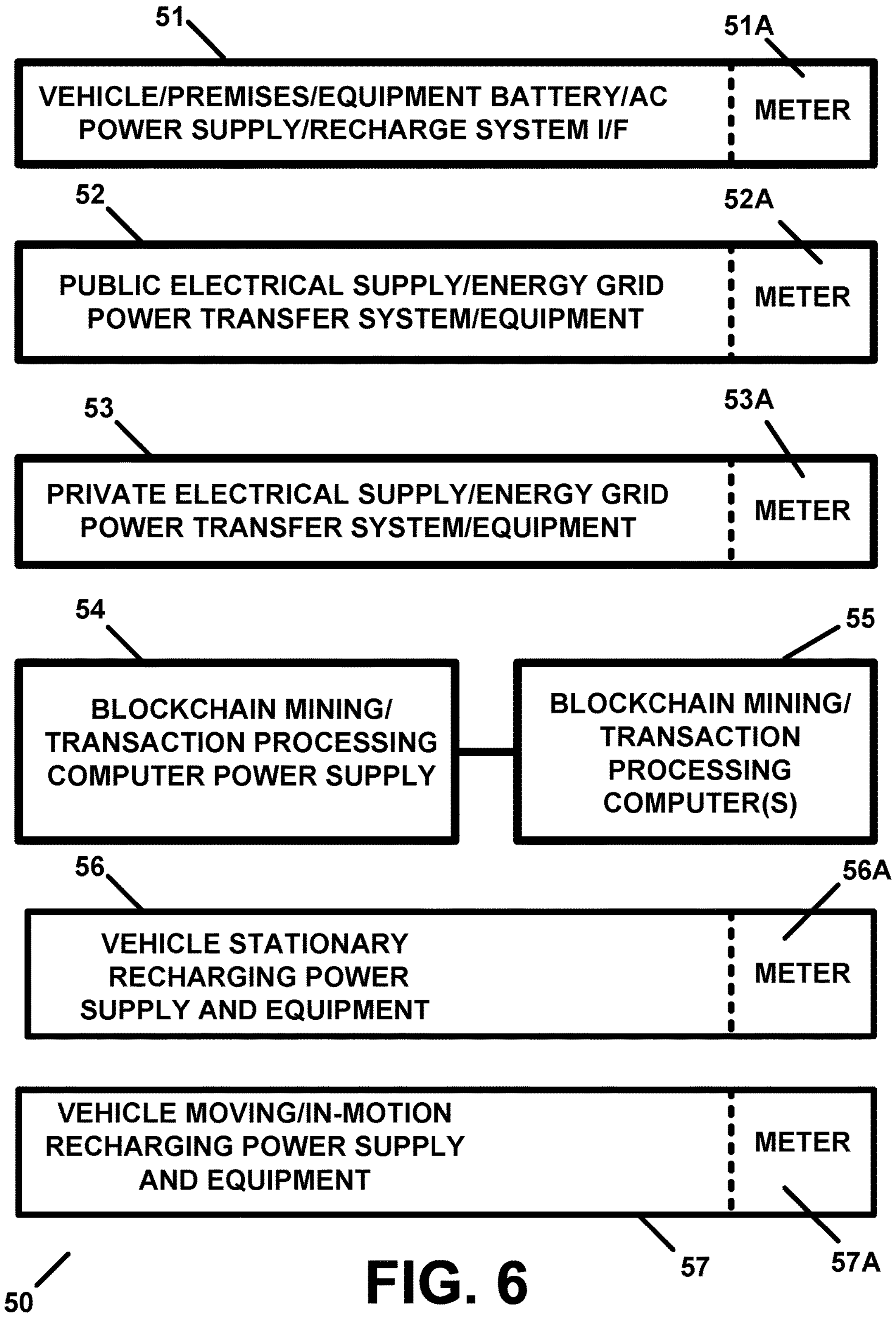
FIG. 6 illustrates the electrical power output/supply system(s) of the apparatus of FIG. 1, in block diagram form.

FIG. 6 illustrates the electrical power output/supply system(s) 50 of the apparatus of FIG. 1, in block diagram form. In a preferred embodiment, the apparatus 100 can be utilized to use, or to provide or to supply for use, and/or to provide, any electricity or electrical power generated by the electrical power generator system(s) 30 in a variety of ways, including, but not limited to, providing electricity or electrical power to a battery or AC power supply system of another or other vehicle, premises, or equipment, providing electricity or electrical power to a public electrical supply energy grid, providing electricity or electrical power to a private electrical supply energy grid, performing blockchain mining processing or blockchain transaction processing, providing electricity or electrical power to recharge a stationary electric vehicle or hybrid vehicle, and/or providing electricity or electrical power to recharge a moving or in-motion electric vehicle or hybrid vehicle, and/or providing electricity or electrical for any other appropriate use.

With reference to FIG. 6, the electrical power output/supply system(s) 50 includes a vehicle, premises, or equipment battery/AC power supply and recharge system interface (I/F) (hereinafter referred to as the "vehicle/premises/equipment battery/AC power supply/recharge system I/F 51"). In a preferred embodiment, the vehicle/premises/equipment battery/AC power supply/recharge system I/F 51 includes all of the devices, components, system, and/or equipment, needed or required for providing or supplying either DC power or AC power to a respective battery or AC power supply system of another, or any other vehicle, premises, or equipment, external from the vehicle, premises, or equipment, in connection with, or in conjunction with, which the apparatus 100 is being utilized.

In a preferred embodiment, the vehicle/premises/equipment battery/AC power supply/recharge system I/F 51 also includes an electrical meter 51A (hereinafter "meter 51A") for measuring the amount of electrical power delivered to the other vehicle, premises, or equipment. In this regard, in a preferred embodiment, the apparatus 100 of the present invention can be used on or in connection with one particular vehicle, premises, or equipment, can provide electricity or electrical power to any other vehicle, premises, or equipment. In a preferred embodiment, the meter 51A can measure the amount of electricity or electrical power supplied or provided to the other vehicle, premises, or equipment, for recordkeeping purposes, for billing purposes, and/or for any other reason or purpose.

With reference once again to FIG. 6, the electrical power output/supply system(s) 50 can also include a public electrical supply energy and/or grid power transfer system or equipment 52 (hereinafter "public electrical supply/energy grid power transfer system/equipment 52"). In a preferred embodiment, the public electrical supply/energy grid power transfer system/equipment 52 includes all of the devices, components, system, and/or equipment, needed or required for providing or supplying, or transferring, electricity or electrical power (either DC power, AC power, or both) to a public electrical supply or public energy grid.

In a preferred embodiment, the public electrical supply/energy grid power transfer system/equipment 52 also includes an electrical meter 52A (hereinafter "meter 52A") for measuring the amount of electrical power delivered to the public electrical supply or public energy grid. In this regard, in a preferred embodiment, the apparatus 100 of the present invention can be used to provide, supply, or transfer, electricity or electrical power to public electrical supply or public energy grid. In a preferred embodiment, the meter 52A can measure the amount of electricity or electrical power supplied, provided, or transferred, to the public electrical supply or public energy grid, for recordkeeping purposes, for billing purposes, and/or for any other reason or purpose.

With reference once again to FIG. 6, the electrical power output/supply system(s) 50 can also include a private electrical supply energy and/or grid power transfer system or equipment 53 (hereinafter "private electrical supply/energy grid power transfer system/equipment 53"). In a preferred embodiment, the private electrical supply/energy grid power transfer system/equipment 53 includes all of the devices, components, system, and/or equipment, needed or required for providing or supplying, or transferring, electricity or electrical power (either DC power, AC power, or both) to a private electrical supply or public energy grid.

In a preferred embodiment, the private electrical supply or public energy grid can be any privately owned and/or operated electrical supply or energy grid which can provide electricity or electrical power to any customers, clients, or users. In a preferred embodiment, the private electrical supply or public energy grid can also be any electric vehicle or hybrid vehicle recharging system, platform, or network, and/or can be any other type or kind of charging or recharging system, platform, or network, for any vehicles, premises, or equipment, or any component, system, device, or equipment, of the same.

In a preferred embodiment, the private electrical supply/energy grid power transfer system/equipment 53 also includes an electrical meter 53A (hereinafter "meter 53A") for measuring the amount of electrical power delivered to the private electrical supply or public energy grid. In this regard, in a preferred embodiment, the apparatus 100 of the present invention can be used to provide, supply, or transfer, electricity or electrical power to private electrical supply or public energy grid. In a preferred embodiment, the meter 53A can measure the amount of electricity or electrical power supplied, provided, or transferred, to the private electrical supply or private energy grid, for recordkeeping purposes, for billing purposes, and/or for any other reason or purpose.

In a preferred embodiment, the apparatus 100 of the present invention also includes a blockchain mining computer and/or blockchain transaction processing computer 55 (hereinafter referred to as "blockchain mining/transaction processing computer 55") or any number of blockchain mining/transaction processing computer 55. In a preferred embodiment, the blockchain mining/transaction processing computer 55 or each blockchain mining/transaction processing computer 55 can be used to create or mine blocks of or for any blockchain or any number of blockchains, process transactions for, on, or involving, any blockchain or any number of blockchains, process cryptocurrency transactions, and/or perform any other functions which can be performed on, with, or relating to, any blockchain or blockchains, or any cryptocurrency or cryptocurrencies.

In a preferred embodiment, each blockchain mining/transaction processing computer 55 can be connected to, or linked with, each of the power management computer 10, the central processing computer 60, the distributed ledger and blockchain technology system 70, and/or any of the herein-described user communication devices 80. In a preferred embodiment, the blockchain mining/transaction processing computer 55 can be located on, in, or at, the respective vehicle, premises, or equipment, in connection with, or in conjunction with, which the apparatus 100 is being utilized. In another preferred embodiment, the blockchain mining/transaction processing computer 55 can also be located external from, and/or separate and/or apart from, the respective vehicle, premises, or equipment, in connection with, or in conjunction with, which the apparatus 100 is being utilized.

With reference once again to FIG. 6, the electrical power output/supply system(s) 50 can also include a blockchain mining and/or transaction processing computer power supply 54 (hereinafter referred to as the "blockchain mining/transaction processing computer power supply 54") and the blockchain mining/transaction processing computer 55. In a preferred embodiment, the blockchain mining/transaction processing computer power supply 54 provides or supplies electrical power to the blockchain mining/transaction processing computer 55 and/or to each blockchain mining/transaction processing computer 55 of the respective vehicle, premises, or equipment, in connection with, or in conjunction with, which the apparatus 100 is being utilized.

With reference once again to FIG. 6, the electrical power output/supply system(s) 50 can also include a vehicle stationary recharging power supply and equipment 56 which can be utilized to charge or recharge an electric vehicle or a hybrid vehicle which is parked or stationary. In a preferred embodiment, the vehicle stationary recharging power supply and equipment 56 can include any needed or required equipment for charging or recharging an electric vehicle or a hybrid vehicle.

In a preferred embodiment, the vehicle stationary recharging power supply and equipment 56 can include any suitable line cord, plug-in adapter, or charging conductor, and/or any other device or equipment, and/or any number and/or combination of the same, which can be used to provide or to effectuate a direct electrical connection or contact with an electric vehicle or a hybrid vehicle which is to be charged or recharged. In this regard, a direct transfer of electricity or electrical power, to the electric vehicle or a hybrid vehicle which is to be charged or recharged, can be effectuated. In a preferred embodiment, the vehicle stationary recharging power supply and equipment 56 can also include an inductive charging coil or any number of inductive charging coils, for effectuating inductive (or "contactless" or "wireless") charging or recharging of an electric vehicle or a hybrid vehicle which is to be charged or recharged.

In a preferred embodiment, with an electric vehicle or a hybrid vehicle which is to be charged or recharged being stationary, or parked, the vehicle stationary recharging power supply and equipment 56 can be utilized to charge or recharge the electric vehicle or a hybrid vehicle directly with and by using a line cord, plug-in adapter, or charging conductor, and/or any other device or equipment, and/or inductively with and by using the inductive charging coil or the any number of inductive charging coils.

In a preferred embodiment, the vehicle stationary recharging power supply and equipment 56 also includes an electrical meter 56A (hereinafter "meter 56A") for measuring the amount of electrical power delivered to the electric vehicle or hybrid vehicle which is to be charged or recharged. In this regard, in a preferred embodiment, the apparatus 100 of the present invention can be used to provide, supply, or transfer, electricity or electrical power to charge or recharge the battery or batteries of an electric vehicle or hybrid vehicle which is to be charged or recharged. In a preferred embodiment, the meter 56A can measure the amount of electricity or electrical power supplied, provided, or transferred, to the electric vehicle or hybrid vehicle, for recordkeeping purposes, for billing purposes, and/or for any other reason or purpose.

With reference once again to FIG. 6, the electrical power output/supply system(s) 50 can also include a vehicle moving/in-motion recharging power supply and equipment 57 which can be utilized to charge or recharge an electric vehicle or a hybrid vehicle which is moving, in-motion, and/or traveling, on or along a road or roadway. In a preferred embodiment, the vehicle moving/in-motion recharging power supply and equipment 57 can include any needed or required equipment for charging or recharging a moving, in-motion, or traveling, electric vehicle or hybrid vehicle.

In a preferred embodiment, the vehicle moving/in-motion recharging power supply and equipment 57 can include any suitable line cord, plug-in adapter, or charging conductor, and/or any other device or equipment, and/or any number and/or combination of the same, which can be used to provide or to effectuate a direct electrical connection or contact with a moving, in-motion, or traveling, electric vehicle or hybrid vehicle which is to be charged or recharged. In this regard, a direct transfer of electricity or electrical power, to the moving, in-motion, or traveling, electric vehicle or hybrid vehicle can be effectuated.

In a preferred embodiment, the vehicle moving/in-motion recharging power supply and equipment 57 can also include an inductive charging coil or any number of inductive charging coils, for effectuating inductive (or "contactless" or "wireless") charging or recharging of a moving, in-motion, or traveling, electric vehicle or hybrid vehicle which is to be charged or recharged.

In a preferred embodiment, with an electric vehicle or a hybrid vehicle, which is to be charged or recharged, moving, in-motion, or traveling, on or along a road or roadway, the vehicle moving/in-motion recharging power supply and equipment 57 can be utilized to charge or recharge the electric vehicle or the hybrid vehicle directly with and by using a line cord, plug-in adapter, or charging conductor, and/or any other device or equipment, and/or inductively with and by using the inductive charging coil or the any number of inductive charging coils.

In a preferred embodiment, the vehicle moving/in-motion recharging power supply and equipment 57 also includes an electrical meter 57A (hereinafter "meter 57A") for measuring the amount of electrical power delivered to the moving, in-motion, or traveling, electric vehicle or hybrid vehicle which is to be charged or recharged. In this regard, in a preferred embodiment, the apparatus 100 of the present invention can be used to provide, supply, or transfer, electricity or electrical power to charge or recharge the battery or batteries of a moving, in-motion, or traveling, electric vehicle or hybrid vehicle which is to be charged or recharged. In a preferred embodiment, the meter 57A can measure the amount of electricity or electrical power which is supplied, provided, or transferred, to the moving, in-motion, or traveling, electric vehicle or hybrid vehicle, for recordkeeping purposes, for billing purposes, and/or for any other reason or purpose.

In a preferred embodiment, the electrical power output/supply system(s) 50, and/or any components of the same, and/or any of or each of the vehicle/premises/equipment battery/AC power supply/recharge system(s) I/F 51, the public electrical supply/energy grid power transfer system/equipment 52, the private electrical supply/energy grid power transfer system/equipment 53, the blockchain mining/transaction processing computer(s) 55, the blockchain mining/transaction processing computer power supply or supplies 54, the vehicle stationary recharging power supply and equipment 56, and/or the vehicle moving/in-motion recharging power supply and equipment 57, and/or any components, equipment, or respective meters 51A, 52A, 53A, 56A, and/or 57A, can be located on, in, or at, a respective vehicle, premises, or equipment, in connection with, or in conjunction with, which the apparatus 100 is being utilized, and/or can be located external from, and/or separate and/or apart from, a respective vehicle, premises, or equipment, in connection with, or in conjunction with, which the apparatus 100 is being utilized.

In a preferred embodiment, each meter 51A, 52A, 53A, 56A, and/or 57A can be connected to, or linked with, each of the power management computer 10, the central processing computer 60, the distributed ledger and blockchain technology system 70, and/or any of the herein-described user communication devices 80. In a preferred embodiment, each meter 51A, 52A, 53A, 56A, and/or 57A can be located on, in, or at, the respective vehicle, premises, or equipment, in connection with, or in conjunction with, which the apparatus 100 is being utilized. In another preferred embodiment, each meter 51A, 52A, 53A, 56A, and/or 57A can also be located external from, and/or separate and/or apart from, the respective vehicle, premises, or equipment, in connection with, or in conjunction with, which the apparatus 100 is being utilized.

Figure 7:
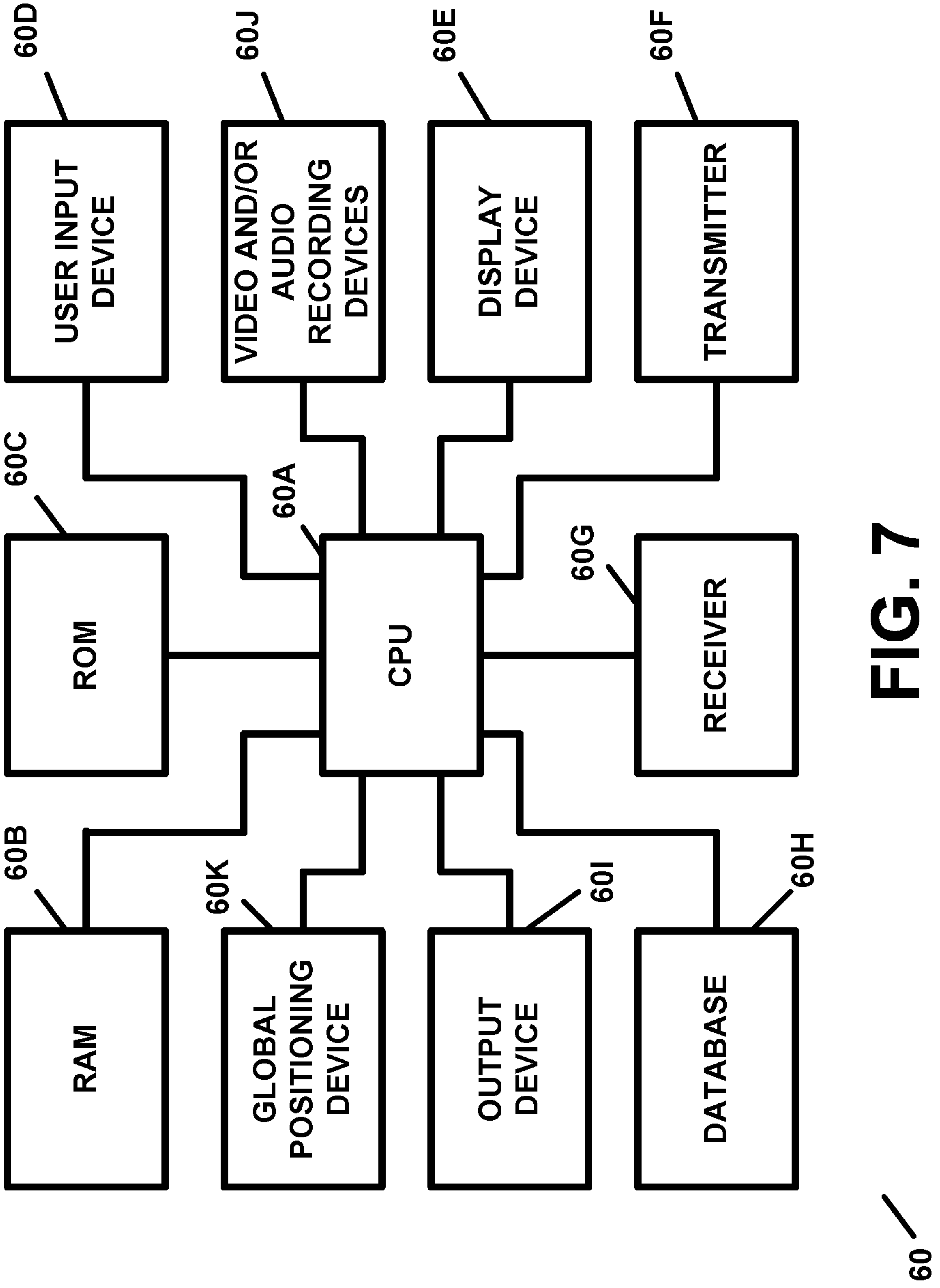
FIG. 7 illustrates the central processing computer of FIG. 1, in block diagram form.

FIG. 7 illustrates the central processing computer 60 of FIG. 1, in block diagram form. The central processing computer 60, in a preferred embodiment, can be any computer or computer system or can be any server computer or any computer or computer system which can be used in a communication network. Any number of central processing computers 60 can be utilized in conjunction with, or in connection, with the apparatus 100 of the present invention. In a preferred embodiment, the central processing computer 60 can control and/or monitor, and/or can provide control and/or monitoring functions for and/or regarding, any and/or all of the operations of each, and/or of all of, any of the power management computer(s) 10, the fuel intake/recapture equipment 20, the electrical power generator system(s) 30, the power storage/pass-through system 40, and/or the electrical power output/supply system(s) 50, which is/are utilized in connection with the apparatus 100 of the present invention.

In the preferred embodiment, the central processing computer 60 can also provide control over the apparatus 100 and can perform any of the various processing services and/or functions described herein as being performed by the apparatus 100 of the present invention, and/or as being performed by any of the components of the same. In a preferred embodiment, the central processing computer 60 may be a single computer or system of computers and/or may include a plurality of computers or computer systems which are utilized in conjunction with one another.

The central processing computer 60, in the preferred embodiment, can also provide services for any of the power management computers 10, any of the user communications devices 80, and/or any of the equipment of systems 20, 30, 40, and/or 50, described herein, and/or any other computers and/or computer systems described herein as being associated with any of the users, individuals, persons, or entities, who or which utilize the apparatus 100 of the present invention.

With reference once again to FIG. 7, the central processing computer 60 includes a central processing unit or CPU 60A, which, in the preferred embodiment, is a microprocessor. The CPU 60A can also be a microcomputer, a minicomputer, a macro-computer, and/or a mainframe computer, depending upon the application.

The central processing computer 60 also includes a random access memory device(s) 60B (RAM) and a read only memory device(s) 60C (ROM), each of which is connected to, or linked with, the CPU 60A, and a user input device 60D, for entering data and/or information and/or commands into the central processing computer 60, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the central processing computer 60. The user input device(s) 60D is/are also connected to, or linked with, the CPU 60A. The central processing computer 60 also includes a display device 60E for displaying data and/or information to a user or operator. The display device 60E is also connected to, or linked with, the CPU 60A.

The central processing computer 60 also includes a transmitter(s) 60F, for transmitting signals and/or data and/or information to any one or more of the power management computer(s) 10, the distributed ledger and Blockchain technology system 70, and/or the user communication device(s) 80, and/or any other central processing computer(s) 60, which is/are or may be utilized in conjunction with the apparatus 100 of the present invention. The transmitter 60F is also connected to, or linked with, the CPU 60A.

The central processing computer 60 also includes a receiver 60G, for receiving signals and/or data and/or information from any one or more of the power management computer(s) 10, the distributed ledger and Blockchain technology system 70, and/or the user communication device(s) 80, and/or any other central processing computer(s) 60, which is/are or may be utilized in conjunction with the apparatus 100 of the present invention. The receiver 60G is also connected to, or linked with, the CPU 60A.

The central processing computer 60 also includes a database(s) 60H which contains and/or includes any data, information, and/or software programs or software applications ("apps"), any and/or all of the data and/or information required, needed, or desired, for allowing and/or for enabling the central processing computer 60 and/or the apparatus 100 to perform any and/or all of the functions and functionalities described herein as being performed, and/or as capable of being performed, by the central processing computer 60 and/or the apparatus 100 of the present invention, and/or for providing or for performing any and/or all of the functions and functionalities of a power management system which can perform any and/or all of the functions and/or functionalities described herein as being performed by the apparatus 100 of the present invention.

In this regard, the database 60H can contain or include any data, information, and/or software programs or software applications, needed, required, or desired, for performing any processing routine(s), algorithms, and/or functions and/or functionalities, described herein as being performed by the central processing computer 60, the apparatus 100, and/or any components of the same, and/or the power management computer 10 and/or any components of the same.

The database 60H can also contain or include any software, software programs, and/or software applications ("app"), which is, or may be, needed and/or desired in performing any and/or all of the features and/or functionality described herein as being provided by the apparatus 100 of the present invention and/or the central processing computer 60. The database 60H can also contain and/or include any other data and/or information which is, or may be, needed and/or desired in performing any and/or all of the features and/or functionality described herein as being provided by the apparatus 100 of the present invention and/or central processing computer 60. The database 60H can also be connected to the CPU 60A.

The central processing computer 60 also includes an output device 601 for outputting any of the data, information, or reports, described herein or otherwise. In the preferred embodiment, the output device 601 can be a printer, a display, a transmitter, a modem, a speaker, and/or any other device which can be used to output data.

The central processing computer 60 can also include a video and/or audio recording device(s) 60J which can include a camera and/or a video recording device, for recording pictures or video and/or video clips, and/or a microphone or an audio recording device, for recording audio or audio clips, which can be recorded by, and/or transmitted live, by or from the central processing computer 60, or which can be recorded by, and stored at or in, the central processing computer 60 for transmission by or from the central processing computer 60 at a later time. The video and/or audio recording device(s) 60J can also be utilized to facilitate one-way broadcasts from the central processing computer 60, and/or can be utilized to facilitate video conferencing, video chatting, and/or audio conferencing, and/or video and audio conferencing, between users of the central processing computer 60 and any of the herein-described users, individuals, persons, or entities, who or which utilize the apparatus 100 of the present invention.

The central processing computer 60 can also include a global positioning device 60K. In a preferred embodiment, the global positioning device 60K determines or can determine a position or location of the central processing computer 60.

In a preferred embodiment, the central processing computer 60 can also be equipped, and/or can be programmed, for voice activation operation and/or voice control operation of and/or regarding any and/or all of the herein-described operations and functions which are capable of being performed by the central processing computer 60 and/or the various other components of the apparatus 100, including, but not limited to, each of, and/or all of, the power management computer(s) 10, the fuel intake/recapture equipment 20, the electrical power generator system(s) 30, the power storage/pass-through system 40, and/or the electrical power output/supply system(s) 50.

Figure 8:
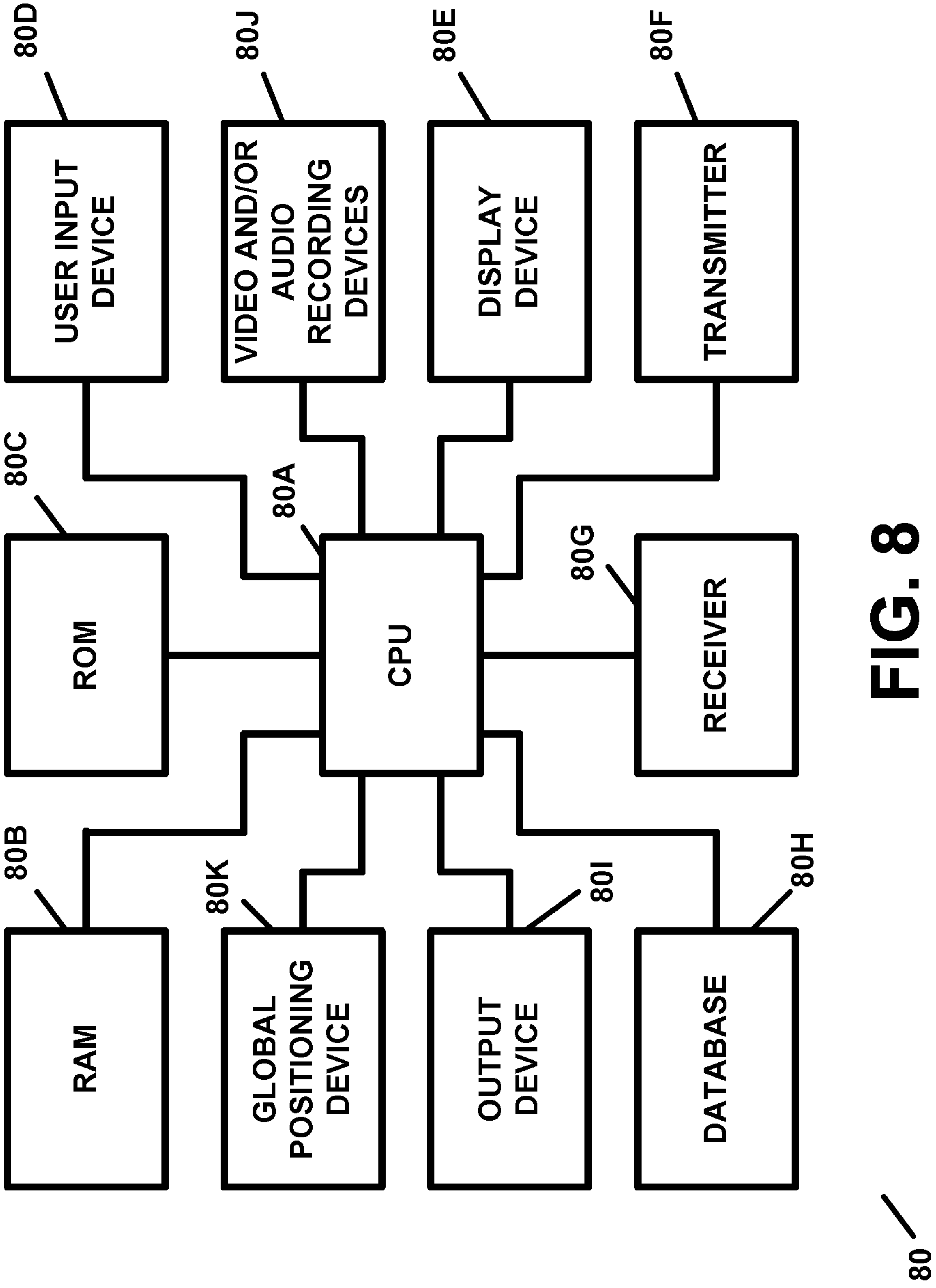
FIG. 8 illustrates the user communication device of the apparatus 100, in block diagram form.

FIG. 8 illustrates the user communication device 80 of the apparatus 100, in block diagram form. The user communication device 80, in the preferred embodiment, can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device, which can provide the functionality of, and which can be utilized as a user communication device 80.

With reference to FIG. 8, in a preferred embodiment, the user communication device 80 includes a central processing unit or CPU 80A, which, in the preferred embodiment, is a microprocessor. The CPU 80A can also be a microcomputer, a minicomputer, a macro-computer, and/or a mainframe computer, depending upon the application.

The user communication device 80 also includes a random access memory device(s) 80B (RAM) and a read only memory device(s) 80C (ROM), each of which is connected to, or linked with, the CPU 80A, and a user input device 80D, for entering data and/or information and/or commands into the user communication device 80, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the user communication device 80. The user input device(s) 80D is/are also connected to, or linked with, the CPU 80A. The user communication device 80 also includes a display device 80E for displaying data and/or information to a user or individual. The display device 80E is also connected to, or linked with, the CPU 80A.

With reference once again to FIG. 8, the user communication device 80 also includes a transmitter(s) 80F, for transmitting signals and/or data and/or information to any one or more of the central processing computer(s) 60, the power management computer(s) 10, the distributed ledger and Blockchain technology system 70, and/or any other user communication device(s) 80, which is/are or may be utilized in conjunction with the apparatus 100 of the present invention. The transmitter 80F is also connected to, or linked with, the CPU 80A.

The user communication device 80 also includes a receiver 80G, for receiving signals and/or data and/or information from any one or more of the central processing computer(s) 60, the power management computer(s) 10, the distributed ledger and Blockchain technology system 70, and/or any other user communication device(s) 80, which is/are or may be utilized in conjunction with the apparatus 100 of the present invention. The receiver 80G is also connected to, or linked with, the CPU 80A.

The user communication device 80 also includes a database(s) 80H which contains any and/or all of the data and/or information required, needed, or desired, for allowing and/or enabling the user communication device 80 and/or the apparatus 100 to perform any and/or all of the functions and functionalities described herein as being performed, and/or as capable of being performed, by the user communication device 80 and/or the apparatus 100. In this regard, and notwithstanding any specific examples of data and/or information described herein as being stored in the database 80H, it is to be understood that the database 80H contains and/or includes any and/or all data and/or information required, needed, or desired, for allowing and/or enabling the user communication device 80 and/or the apparatus 100 to perform any and/or all of the functions and functionalities described herein as being performed by the user communication device 80 and/or the apparatus 100 of the present invention.

The database 80H can also contain or include any software, software programs, and/or software applications ("app"), which is, or may be, needed and/or desired in performing any and/or all of the features and/or functionality described herein as being provided by the apparatus 100 of the present invention and/or the user communication device 80. The database 80H can also contain and/or include any other data and/or information which is, or may be, needed and/or desired in performing any and/or all of the features and/or functionality described herein as being provided by the apparatus 100 of the present invention and/or the user communication device 80. The database 80H can also be connected to the CPU 80A.

The user communication device 80 also includes an output device 801 for outputting any of the data, information, or reports, described herein or otherwise. In the preferred embodiment, the output device 801 can be a printer, a display, a transmitter, a modem, a speaker, and/or any other device which can be used to output data.

The user communication device 80 can also include a video and/or audio recording device(s) 80J which can include a camera and/or a video recording device, for recording pictures or video and/or video clips, and/or a microphone or an audio recording device, for recording audio or audio clips, which can be recorded by, and/or transmitted live, by or from the user communication device 80, or which can be recorded by, and stored at or in, the user communication device 80 for transmission by or from the user communication device 80 at a later time. The video and/or audio recording device(s) 80J can also be utilized to facilitate one-way broadcasts from the user communication device 80, and/or can be utilized to facilitate video conferencing, video chatting, and/or audio conferencing, and/or video and audio conferencing, between a user of the user communication device 80 and any of the herein-described users, individuals, persons, or entities, who or which utilize the apparatus 100 of the present invention.

The user communication device 80 can also include a global positioning device 80K. In a preferred embodiment, the global positioning device 80K determines or can determine a position or location of the user communication device 80.

In a preferred embodiment, the user communication device 80 can also be equipped, and/or can be programmed, for voice activation operation and/or voice control operation of and/or regarding any and/or all of the herein-described operations and functions which are described herein as capable of being performed by the user communication device 80.

The apparatus 100 and methods of the present invention can be utilized, in any number and/or in a variety of preferred embodiments, in order to capture, to recapture, to collect, and/or to store, any of the types of kinds of fuel or fuels which are described herein or otherwise, to convert the respective fuel or fuels to electricity or electrical power, and to store the electricity or the electrical power, and/or to utilize, to provide, to transfer, or to deploy, the electricity or electrical power in any number of a variety of types of kinds of applications.

In a preferred embodiment, the apparatus 100 and methods of the present invention can be utilized to order to collect, capture, recapture, recover, and/or to store, natural gas, methane gas, and/or any other type or kind of fossil fuel gas, petroleum, crude oil, oil, and/or any other type or kind of fossil fuel material or substance, in any type or kind of setting, environment, or situation, and to utilize the same in generating electricity and/or electrical power.

In a preferred embodiment, a fuel, which fuel can be natural gas, petroleum, crude oil, oil, gasoline, or any other fluid which is flammable or combustible, and/or methane, butane, propane, ethane, pentane, ethanol, petroleum gas, or any other gas which is flammable or combustible, and/or any gaseous or liquid form of the same, can be collected, captured, recaptured, recovered, and/or stored, in, or as the result of, any number of situations or occurrences. For example, a natural gas leak at a valve or seal of a natural gas pipeline, or a rupture of the natural gas pipeline, could result in a need to utilize the apparatus 100 of the present invention in order to collect, capture, recapture, recover, and/or to store, the leaking or leaked natural gas.

Similarly, a spill of, or a rupture or puncture in, or a leak from, a tank storing, or a rupture or puncture in a pipeline transporting, any of petroleum, crude oil, oil, gasoline, or any other fluid which is flammable or combustible, could result in a need to utilize the apparatus 100 of the present invention in order to collect, capture, recapture, recover, and/or to store, the respective petroleum, crude oil, oil, gasoline, or other fluid. Likewise, the production or the buildup of collection of methane gas at a landfill, garbage dump, animal waste pit or waste lagoon, livestock waste pit or waste lagoon, pig or hog waste pit or waste lagoon, or cattle or cow waste pit or waste lagoon, could result in a need to utilize the apparatus 100 of the present invention in order to collect, capture, recapture, recover, and/or remove, and to store, the respective methane gas.

In a similar manner, a leak or puncture of a tank storing, or a pipeline carrying or transporting, methane, butane, propane, ethane, pentane, ethanol, petroleum gas, or any other gas, could result in a need to utilize the apparatus 100 of the present invention in order to collect, capture, recapture, recover, and/or remove, and to store, the respective gas. In a same, manner, the collecting or the building up stored biofuels and/or of used cooking oils, used engine oils or other used petroleum or other oils or susbstances, and/or other biofuels or waste substances or by-products, could result in a need to utilize the apparatus 100 of the present invention in order to collect, capture, recapture, recover, and/or remove, and to store, the respective biofuel, oil, waste material, or substance.

Once the respective fuel is collected, captured, recaptured, recovered, and/or removed, and stored, by and using the respective fuel intake/recapture equipment 20, the respective fuel can be utilized to generate or produce electricity or electrical power, which can be either stored in and/or by any of the herein described the power storage/pass-through system 40, and/or any of the herein-described components of the same, and/or the electricity or electrical power can be provided in "pass-through" fashion in order to power any system(s), device(s), component(s), or equipment, of any vehicle, premises, or equipment.

The electricity or electrical power which is stored, or which is passed-though to any system(s), device(s), component(s), or equipment, of any vehicle, premises, or equipment, can be utilized to provide electricity or electrical power in and for a number of applications or uses, including, but not limited to, providing electricity or electrical power to a battery or AC power supply system of another or other vehicle, premises, or equipment, providing electricity or electrical power to a public electrical supply energy grid, providing electricity or electrical power to a private electrical supply energy grid, providing electricity or electrical power to or at an electric vehicle or hybrid vehicle recharging platform, system, or network, providing electrical power to any of the herein-described blockchain mining/transaction processing computers 55 for performing blockchain mining processing or blockchain transaction processing, providing electricity or electrical power to recharge a stationary electric vehicle or hybrid vehicle, and/or providing electricity or electrical power to recharge a moving or in-motion electric vehicle or hybrid vehicle, and/or providing electricity or electrical for any other appropriate use.

In applications wherein electricity or electrical power is being supplied from the apparatus 100 to an external system or user, the respective meter 51A, 52A, 53A, 56A, and/or 57A, in a preferred embodiment, can measure the amount of electrical power, which is transferred by, or which is provided by, the apparatus 100 and/or any of its various electrical power output/supply systems 50, so the price of the same can be ascertained and so that the owner or operator of the apparatus 100 can be compensated for, can receive compensation for, and/or can receive credit, whichever the case may be, for providing or supplying the electricity or electrical power. Thereafter, in a preferred embodiment, a record of any transaction(s) involving the providing of, the transfer of, the exchange of, and/or the sale of, the electricity or electrical power, from and/or by the apparatus 100 can be processed by the power management computer 10, and/or the central processing computer 60, and/or the distributed ledger and blockchain technology system 70, and, in a preferred embodiment, any information regarding any such transaction(s) can be stored in the distributed ledger and blockchain technology system 70.

In a preferred embodiment, the apparatus 100 can also be located on or at, or deployed on or at, any of the herein-described vehicles, premises, or equipment, in and/or when using the apparatus 100 and method of the present invention. In a preferred embodiment, any vehicle can also be utilized to move or travel from location to location when and as needed in order to collect, capture, recapture, recover, and/or remove, and to store, any respective fuel or fuels. In a similar manner, any premises may be a stationary premises or a mobile premises in order to collect, capture, recapture, recover, and/or remove, and to store, any respective fuel or fuels when and as needed. In a same manner, any item of equipment may be a stationary item of equipment or a mobile item of equipment in order to collect, capture, recapture, recover, and/or remove, and to store, any respective fuel or fuels when and as needed.

Figure 9A:
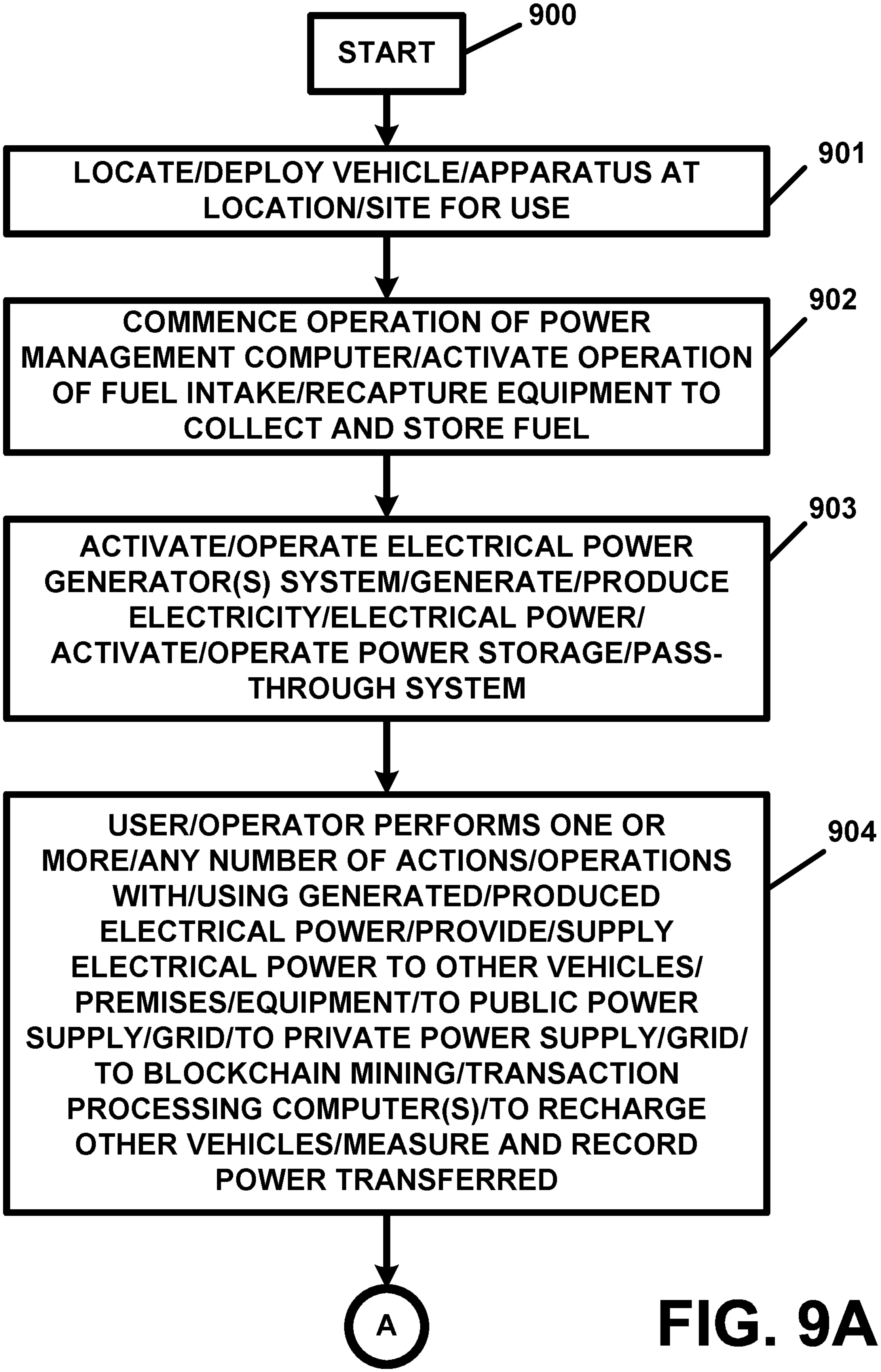
FIGS. 9A and 9B illustrate a preferred embodiment method for utilizing the apparatus of FIG. 1, in flow diagram form.
Figure 9B:
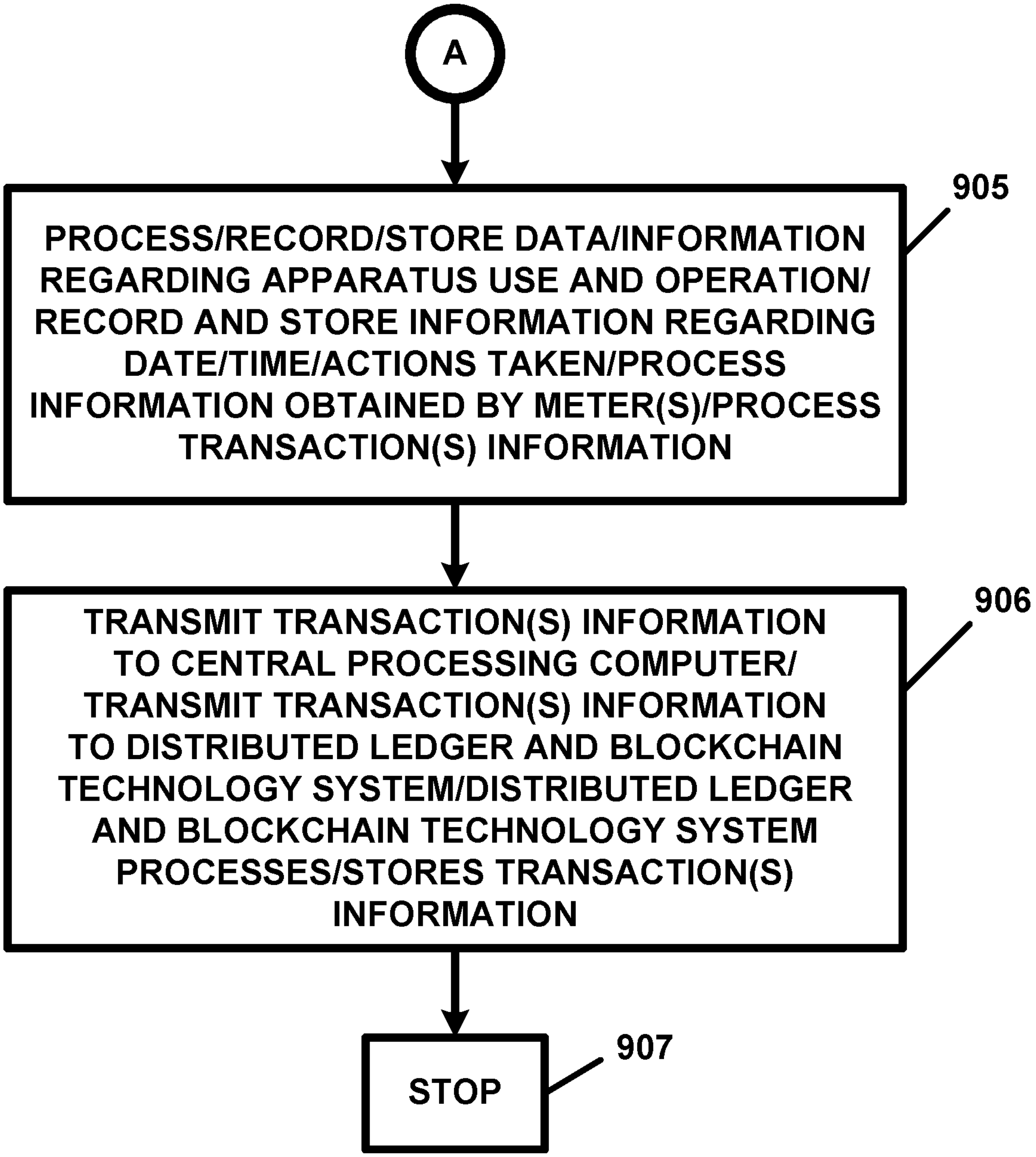

FIGS. 9A and 9B illustrate a preferred embodiment method for utilizing the apparatus 100 of FIG. 1, in flow diagram form. It is important to note that the embodiment of FIGS. 9A and 9B can be utilized in a same, a similar, and/or an analogous, manner in order to collect, capture, recapture, recover, and/or remove, and to store, any of the respective fuel or fuels, described herein or otherwise, and/or in order to generate or to produce electricity or electrical power from and using the same, and/or in order to use, provide, or transfer, the generated or produced electricity or electrical power in any appropriate manner, whether described herein or otherwise.

In the preferred embodiment of FIGS. 9A and 9B, the operation of the apparatus 100 will be described herein in connection with the collection, capture, recapture, recovery, and/or removal, and storage, of natural gas from or at a location of a natural gas tank or natural gas line puncture or a natural gas pipeline puncture, a natural gas leakage form a valve or from seal, a venting of natural from a natural gas well, an off gassing or out gassing of natural gas from a well, formation, or other location, or any other natural gas leakage situation and/or any situation calling for or requiring that natural gas be collected, captured, recaptured, recovered, and/or removed, and stored.

In this regard, although described and illustrated as being used for collecting, capturing, recapturing, recovering, and/or removing, and storing, natural gas, it is important to note that the apparatus 100 of the preferred embodiment of FIGS. 9A and 9B can also be utilized in a same, a similar, and/or an analogous, manner in connection with, or in conjunction with, any fuel, including, but not limited to, natural gas, petroleum, crude oil, oil, gasoline, or any other fluid which is flammable or combustible, and/or methane, butane, propane, ethane, pentane, ethanol, petroleum gas, or any other gas which is flammable or combustible, and/or any gaseous or liquid form of the same, and/or any biofuel or biofuels, cooking oils, used cooking oils, motor oils, used motor oils, and/or any other waste materials which can be utilized as a fuel to generate or produce electricity.

In the preferred embodiment of FIGS. 9A and 9B, the apparatus 100 can be utilized in connection with, or in conjunction with, a land vehicle, a motor vehicle, a car, a truck, or a commercial truck or other vehicle. In another preferred embodiment, the apparatus 100 can be used in connection with any land, air, or sea vehicle, any drone, and/or any other vehicle described herein or otherwise. Although described as being used in connection with, or in conjunction with, a land vehicle, the apparatus 100 of the embodiment of FIGS. 9A and 9B can also be used in a same, a similar, and/or an analogous, manner in connection with or in conjunction with any premises or equipment, described herein or otherwise.

With reference to FIGS. 9A and 9B, the operation of the apparatus 100 commences at step 900. At step 901, upon a detection, a discovery, or a reporting, of a location, situation, or condition, which calls for, or which requires, that leaking, leaked, or escaping, natural gas to be collected, captured, recaptured, recovered, and/or removed, and stored or contained, the vehicle on, in, or at, which the apparatus 100, or any components thereof, is located or deployed is dispatched to the site of the location, situation, or condition. Once the vehicle arrives at the site of the location, situation, or condition, the operation of the power management computer 10 commences at step 902.

In a preferred embodiment, the operation of the power management computer 10 can be controlled at the vehicle by a user or operator. In a preferred embodiment, the user or operator can control, via the user input device 10D, any operation(s) of the power management computer 10, and/or any of the fuel intake/recapture equipment 20, the natural gas capture/recapture equipment/system 21A, the natural gas storage tank/container/system 21B, the electrical power generator system(s) 30, the natural gas electrical power generator/generator system 31, the power storage/pass-through system 40, and/or any one or more of the primary battery for vehicle/premises/equipment 41, the secondary/reserve storage battery for vehicle/premises/equipment 42, the capacitive charge storage device or equipment 43, the gravity power storage device 44, the other/miscellaneous battery/power storage device/equipment 45, and/or the electrical power pass-through system/equipment 46, the electrical power output/supply system(s) 50, and/or any of the vehicle/premises/equipment battery/AC power supply/recharge system I/F 51, the public electrical supply/energy grid power transfer system/equipment 52, the private electrical supply/energy grid power transfer system/equipment 53, the blockchain mining/transaction processing computer power supply 54, the blockchain mining/transaction processing computer 55, the vehicle stationary recharging power supply and equipment 56, and/or the vehicle moving/in-motion recharging power supply and equipment 57.

In a preferred embodiment, the user or operator can monitor, via the display device 10E and/or the output device 10I, and/or by using the user input device 10D, any operation(s) of the power management computer 10, and/or any of the fuel intake/recapture equipment 20, the natural gas capture/recapture equipment/system 21A, the natural gas storage tank/container/system 21B, the electrical power generator system(s) 30, the natural gas electrical power generator/generator system 31, the power storage/pass-through system 40, and/or any one or more of the primary battery for vehicle/premises/equipment 41, the secondary/reserve storage battery for vehicle/premises/equipment 42, the capacitive charge storage device or equipment 43, the gravity power storage device 44, the other/miscellaneous battery/power storage device/equipment 45, and/or the electrical power pass-through system/equipment 46, the electrical power output/supply system(s) 50, and/or any of the vehicle/premises/equipment battery/AC power supply/recharge system I/F 51, the public electrical supply/energy grid power transfer system/equipment 52, the private electrical supply/energy grid power transfer system/equipment 53, the blockchain mining/transaction processing computer power supply 54, the blockchain mining/transaction processing computer 55, the vehicle stationary recharging power supply and equipment 56, and/or the vehicle moving/in-motion recharging power supply and equipment 57.

In another preferred embodiment, as well as any of the embodiments described herein or otherwise, a user or operator of the central processing computer 60 and/or the user communication device 80 can control and/or can monitor, with and/or using the respective components of the respective central processing computer 60 and/or the user communication device 80, any operation(s) of the power management computer 10, and/or any operations of any and/or all of the fuel intake/recapture equipment 20, the natural gas capture/recapture equipment/system 21A, the natural gas storage tank/container/system 21B, the electrical power generator system(s) 30, the natural gas electrical power generator/generator system 31, the power storage/pass-through system 40, and/or any one or more of the primary battery for vehicle/premises/equipment 41, the secondary/reserve storage battery for vehicle/premises/equipment 42, the capacitive charge storage device or equipment 43, the gravity power storage device 44, the other/miscellaneous battery/power storage device/equipment 45, and/or the electrical power pass-through system/equipment 46, the electrical power output/supply system(s) 50, and/or any of the vehicle/premises/equipment battery/AC power supply/recharge system I/F 51, the public electrical supply/energy grid power transfer system/equipment 52, the private electrical supply/energy grid power transfer system/equipment 53, the blockchain mining/transaction processing computer power supply 54, the blockchain mining/transaction processing computer 55, the vehicle stationary recharging power supply and equipment 56, and/or the vehicle moving/in-motion recharging power supply and equipment 57.

At step 902, the user or operator, via the user input device 10D, can activate and/or control an operation of the fuel intake/recapture equipment 20 and, in particular, the natural gas capture/recapture equipment/system 21A so as to collect, capture, recapture, recover, and/or remove, the natural gas, and so as to store the same in the natural gas storage tank/container/system 21B. In this regard, at step 902, the natural gas is and/or can be collected, captured, recaptured, recovered, and/or removed, by and with the natural gas capture/recapture equipment/system 21A, and the natural gas can be stored in the natural gas storage tank/container/system 21B. Once a sufficient amount of natural gas is stored in the natural gas storage tank/container/system 21B to allow for the generation or production of electricity or electrical power, as determined in or by any appropriate method or manner known by those skilled in the art, the operation of the apparatus 100 can proceed to step 903.

At step 903, the user or operator can, via the user input device 10D, activate and/or control an operation of the electrical power generator system(s) 30 and, in particular, the natural gas electrical power generator/generator system 31. In preferred embodiment, natural gas stored in the natural gas storage tank/container/system 21B can be provided to the natural gas electrical power generator/generator system 31 and the natural gas electrical power generator/generator system 31 can generate or produce electricity or electrical power, as either DC power or AC power as needed or desired.

At step 903, the user or operator can, via the user input device 10D, also activate the power storage/pass-through system 40 and, in particular, so as to activate recharging circuitry of the primary battery for vehicle/premises/equipment 41 of the vehicle, in order to allow the primary battery of the vehicle to be recharged by or with at least some of the electrical power which is generated or produced by the natural gas electrical power generator/generator system 31 (so as to recharge the vehicle's primary battery), so as to activate recharging circuitry of the secondary/reserve storage battery for vehicle/premises/equipment 42 of the vehicle, in order to allow the secondary or reserve battery of the vehicle to be recharged by or with at least some of the electrical power which is generated or produced by the natural gas electrical power generator/generator system 31 (so as to recharge the vehicle's secondary or reserve battery), so as to activate and provide electricity or electrical power to the capacitive charge storage device or equipment 43 so as to store at least some of the electrical power which is generated or produced by the natural gas electrical power generator/generator system 31 therein, so as to activate and provide electrical power to the gravity power storage device 44 so as to store potential energy therein by using at least some of the electrical power which is generated or produced by the natural gas electrical power generator/generator system 31, so as to activate and to provide at least some of the electrical power which is generated or produced by the natural gas electrical power generator/generator system 31 to the other/miscellaneous battery/power storage device/equipment 45 so as to store electrical energy therein, and/or so as to activate the electrical power pass-through system/equipment 46 so as to provide at least some of the electrical power which is generated or produced by the natural gas electrical power generator/generator system 31 to any electrical system(s), device(s), component(s), or equipment, either at the vehicle and/or to electrical system(s), device(s), component(s), or equipment, located external from the vehicle. Thereafter, the operation of the apparatus 100 will proceed to step 904.

At step 904, the user or operator can perform any number of actions or operations with or using the electricity or electrical power which is stored and/or is passed-through, and/or which can be passed-through, to any electrical system(s), device(s), component(s), or equipment. At step 904, the user or operator can, via the user input device 10D, activate and/or control an operation of the any one or more of the electrical power output/supply system(s).

At step 904, the user or operator can, via the user input device 10D, activate and/or control an operation of the vehicle/premises/equipment battery/AC power supply/recharge system I/F 51 so to provide electrical power to recharge the primary battery of the vehicle and/or the secondary battery or the reserve battery of the vehicle, and/or the vehicle/premises/equipment battery/AC power supply/recharge system I/F 51 can provide electrical power to any other battery recharge system or to any AC electrical supply system for any other vehicle, premises, or equipment. At and during step 904, electrical power can be provided to, or transferred to, any and/or all of the above-described and respective batteries and/or AC supply systems.

In a preferred embodiment, the meter 51A can record any data and/or information regarding any amount or quantity of electricity or electrical power which is provided by, or which transferred by, the vehicle/premises/equipment battery/AC power supply/recharge system I/F 51, so that owner of the vehicle and/or the apparatus 100 can be compensated for sale of the same to the receiving vehicle, premises, or equipment, and/or so that the owner of the vehicle and/or the apparatus 100 can be compensated for an exchange of the same, in instances wherein electrical power can be traded or exchanged by and between users of the apparatus and methods of the present invention.

At step 904, the user or operator, or another individual, can also connect the public electrical supply/energy grid power transfer system/equipment 52 to a public electrical supply system or energy grid so as to sell electrical power to the public electrical supply system or energy grid. At step 904, once the public electrical supply/energy grid power transfer system/equipment 52 is connected to the public electrical supply system or energy grid, the user or operator can, via the user input device 10D, at step 904, activate and/or control an operation of the public electrical supply/energy grid power transfer system/equipment 52 and the public electrical supply/energy grid power transfer system/equipment 52 can provide or transfer electrical power to the public electrical supply system or energy grid. At and during step 904, electrical power can be provided to, or transferred, to the public electrical supply system or energy grid.

In a preferred embodiment, the meter 52A can record any data and/or information regarding any amount or quantity of electricity or electrical power which is provided by, or which transferred by, the public electrical supply/energy grid power transfer system/equipment 52, so that owner of the vehicle and/or the apparatus 100 can be compensated for sale of the same to the receiving public electrical supply system or energy grid, and/or so that the owner of the vehicle and/or the apparatus 100 can be compensated for an exchange of the same, in instances wherein electrical power can be traded or exchanged by and between users of the apparatus and methods of the present invention and the public electrical supply system or energy grid.

At step 904, the user or operator, or another individual, can also connect the private electrical supply/energy grid power transfer system/equipment 53 to a private electrical supply system or energy grid so as to sell electrical power to the private electrical supply system or energy grid. At step 904, once the private electrical supply/energy grid power transfer system/equipment 53 is connected to the private electrical supply system or energy grid, the user or operator can, via the user input device 10D, at step 904, activate and/or control an operation of the private electrical supply/energy grid power transfer system/equipment 53 and private electrical supply/energy grid power transfer system/equipment 53 can provide or transfer electrical power to the private electrical supply system or energy grid. At and during step 904, electrical power can be provided to, or transferred, to the private electrical supply system or energy grid.

In a preferred embodiment, the meter 53A can record any data and/or information regarding any amount or quantity of electricity or electrical power which is provided by, or which transferred by, the private electrical supply/energy grid power transfer system/equipment 53, so that owner of the vehicle and/or the apparatus 100 can be compensated for sale of the same to the receiving private electrical supply system or energy grid, and/or so that the owner of the vehicle and/or the apparatus 100 can be compensated for an exchange of the same, in instances wherein electrical power can be traded or exchanged by and between users of the apparatus and methods of the present invention and the private electrical supply system or energy grid.

At step 904, the user or operator can, via the user input device 10D, provide electrical power to, and can activate, and/or control, an operation of the blockchain mining/transaction processing computer power supply 54 and the blockchain mining/transaction processing computer 55. Thereafter, the blockchain mining/transaction processing computer 55 can perform processing routines for mining or for creating blocks for one or more blockchains, and/or can process transactions for one or more blockchains.

In a preferred embodiment, at step 904 and/or anytime thereafter, the apparatus 100 of the present invention can be utilized in order to recharge a battery or batteries of a stationary electric vehicle or hybrid vehicle with and using the vehicle stationary recharging power supply and equipment 56. In a preferred embodiment, the battery of batteries of a stationary electric vehicle or hybrid vehicle can be charged by connecting a line cord, a plug-in adapter, or a charging conductor, and/or any other device or equipment, and/or any number and/or combination of the same, of the vehicle stationary recharging power supply and equipment 56 to the battery recharging system of the electric vehicle or hybrid vehicle which is to be recharged. The recharging operation can thereafter take place with electrical power being transferred from the vehicle stationary recharging power supply and equipment 56 to the battery recharging system of the electric vehicle or hybrid vehicle which is to be recharged.

In another preferred embodiment, the battery or batteries of electric vehicle or hybrid vehicle can be recharged inductively by providing electrical power to, and thereby energizing, an inductive recharging coil of the vehicle stationary recharging power supply and equipment 56 in an area adjacent, near, or in close proximity, to the recharging coil of the battery recharging system of the electric vehicle or hybrid vehicle and thereby effectuate a recharging of the battery or batteries of the electric vehicle or hybrid vehicle to recharge inductively.

In a preferred embodiment, the meter 56A can record any data and/or information regarding any amount or quantity of electricity or electrical power which is provided to, or which transferred to, the battery recharging system of the electric vehicle or hybrid vehicle, so that owner of the vehicle and/or the apparatus 100 can be compensated for sale for the recharging service, and/or so that the owner of the vehicle and/or the apparatus 100 can be otherwise compensated for the same.

In a preferred embodiment, at step 904 and/or anytime thereafter, the apparatus 100 of the present invention can be utilized in order to recharge a battery or batteries of a moving, in-motion, or traveling, electric vehicle or hybrid vehicle with and using the vehicle moving/in-motion recharging power supply and equipment 57. In a preferred embodiment, the battery of batteries of a moving, in-motion, or traveling, vehicle or hybrid vehicle can be charged by connecting a line cord, a plug-in adapter, or a charging conductor, and/or any other device or equipment, and/or any number and/or combination of the same, of the vehicle moving/in-motion recharging power supply and equipment 57 to the battery recharging system of the electric vehicle or hybrid vehicle which is to be recharged. The recharging operation can thereafter take place, with electrical power being transferred from the vehicle moving/in-motion recharging power supply and equipment 57 to the battery recharging system of the electric vehicle or hybrid vehicle which is to be recharged, and while the electric vehicle or hybrid vehicle which is to be recharged is moving, in-motion, or traveling on or along a road or roadway.

In another preferred embodiment, the battery or batteries of a moving, in-motion, or traveling, electric vehicle or hybrid vehicle can be recharged inductively by providing electrical power to, and thereby energizing, an inductive recharging coil of the vehicle moving/in-motion recharging power supply and equipment 57, of the moving vehicle, on which the apparatus 100 is located, and by maintaining a close and specified recharging distance from or between the inductive recharging coil of the vehicle moving/in-motion recharging power supply and equipment 57 and the recharging coil of the battery recharging system of the moving, in-motion, or traveling, electric vehicle or hybrid vehicle. In the above-described manner, the apparatus 100 can effectuate an inductive recharging of the battery or batteries of the electric vehicle or hybrid vehicle.

In a preferred embodiment, the meter 57A can record any data and/or information regarding any amount or quantity of electricity or electrical power which is provided to, or which transferred to, the battery recharging system of the electric vehicle or hybrid vehicle, so that owner of the vehicle and/or the apparatus 100 can be compensated for sale for the recharging service, and/or so that the owner of the vehicle and/or the apparatus 100 can be otherwise compensated for the same.

Once the user or operator has completed all actions or activities at during step 904, and/or once the user or operator has ceased using the components of the apparatus at step 904, the operation of the apparatus 100 will proceed to step 905. At step 905, the power management computer 10 can process any and/or all data and/or information regarding the use and/or operation of the apparatus 100. At step 905, the power management computer 10 can record and store data and/or information regarding the date and time of the detection, discovery, or reporting, of the location, situation, or condition, which called for, or which required, that the leaking, leaked, or escaping, natural gas had to be collected, captured, recaptured, recovered, and/or removed, and stored or contained. At step 905, the power management computer 10 can record and store data and/or information regarding and/or all of the actions taken or performed by the user or operator in, at, and/or during, steps 902, 903, and 904.

At step 905, the power management computer 10 can also obtain, receive, and/or process, any data and/or information recorded by or read by any of the respective meters 51A, 52A, 53A, 56A, and/or 57A, and can process information regarding transactions involving the providing of, or the transferring of, electrical power from and by the apparatus 100.

At step 906, the power management computer 10 can transmit transaction information, for any of the transaction (s) involving the providing of, or the transferring of, electrical power from and by the apparatus 100, which were recorded or measured by the respective meters 51A, 52A, 53A, 56A, and/or 57A, to the central processing computer 60 for processing and/or storing of the same.

At step 906, the power management computer 10 and/or the central processing computer 60 can also transmit transaction information, for any of the transaction(s) involving the providing of, or the transferring of, electrical power from and by the apparatus 100, which were recorded or measured by the respective meters 51A, 52A, 53A, 56A, and/or 57A, to the distributed ledger and blockchain technology system 70. At step 906, the distributed ledger and blockchain technology system 70 can process information regarding any and/or all of the transactions, involving the providing of, or the transferring of, electrical power from and by the apparatus 100, which were recorded or measured by the respective meters 51A, 52A, 53A, 56A, and/or 57A, and store information regarding the same in the distributed ledger and/or in the blockchain associated with the same. Thereafter, the operation of the apparatus 100 will cease at step 907.

In the herein-described manner, the apparatus 100 and methods of the present invention facilitates and/or provides for a more efficient collection, capturing, recapturing, recovery, and/or storage, of any of the various kinds of fuels or biofuel described herein and/or otherwise. Further, the ability of the apparatus 100 of the present invention to collect, to capture, to recapture, and/or to recover, and/or store, a respective fuel or fuels, and the ability of the apparatus 100 to generate or to produce electricity or electrical power with or from the fuel or fuels, dispenses with the need for long term storage of, and/or transporting or shipping of the respective fuel or fuels from one location to another. The apparatus 100 of the present invention also facilitates and/or provides for the remote generation or production, and use or deployment of, electricity or electrical power.

As noted herein, the apparatus of the embodiment of FIGS. 9A and 9B can be utilized in a same, a similar, and/or an analogous, manner in order to collect, capture, recapture, recover, and/or remove, and to store, and to generate or produce electricity from and with, any of the various and respective fuel or fuels described herein or otherwise.

The apparatus 100 and methods of the present invention provides a number of technical solutions for, and provides a number of improvements to technologies relating to, at the very least, technologies directed to or at collecting, capturing, recapturing, recovering, and/or removing, and storing, fossil fuels, biofuels, and other fuels, which can be harmful to, or undesirable for, the environment, while also allowing for the generation and production of electricity or electrical power from and with the same, so as to provide for a number of advantages and solutions for protecting the environment as well as for making contributions towards meeting our growing electrical energy needs.

While the present invention has been described and illustrated in various preferred and alternate embodiments, such descriptions are merely illustrative of the present invention and are not to be construed to be limitations thereof. In this regard, the present invention encompasses all modifications, variations, and/or alternate, embodiments, with the scope of the present invention being limited only by the claims which follow.

What is claimed is:

1. An apparatus, comprising:

a power management computer;

a fuel recapture device, wherein the fuel recapture device further comprises equipment for collecting a leaked or spilled fuel by suction, vacuuming, or skimming, wherein the fuel recapture device collects, captures, recaptures, or recovers, the leaked or spilled fuel;

a fuel storage device, wherein the fuel storage device stores the leaked or spilled fuel collected by the fuel recapture device;

an electrical power generator, wherein the electrical power generator generates electrical power from or with the leaked or spilled fuel collected by the fuel recapture device;

a power storage device or a power pass-through system, wherein the power storage device stores the electrical power, or wherein the power pass-through system provides power to an electrical system, device, or equipment;

an electrical power supply system, wherein the electrical power supply system provides at least some of the electrical power stored in the power storage device, or provides at least some of the electrical power provided via the power pass-through system to a public electrical energy grid, or to a private electrical energy grid; and a meter, wherein the meter reads, records, or measures, information regarding an amount or quantity of the at least some of the electrical power provided by, transferred by, or supplied by, the electrical power supply system;

wherein the power management computer processes information regarding the amount or quantity of the at least some of the electrical power provided by, transferred by, or supplied by, the electrical power supply system.

2. The apparatus of claim 1, further comprising:

a central processing computer, wherein the central processing computer processes information for controlling or monitoring an operation of the apparatus or the power management computer, or wherein the central processing computer processes information for controlling or monitoring an operation of the fuel recapture device, the fuel storage device, the electrical power generator, the power storage device or the power pass-through system, the electrical power supply system, or the meter.

3. The apparatus of claim 1, wherein the electrical power supply system further comprises:

an induction coil for inductively recharging a battery of a stationary vehicle; or a line cord, a plug-in adapter, or a charging conductor for recharging a battery of a stationary vehicle by direct electrical contact.

4. The apparatus of claim 1, wherein the electrical power supply system further comprises:

an induction coil for inductively recharging a battery of a moving vehicle; or a line cord, a plug-in adapter, or a charging conductor for recharging a battery of a moving vehicle by direct electrical contact.

5. The apparatus of claim 1, wherein the electrical power supply system also provides power to a vehicle or to a premises or provides power at a vehicle or a premises.

6. The apparatus of claim 1, wherein the electrical power supply system also provides power to recharge a battery of a stationary vehicle, or provides power to recharge a battery of a moving vehicle.

7. The apparatus of claim 1, wherein the electrical power supply system provides power to the public electrical energy grid.

8. The apparatus of claim 1, wherein the electrical power supply system provides power to the private electrical energy grid.

9. The apparatus of claim 1, wherein the electrical power supply system also provides power to a blockchain mining or transaction processing computer.

10. The apparatus of claim 1, wherein the leaked or spilled fuel is natural gas.

11. The apparatus of claim 1, wherein the leaked or spilled fuel is petroleum, crude oil, or oil.

12. The apparatus of claim 1, wherein the leaked or spilled fuel is gasoline.

13. The apparatus of claim 1, wherein the leaked or spilled fuel is a biofuel.

14. The apparatus of claim 1, wherein the leaked or spilled fuel is methane gas.

15. The apparatus of claim 1, wherein the leaked or spilled fuel is butane, propane, ethane, pentane, or ethanol.

16. The apparatus of claim 1, wherein the leaked or spilled fuel is cooking oil, used cooking oil, engine oil, or used engine oil.

17. The apparatus of claim 1, wherein the leaked or spilled fuel is petroleum gas.

18. The apparatus of claim 1, wherein the power management computer processes information regarding an amount or quantity of the at least some of the electrical power provided by, transferred by, or supplied by, the electrical power supply system, and determines a transaction payment amount or determines a transaction exchange value.

19. The apparatus of claim 1, further comprising:

a distributed ledger and blockchain technology system, wherein information regarding the at least some of the electrical power provided by, transferred by, or supplied by, the electrical power supply system, is stored in the distributed ledger and blockchain technology system.

20. The apparatus of claim 19, wherein the apparatus creates or mines new blocks for a blockchain associated with the distributed ledger and blockchain technology system.

* * * * *